United States Patent
Smith et al.

(10) Patent No.: US 10,242,783 B2
(45) Date of Patent: Mar. 26, 2019

(54) FLUX FOCUSING ARRANGEMENT FOR PERMANENT MAGNETS, METHODS OF FABRICATING SUCH ARRANGEMENTS, AND MACHINES INCLUDING SUCH ARRANGEMENTS

(71) Applicant: Boulder Wind Power, Inc., Louisville, CO (US)

(72) Inventors: James S. Smith, Lyons, CO (US); Robert Pillsbury, Arlington, VA (US); Brian J. Sullivan, Boulder, CO (US)

(73) Assignee: Boulder Wind Power, Inc., Louisville, CO (US)

( * ) Notice: Subject to any disclaimer, the term of this patent is extended or adjusted under 35 U.S.C. 154(b) by 170 days.

(21) Appl. No.: 15/049,652

(22) Filed: Feb. 22, 2016

(65) Prior Publication Data
US 2016/0247616 A1 Aug. 25, 2016

Related U.S. Application Data

(60) Division of application No. 13/845,684, filed on Mar. 18, 2013, now Pat. No. 9,269,483, which is a division
(Continued)

(51) Int. Cl.
*H02K 1/27* (2006.01)
*H01F 7/02* (2006.01)
(Continued)

(52) U.S. Cl.
CPC .......... *H01F 7/0278* (2013.01); *H01F 7/021* (2013.01); *H01F 7/0205* (2013.01); *H02K 1/278* (2013.01);
(Continued)

(58) Field of Classification Search
CPC ...... H01F 7/0278; H01F 7/0205; H01F 7/021; H02K 1/2766; H02K 1/278; H02K 1/2786; H02K 1/2793; H02K 1/27
(Continued)

(56) References Cited

U.S. PATENT DOCUMENTS 3,768,054 A 10/1973 Neugebauer
4,168,439 A 9/1979 Palma
(Continued)

FOREIGN PATENT DOCUMENTS

EP 1 263 116 12/2002
EP 1 732 011 A1 12/2006
(Continued)

OTHER PUBLICATIONS

International Search Report and Written Opinion for PCT/US2012/031867, dated Sep. 24, 2013, 12 pages.
(Continued)

*Primary Examiner* — Michael Andrews
(74) *Attorney, Agent, or Firm* — Cooley LLP

(57) ABSTRACT

Numerous arrangements for permanent magnets are disclosed that can focus the flux produced by the magnets. Depending on the particular application in which the disclosed designs and techniques are used, efficiency and reliability may be increased by minimizing flux leakage, increasing peak flux density, and shaping the flux fields to improve the effective coercivity of the flux focusing permanent magnet arrangement when loaded, and to achieve customized voltage and current waveforms. The disclosed magnet assemblies may be incorporated into a machine, such as a motor/generator, having windings and may be disposed for movement relative to the windings. The magnet assembly may be mounted on a support formed of one or more ferromagnetic materials, such as a back iron. The
(Continued)

disclosed flux focusing magnet assemblies may be formed using a variety of manufacturing methods.

12 Claims, 55 Drawing Sheets

Related U.S. Application Data of application No. 13/438,062, filed on Apr. 3, 2012, now Pat. No. 8,397,369, which is a continuation of application No. 13/437,639, filed on Apr. 2, 2012, now Pat. No. 8,400,038.

(60) Provisional application No. 61/517,086, filed on Apr. 13, 2011.

(51) Int. Cl.
*H02K 21/12* (2006.01)
*H02K 21/14* (2006.01)
*H02K 21/24* (2006.01)
*F16C 32/04* (2006.01)

(52) U.S. Cl.
CPC ......... *H02K 1/2766* (2013.01); *H02K 1/2786* (2013.01); *H02K 1/2793* (2013.01); *H02K 21/12* (2013.01); *H02K 21/145* (2013.01); *H02K 21/24* (2013.01); *F16C 32/04* (2013.01); *H02K 1/27* (2013.01); *Y10T 29/49009* (2015.01); *Y10T 29/49012* (2015.01); *Y10T 29/49078* (2015.01)

(58) Field of Classification Search
USPC .................................................. 310/156.07
See application file for complete search history.

(56) References Cited

U.S. PATENT DOCUMENTS

| | | |
|---|---|---|
| 4,318,019 A | 3/1982 | Teasley et al. |
| 4,549,155 A | 10/1985 | Halbach |
| 4,628,809 A | 12/1986 | Das et al. |
| 4,701,737 A | 10/1987 | Leupold |
| 4,906,060 A | 3/1990 | Claude |
| 5,172,310 A | 12/1992 | Deam et al. |
| 5,289,042 A | 2/1994 | Lis |
| 5,300,910 A | 4/1994 | Unkelbach et al. |
| 5,406,196 A | 4/1995 | Sameshima |
| 5,418,446 A | 5/1995 | Hallidy |
| 5,525,894 A | 6/1996 | Heller |
| 5,587,643 A | 12/1996 | Heller |
| 5,619,085 A | 4/1997 | Shramo |
| 5,652,485 A | 7/1997 | Spiegel et al. |
| 5,710,476 A | 1/1998 | Ampela |
| 5,783,894 A | 7/1998 | Wither |
| 5,798,632 A | 8/1998 | Muljadi |
| 5,844,324 A | 12/1998 | Spriggle |
| 5,844,341 A | 12/1998 | Spooner et al. |
| 6,064,123 A | 5/2000 | Gislason |
| 6,066,945 A | 5/2000 | Shimazu et al. |
| 6,104,108 A * | 8/2000 | Hazelton .................. H02K 1/27 310/12.06 |
| 6,127,739 A | 10/2000 | Appa |
| 6,157,147 A | 12/2000 | Lin |
| 6,163,097 A | 12/2000 | Smith et al. |
| 6,163,137 A | 12/2000 | Wallace et al. |
| 6,249,058 B1 | 6/2001 | Rea |
| 6,310,387 B1 | 10/2001 | Seefeldt et al. |
| 6,326,713 B1 | 12/2001 | Judson |
| 6,373,161 B1 | 4/2002 | Khalaf |
| 6,392,371 B1 | 5/2002 | Cheng et al. |
| 6,426,580 B1 | 7/2002 | Ikeda et al. |
| 6,476,513 B1 | 11/2002 | Gueorguiev |
| 6,476,534 B1 | 11/2002 | Vanderbeck et al. |
| 6,476,535 B1 | 11/2002 | Oohashi |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,583,532 B2 | 6/2003 | Hein et al. |
| 6,598,573 B2 | 7/2003 | Kobayashi |
| 6,652,712 B2 | 11/2003 | Wang et al. |
| 6,664,704 B2 | 12/2003 | Calley |
| 6,756,719 B1 | 6/2004 | Chiu |
| 6,784,634 B2 | 8/2004 | Sweo |
| 6,794,777 B1 | 9/2004 | Fradella |
| 6,794,781 B2 | 9/2004 | Razzell et al. |
| 6,836,028 B2 | 12/2004 | Northrup et al. |
| 6,836,036 B2 | 12/2004 | Dubé |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,856,039 B2 | 2/2005 | Mikhail et al. |
| 6,891,302 B1 | 5/2005 | Gabrys |
| 6,894,413 B2 | 5/2005 | Nakano et al. |
| 6,943,461 B2 | 9/2005 | Kaploun |
| 6,943,478 B2 | 9/2005 | Zepp et al. |
| 7,034,427 B2 | 4/2006 | Hirzel |
| 7,042,109 B2 | 5/2006 | Gabrys |
| 7,042,128 B2 | 5/2006 | Zepp et al. |
| 7,045,702 B2 | 5/2006 | Kashyap |
| 7,057,384 B2 | 6/2006 | Wobben |
| 7,061,133 B1 | 6/2006 | Leijon et al. |
| 7,064,455 B2 | 6/2006 | Lando |
| 7,068,015 B1 | 6/2006 | Feddersen |
| 7,081,696 B2 | 7/2006 | Ritchey |
| 7,088,029 B2 | 8/2006 | Hiramatsu |
| 7,105,975 B2 | 9/2006 | Semones et al. |
| 7,109,625 B1 | 9/2006 | Jore et al. |
| 7,135,952 B2 | 11/2006 | Harding |
| 7,154,192 B2 | 12/2006 | Jansen et al. |
| 7,154,193 B2 | 12/2006 | Jansen et al. |
| 7,170,212 B2 | 1/2007 | Balson et al. |
| 7,190,101 B2 | 3/2007 | Hirzel |
| 7,193,409 B2 | 3/2007 | Wobben |
| 7,218,012 B1 | 5/2007 | Edenfeld |
| 7,230,361 B2 | 6/2007 | Hirzel |
| 7,245,037 B2 | 7/2007 | Ängquist et al. |
| 7,245,042 B1 | 7/2007 | Simnacher |
| 7,253,543 B2 | 8/2007 | Akiyama |
| 7,303,369 B2 | 12/2007 | Rowan et al. |
| 7,315,101 B2 | 1/2008 | Shimada |
| 7,332,837 B2 | 2/2008 | Ward et al. |
| 7,385,330 B2 | 6/2008 | Trzynadlowski et al. |
| 7,443,066 B2 | 10/2008 | Salamah et al. |
| 7,471,181 B1 | 12/2008 | MacLennan |
| 7,492,074 B1 | 2/2009 | Rittenhouse |
| 7,548,008 B2 | 6/2009 | Jansen et al. |
| 7,557,482 B2 | 7/2009 | Aydin et al. |
| 7,579,742 B1 | 8/2009 | Rittenhouse |
| 7,612,463 B2 | 11/2009 | Cullen et al. |
| 7,640,648 B1 | 1/2010 | Rittenhouse |
| 7,646,126 B2 | 1/2010 | Trzynadlowski et al. |
| 7,656,135 B2 | 2/2010 | Schram et al. |
| 7,679,249 B2 | 3/2010 | Appa et al. |
| 7,692,357 B2 | 4/2010 | Qu et al. |
| 7,710,081 B2 | 5/2010 | Saban et al. |
| 7,710,234 B2 | 5/2010 | Gardner et al. |
| 7,723,891 B2 | 5/2010 | Rittenhouse |
| 7,772,741 B1 | 8/2010 | Rittenhouse |
| 7,781,932 B2 | 8/2010 | Jansen |
| 7,830,057 B2 | 11/2010 | Gieras |
| 7,839,049 B2 | 11/2010 | Jansen et al. |
| 7,851,965 B2 | 12/2010 | Calley et al. |
| 7,868,508 B2 | 1/2011 | Calley et al. |
| 7,868,510 B2 | 1/2011 | Rittenhouse |
| 7,888,839 B2 | 2/2011 | Gabrys et al. |
| 7,923,886 B2 | 4/2011 | Calley et al. |
| 8,040,011 B2 | 10/2011 | Mueller et al. |
| 8,115,348 B2 | 2/2012 | Hsu et al. |
| 8,178,992 B1 | 5/2012 | Meller |
| 8,397,369 B2 | 3/2013 | Smith et al. |
| 8,400,038 B2 | 3/2013 | Smith et al. |
| 8,716,913 B2 | 5/2014 | Kvam et al. |

(56) References Cited

U.S. PATENT DOCUMENTS

| | | |
|---|---|---|
| 8,823,241 B2 | 9/2014 | Jore et al. |
| 9,154,024 B2 | 10/2015 | Jore et al. |
| 9,269,483 B2 | 2/2016 | Smith et al. |
| 2002/0180294 A1 | 12/2002 | Kaneda et al. |
| 2004/0046471 A1 | 3/2004 | Kim et al. |
| 2007/0108850 A1* | 5/2007 | Chertok ............... H02K 1/145 310/15 |
| 2007/0284960 A1 | 12/2007 | Fulton et al. |
| 2007/0290569 A1 | 12/2007 | Bode et al. |
| 2009/0097003 A1 | 4/2009 | Cox et al. |
| 2010/0052437 A1* | 3/2010 | Froeschle ........... H02K 41/031 310/12.25 |
| 2010/0181858 A1* | 7/2010 | Hibbs ..................... H02K 1/27 310/156.07 |
| 2011/0012440 A1 | 1/2011 | Toyota et al. |
| 2012/0200177 A1 | 8/2012 | Atkinson et al. |
| 2012/0251213 A1 | 10/2012 | Iesaki |
| 2012/0262019 A1 | 10/2012 | Smith et al. |
| 2012/0262020 A1 | 10/2012 | Smith et al. |

FOREIGN PATENT DOCUMENTS

| | | |
|---|---|---|
| JP | H04-244766 A | 9/1992 |
| JP | H07-39090 A | 2/1995 |
| JP | H07-97529 B2 | 10/1995 |
| JP | 36-79673 B2 | 8/2005 |
| WO | WO 2010/036747 A1 | 4/2010 |
| WO | WO 2010/083054 | 7/2010 |

OTHER PUBLICATIONS

Office Action for U.S. Appl. No. 13/437,639, dated Aug. 17, 2012, 17 pages.

Office Action for U.S. Appl. No. 13/438,062, dated Aug. 14, 2012, 12 pages.

Office Action for U.S. Appl. No. 13/845,684, dated Jun. 29, 2015.

Office Action for European Patent Application No. 12718482.8, dated Jun. 1, 2017.

Yolacan, E. et al., "Magnet shape optimization of a slotted surface-mounted axial gap PM motor for reducing cogging torque," XIX International Conference on Electrical Machines—ICEM 2010, Rome, 2010, ISBN 978-1-4244-4175-4, 6 pages.

Merritt, B. et al., "Halbach Array Motor/Generators—A Novel Generalized Electric Machine," Lawrence Livermore National Laboratory, Oct. 28, 1994, UCRL-JC-119050; 8 pages.

Zheng, P. et al., "Optimization of the Magnetic Pole Shape of a Permanent-Magnet Synchronous Motor," IEEE Transactions on Magnetics, vol. 43, No. 6, Jun. 2007, 3 pages.

Mohammed, O. et al., "Effect of change in pole shape design on harmonic contents of PM synchronous motor air gap flux density waveform," 2007, ISBN 1-4244-1029-0, 5 pages.

Dubois, M., "Optimized Permanent Magnet Generator Topologies for Direct-Drive Wind Turbines," Thesis, Jan. 26, 2004, ISBN 0-9734585-0-X, 264 pages.

Garcia, J. et al., "Transverse Flux Machines: What for?," IEEE Multidisciplinary Engineering Education Magazine, vol. 2, No. 1, Mar. 2007, 3 pages.

Office Action—Exam Report for European Patent Application No. 12718482.8, dated Jun. 12, 2018, 6 pages.

* cited by examiner

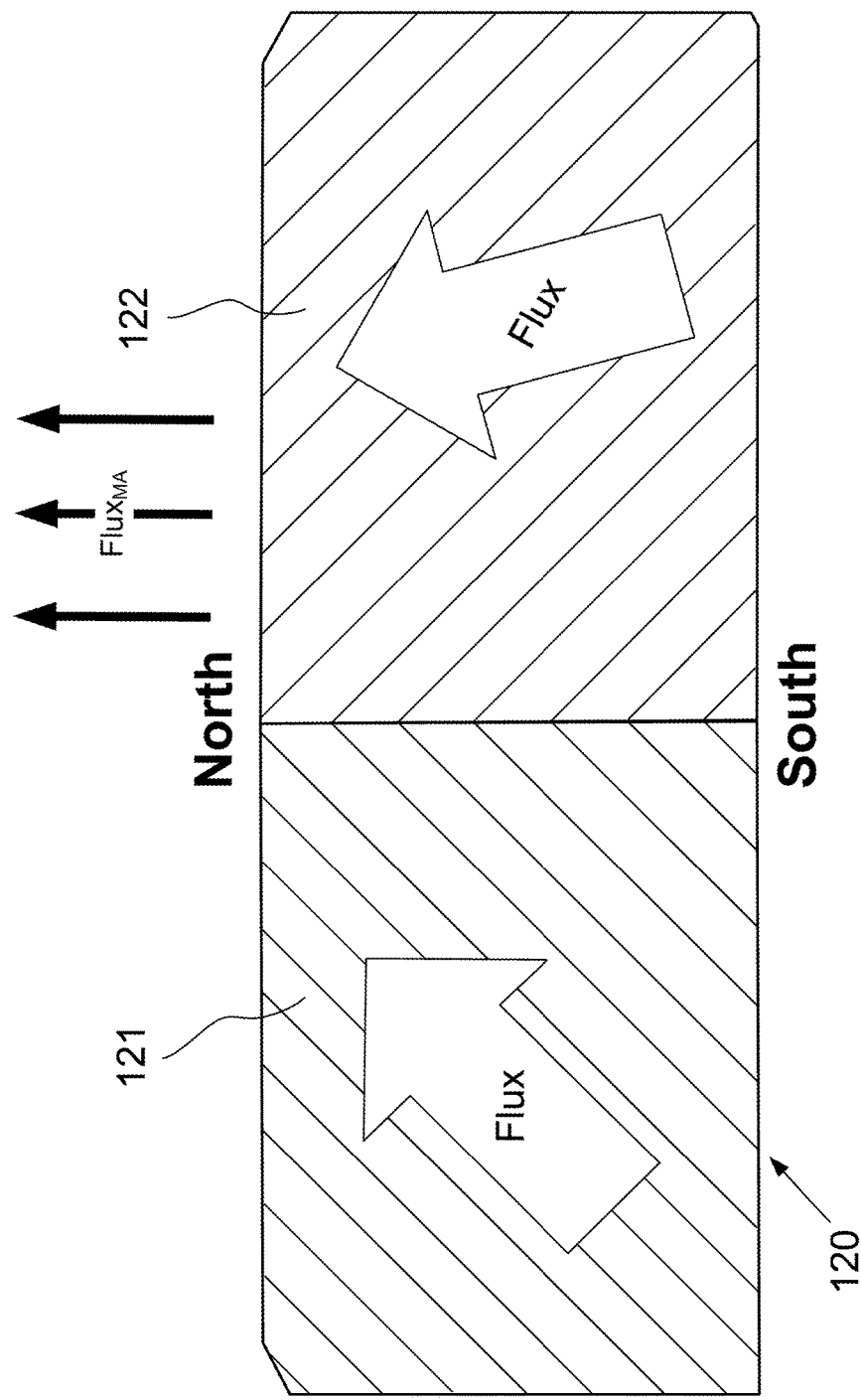

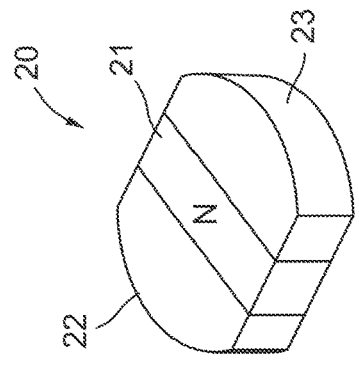
FIG.5C
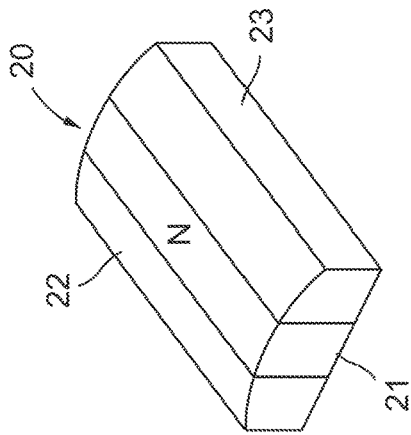
FIG.5F
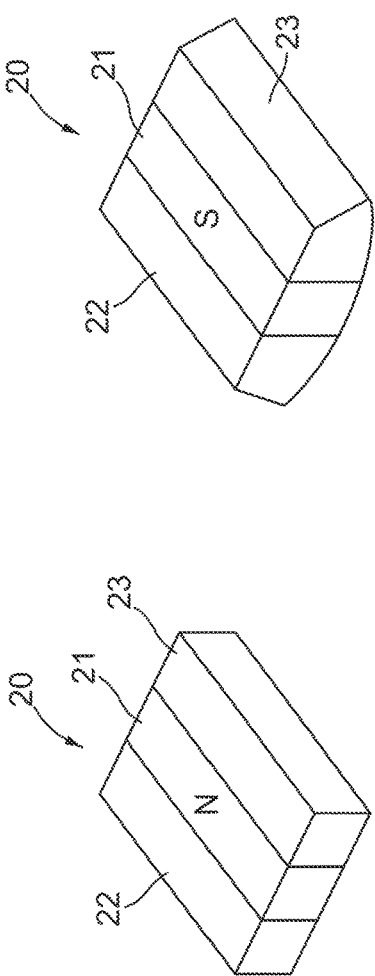
FIG.5B
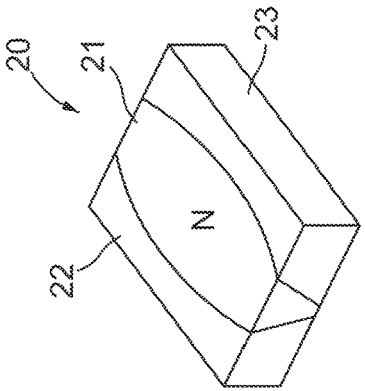
FIG.5E
FIG.5A
FIG.5D
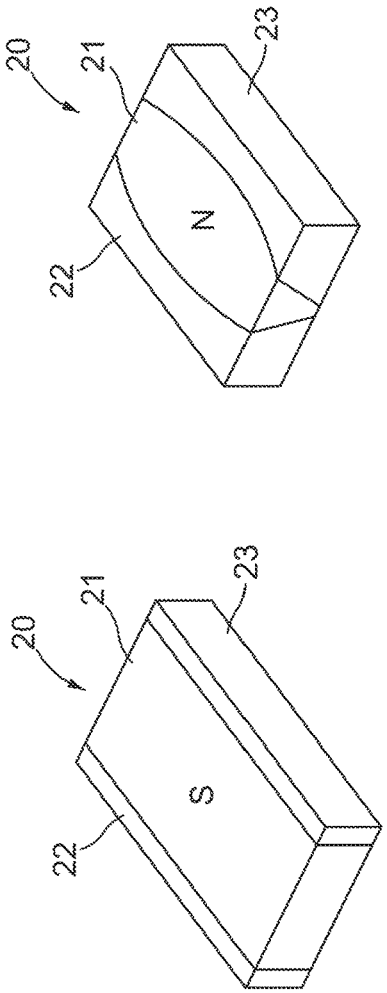

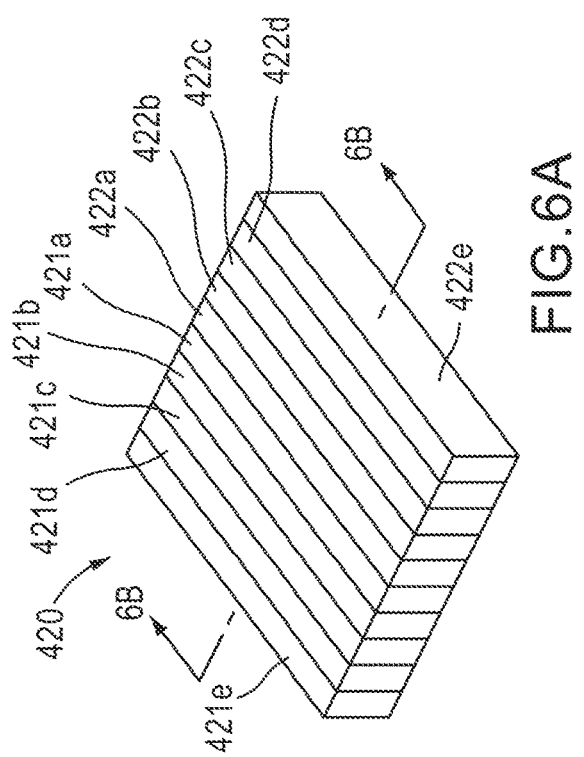

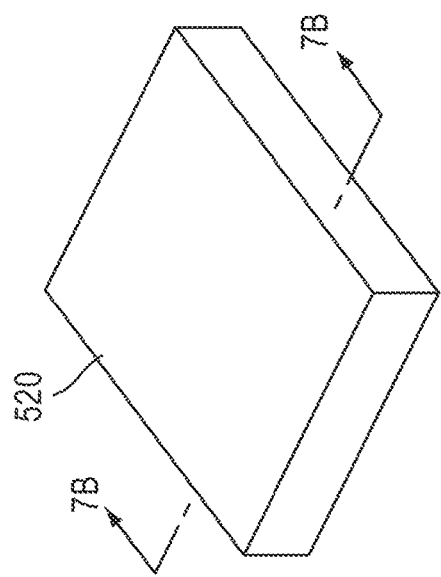

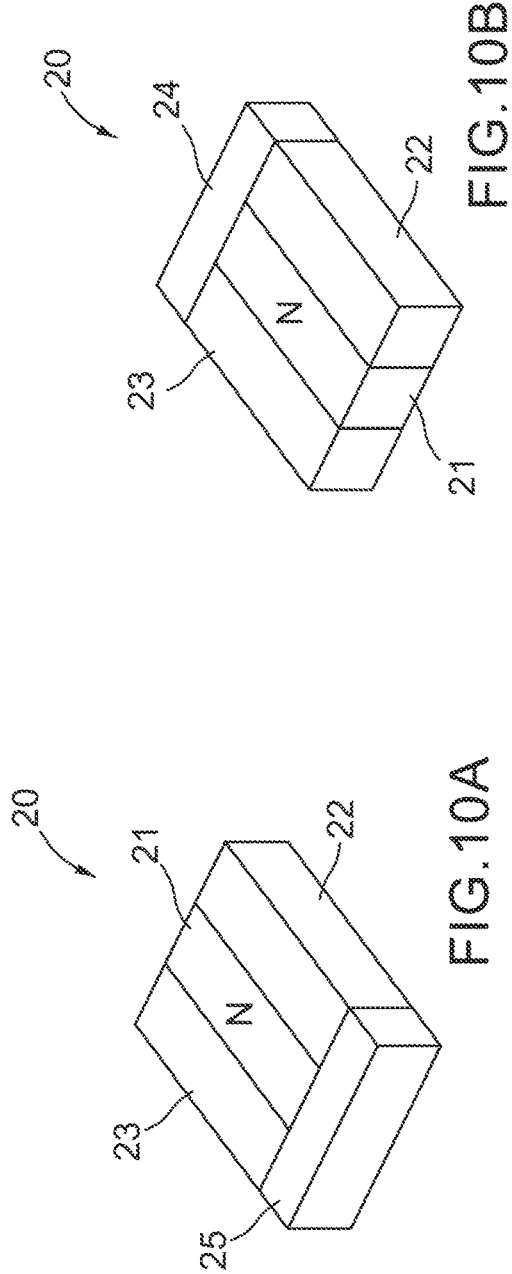
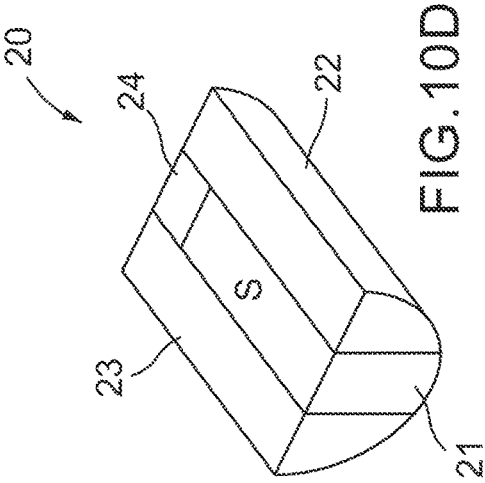
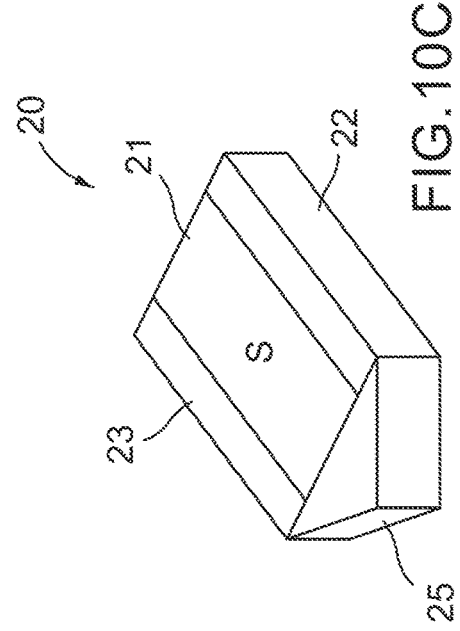

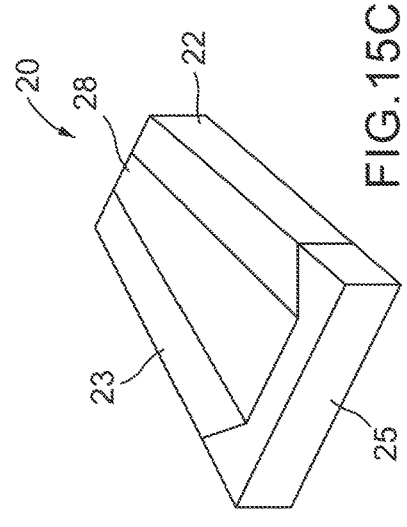
FIG.15C
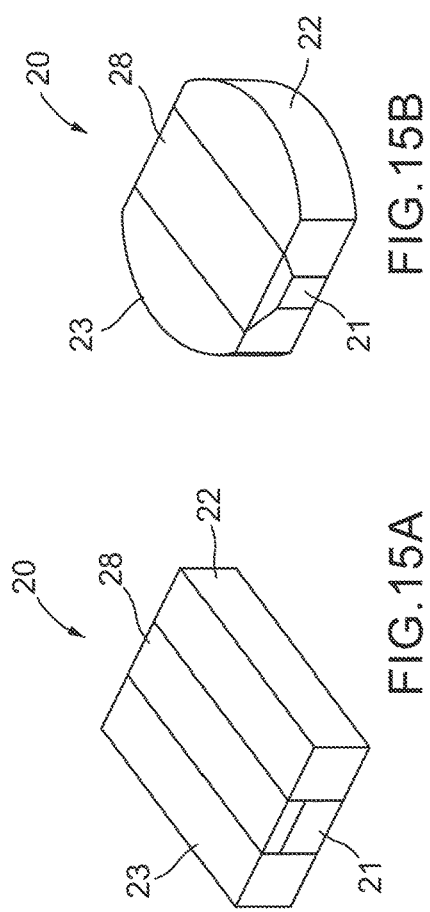
FIG.15B
FIG.15A
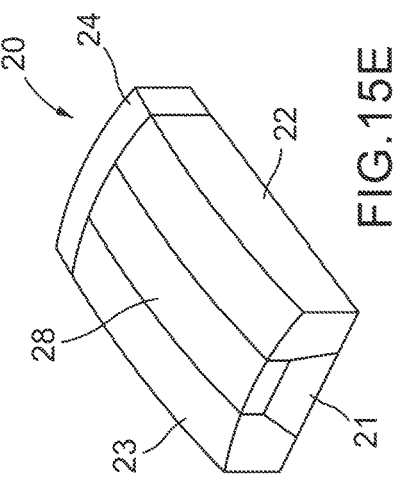
FIG.15E
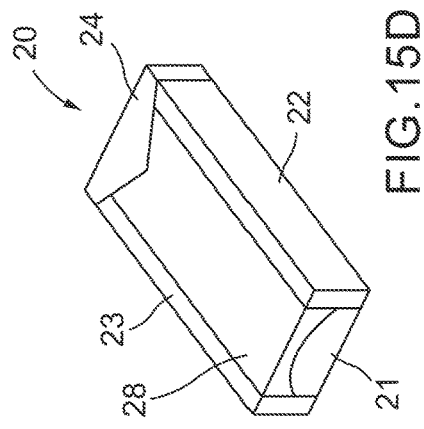
FIG.15D

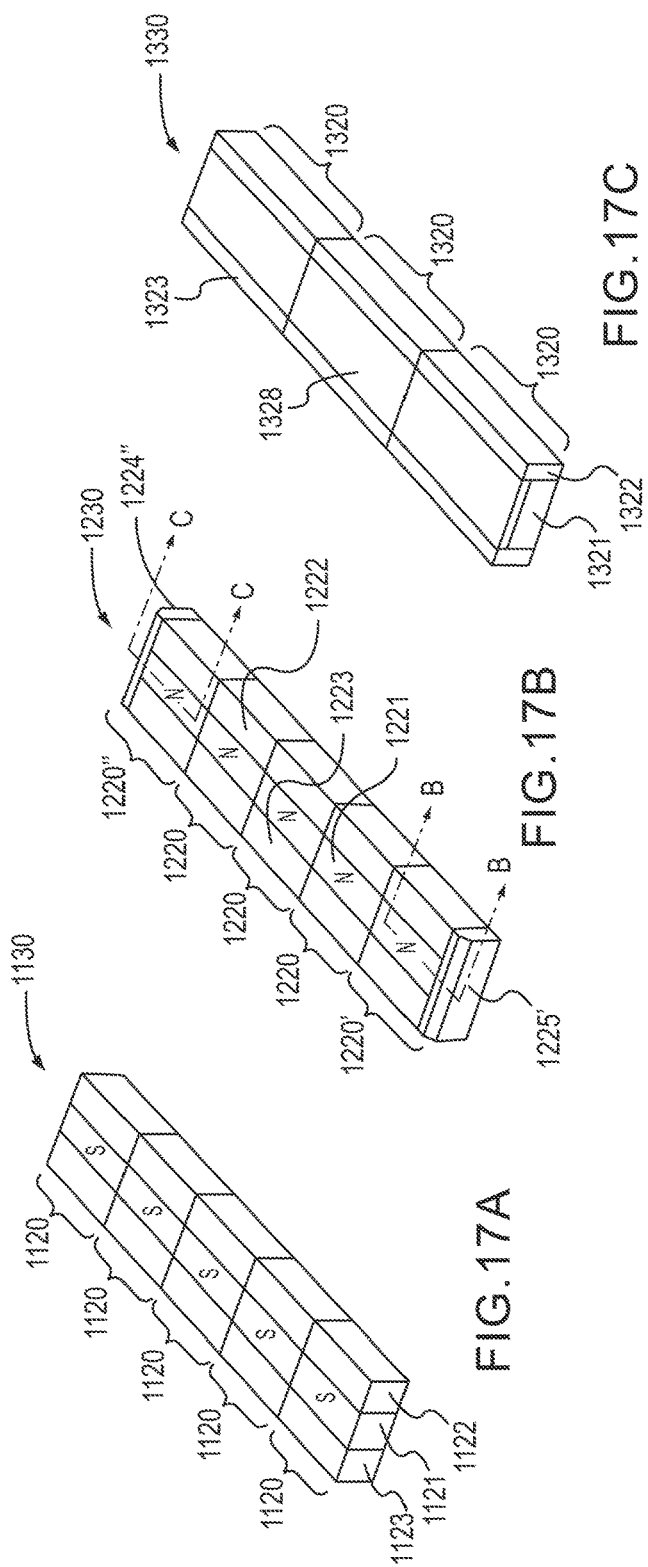

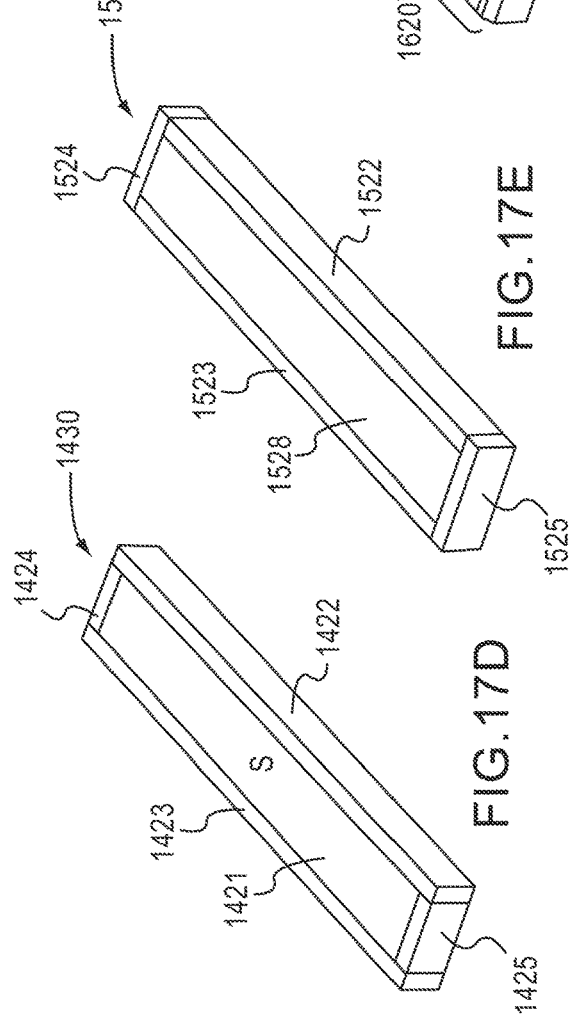

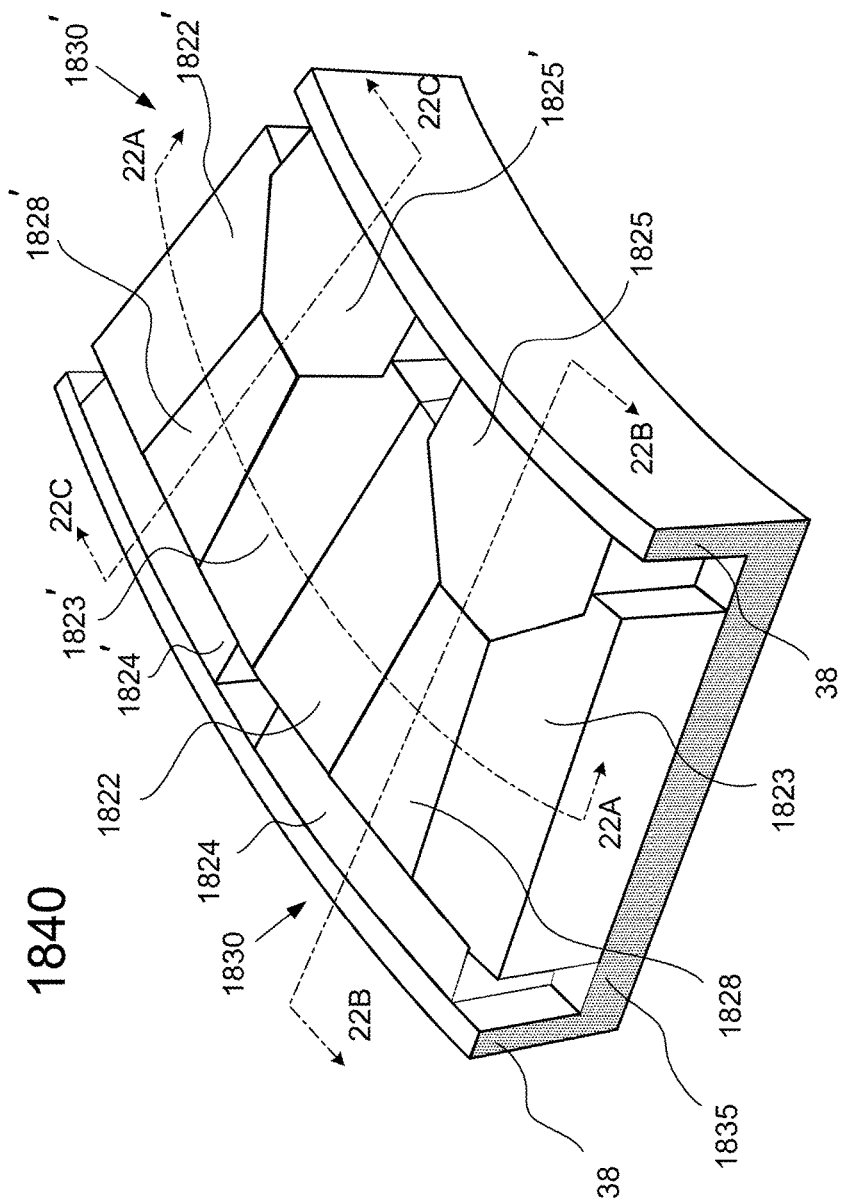

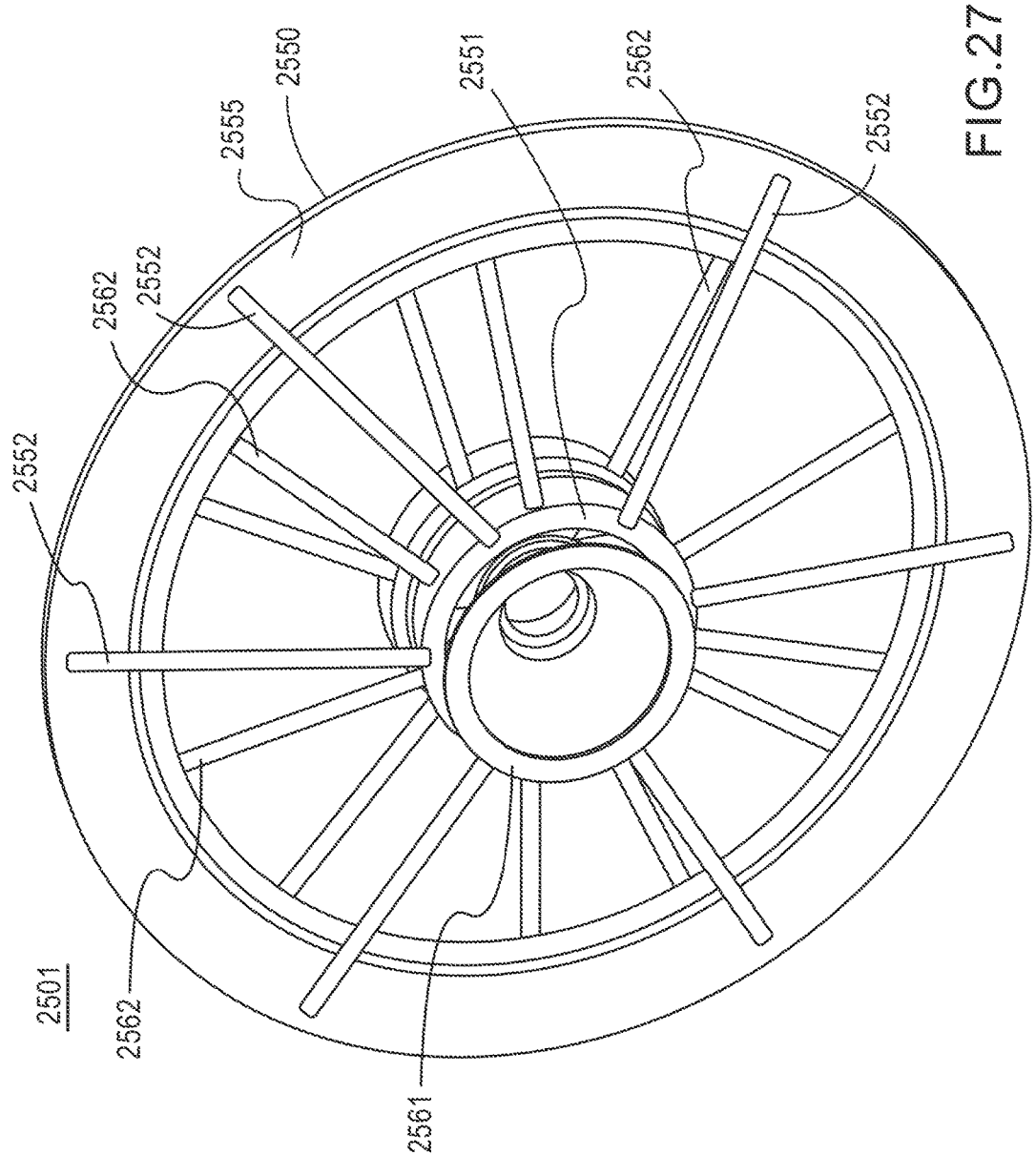

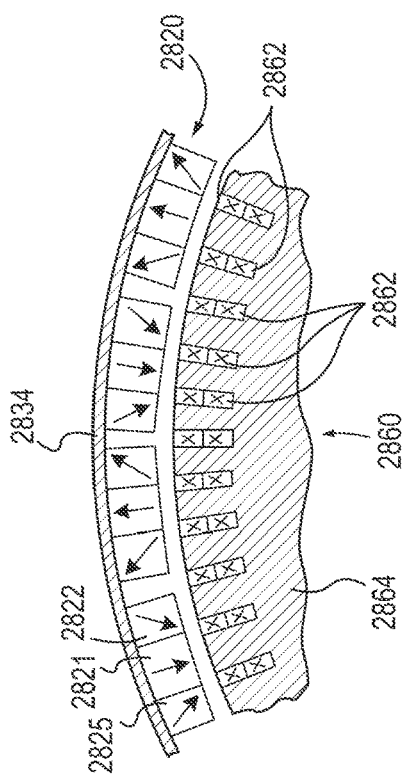
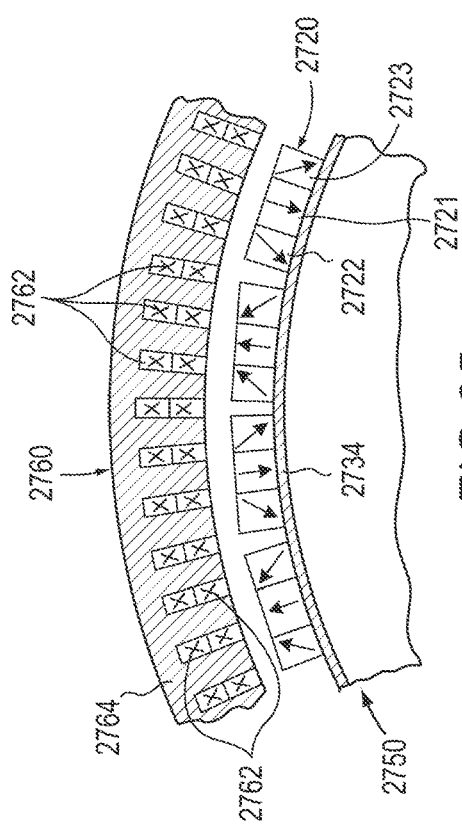

FLUX FOCUSING ARRANGEMENT FOR PERMANENT MAGNETS, METHODS OF FABRICATING SUCH ARRANGEMENTS, AND MACHINES INCLUDING SUCH ARRANGEMENTS

PRIORITY

This application is a divisional of U.S. patent application Ser. No. 13/845,684, entitled "Flux Focusing Arrangement For Permanent Magnets, Methods Of Fabricating Such Arrangements, And Machines Including Such Arrangements," filed Mar. 18, 2013, which is a divisional of U.S. patent application Ser. No. 13/438,062, entitled "Flux Focusing Arrangement For Permanent Magnets, Methods Of Fabricating Such Arrangements, And Machines Including Such Arrangements," filed Apr. 3, 2012 (now U.S. Pat. No. 8,397,369), which is a continuation of U.S. patent application Ser. No. 13/437,639, entitled "Flux Focusing Arrangement For Permanent Magnets, Methods Of Fabricating Such Arrangements, And Machines Including Such Arrangements," filed Apr. 2, 2012 (now U.S. Pat. No. 8,400,038), which claims the benefit of U.S. Provisional Application Ser. No. 61/517,086, filed Apr. 13, 2011, the disclosures of which are incorporated herein by reference in their entirety.

FIELD OF THE INVENTION

The disclosure relates to the field of permanent magnets, including the use of permanent magnets and permanent magnet arrangements in machinery and other devices.

BACKGROUND OF INVENTION

Permanent magnet electromagnetic machines (referred to as permanent magnet machines herein) utilize magnetic flux from permanent magnets to convert mechanical energy to electrical energy or vice versa. Various types of permanent magnet machines are known, including axial flux machines, radial flux machines, and transverse flux machines, in which one component rotates about an axis or translates along an axis, either in a single direction or in two directions, e.g. reciprocating, with respect to another component. Such machines typically include windings to carry electric current through coils that interact with the flux from the magnets through relative movement between the magnets and the windings. In a common industrial application arrangement, the permanent magnets are mounted for movement, e.g. on a rotor (or otherwise moving part) and the windings are mounted on a stationary part, such as a stator. Other configurations, typical for low power, inexpensive machines operated from a direct current source where the magnets are stationary and the machine's windings are part of the rotor (energized by a device known as a "commutator" with "brushes") are clearly also available, but will not be discussed in detail in the following text in the interest of brevity.

In an electric motor, for example, current is applied to the windings in the stator, causing the magnets (and therefore the rotor) to move relative to the windings, thus converting electrical energy into mechanical energy. In a generator, application of an external force to the generator's rotor causes the magnets to move relative to the windings, and the resulting generated voltage causes current to flow through the windings—thus converting mechanical energy into electrical energy.

Surface mounted permanent magnet machines are a class of permanent magnet machines in which the magnets are mounted on a ferromagnetic structure, or backing, commonly referred to as a back iron. Such machines are generally the lowest cost and lightest weight permanent magnet machines, but they typically suffer from limitations in performance that can be traced to the flux density limitations, well known in the art, of conventionally designed and manufactured permanent magnets. As a general matter, flux density can be increased by using magnets formed of a material having a relatively higher magnetic energy density, or of relatively greater thickness. High magnetic energy density materials, such as the neodymium-iron-boron system, are typically more expensive and have historically been subject to significant price volatility. Thicker magnets require more magnetic material, and cost generally scales with the amount of materials. Thus, increasing flux density for such machines with these approaches increases cost and potentially increases cost volatility, and may yield only limited performance improvements. Further, there is an inherent limit to the amount of flux in a given magnetic circuit, where further additions to magnet thickness may yield little to no additional flux.

Given the drawbacks of known techniques of improving the electromagnetic efficiency and other performance attributes of surface mounted machines, new techniques for effecting such performance improvements are clearly desired by those practiced in the art of designing such machines. Further, because many applications of permanent magnets other than permanent magnet machines as described above would benefit from the ability to enhance magnetic performance while limiting cost, such new techniques will be even more desirable if they have broad applicability not limited to permanent magnet machines.

The benefits of the disclosed designs and techniques will be apparent to those practiced in the art of designing and building surface mounted permanent magnet machines. In fact, the benefits of the disclosed designs and techniques may enable surface mounted magnet machines to compete with other permanent magnet machine topologies (such as embedded magnet machines) on performance while retaining the established cost and weight advantages of surface mounted permanent magnet machines. Moreover, the benefits and usefulness of the disclosed designs and techniques are not limited to surface mounted permanent magnet machines, but extend to a wide variety of permanent magnet applications.

SUMMARY

Illustrative embodiments are shown in the drawings and described below. It is to be understood, however, that there is no intention to limit the claimed inventions to the particular forms described in this Summary of the Invention or in the Detailed Description. One skilled in the art can recognize that there are numerous modifications, equivalents, and alternative constructions that fall within the spirit and scope of the claimed inventions. In particular, one skilled in the art can recognize that the disclosed designs and techniques can be used in any machine with arrays of magnets, including radial, axial, and transverse flux motors and generators that operate in a rotating or a linear manner. Indeed, skilled artisans will also recognize that the disclosed designs and techniques are useful in any application that utilizes magnetic flux from permanent magnets.

Numerous arrangements for permanent magnets are disclosed that can focus the flux produced by the magnets.

Depending on the particular application in which the disclosed designs and techniques are used, efficiency and reliability may be increased by minimizing flux leakage, increasing peak flux density, and shaping the flux fields to improve the effective coercivity of the flux focusing permanent magnet arrangement when loaded, and to achieve customized voltage and current waveforms.

By way of non-limiting example, a flux focusing magnet assembly may include a first magnet or magnet portion having a nominal axis of polarization, and one or more other magnets or magnet portions disposed adjacent to or about the first magnet, each such other magnet or magnet portion having a nominal axis of polarization that converges with the nominal axis of polarization of the first magnet. The nominal axis or axes of the other magnet(s) or portion(s) may be coplanar or may be non-coplanar with the nominal axis of polarization of the first magnet and/or each other. The nominal axes of the magnets or magnet portions may converge in the direction of their north poles, or may converge in the direction of their south poles. The magnet assembly may include a ferromagnetic lens to further concentrate flux. The magnet assembly may be incorporated into a machine having windings and may be disposed for movement relative to the windings and oriented such that nominal axes of polarization converge towards the windings, or such that the nominal axes of polarization converge away from the windings. The magnet assembly may be mounted on a support formed of one or more ferromagnetic materials, such as a back iron.

The disclosed flux focusing magnet assemblies may be formed using a variety of manufacturing methods. By way of non-limiting example, two or more separate magnets may each be formed separately in the presence of a magnetic field to align the magnetic domains in each magnet parallel to a nominal axis of polarization, the magnets may be positioned or disposed adjacent each other with their nominal axes of polarization converging, and then the assembly can be permanently magnetized. Alternatively, each magnet may be permanently magnetized before the magnets are disposed adjacent each other. Alternatively, a unitary magnet may be formed in the presence of a complex magnetic field to align the magnetic domains in different portions of the magnet to align the magnetic domains parallel to different nominal axes of polarization, and then may be permanently magnetized in a complex magnetic field. A ferromagnetic lens may be coupled to the magnet(s) before or after permanent magnetization and/or before or after multiple magnets are disposed adjacent each other.

These and other embodiments are described in further detail herein.

BRIEF DESCRIPTION OF THE DRAWINGS

In the following Detailed Description, reference is made to the drawings identified below.

FIG. 2C is a schematic cross sectional view of a variation on the assembly of FIG. 2A.

FIGS. 5A-5F are schematic perspective views of various configurations of an embodiment of a flux magnet assembly with a central magnet and two splitter magnets.

FIG. 6A is a schematic perspective view of a magnet assembly according to an embodiment having ten magnets.

FIG. 7A is a schematic perspective view of a magnet assembly according to an embodiment having one magnet.

FIGS. 10A-10D are schematic perspective views of various configurations of an embodiment of a flux magnet assembly with a central magnet, two splitter magnets, and a pusher magnet.

FIGS. 15A-15E are schematic perspective views of various configurations of an embodiment of a flux magnet assembly with a central magnet, two splitter magnets, a lens, and optionally a pusher magnet.

FIGS. 17A-17F are schematic perspective views of various embodiments of pole assemblies having one or more flux focusing magnet assemblies.

FIG. 21 is a schematic perspective view of a magnetic assembly having two pole assemblies, according to an embodiment.

FIG. 27 is a perspective view of an axial motor/generator according to an embodiment.

FIG. 35 is a schematic cross-sectional view of the motor/generator of FIG. 33.

FIG. 36 is a schematic cross-sectional view of a radial field motor/generator according to an embodiment.

DETAILED DESCRIPTION

The flux focusing magnet assemblies described below may be beneficially used in any application that utilizes magnetic flux, and are particularly useful in those applications where it is desired to maximize the flux that crosses a gap while minimizing leakage flux, improving the peak flux density across the gap, and/or shaping the flux field across said gap.

Figure 1:
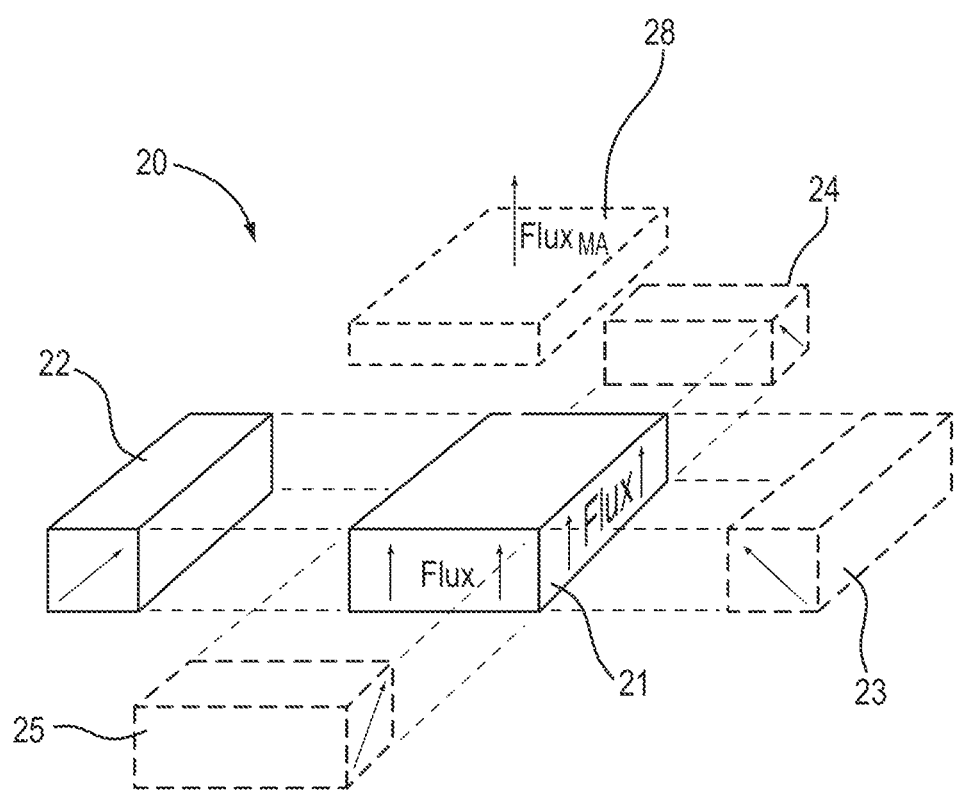
FIG. 1 is a schematic illustration of a magnet assembly according to an embodiment.

A flux focusing magnet assembly 20 is illustrated schematically in FIG. 1. Magnet assembly 20 includes a first magnet 21 and a second magnet 22 disposed adjacent to first magnet 21. The magnetic domains in each magnet are aligned parallel to a respective nominal flux axis, each represented in FIG. 1 by one or more arrows, which for the first magnet 21 are labeled "Flux," with the head of each arrow having the same polarity (e.g. north or south). As shown in FIG. 1, the nominal flux axes of magnets 21 and 22 are not parallel, but are oriented towards each other, to converge in a direction above the magnets. As the artisan will recognize, the flux field produced by the combination of the two magnets 21 and 22, i.e. by the converging nominal flux axes, is denser in the region above the magnets than would be the flux field produced by the two magnets if their nominal flux axes were parallel. The nominal flux axes of magnets 21 and 22 may be coplanar or may lie in different planes. Magnet assembly 20 has an overall nominal flux direction, indicated by the arrow labeled $Flux_{MA}$. The nominal flux direction of the magnet assembly is influenced by the flux axes of the constituent magnets of the magnet assembly, or stated another way, the relative orientation of the magnets' flux axes can be selected to product a desired nominal flux direction of the magnet assembly, for example normal to the face of the magnet assembly.

Optionally, magnet assembly 20 may include a third magnet 23, which may be disposed adjacent to magnet 21 so that magnets 22 and 23 are on opposite sides of magnet 21. The nominal flux axis of magnet 23 may converge with those of magnets 21 and 22, which the artisan will recognize will produce a flux field that is more dense in the region above magnet assembly 20 than would be the flux field produced by magnets 21 and 22 alone, or by magnets 21, 22, and 23 if their nominal flux axes were parallel. The nominal flux axis of magnet 23 may be coplanar with the nominal flux axis of magnet 21 and/or that of magnet 22, or may not be coplanar with either.

In a magnet assembly in which a second magnet is disposed on one side of, or in which second and third magnets are disposed on opposite sides of (which may be referred to as "laterally" of, or along a lateral direction) a first magnet, with their nominal flux axes converging, the first magnet may be referred to as a central magnet, and the second, or second and third magnets, may be referred to as a splitter magnet or splitter magnets, or for an assembly with just two magnets, both may be referred to as splitter magnets, and neither magnet is referred to as a central magnet. Magnet assembly 20 may include one or more additional splitter magnets (not shown) disposed on either or both sides of magnets 21, 22, and 23.

Figure 2A:
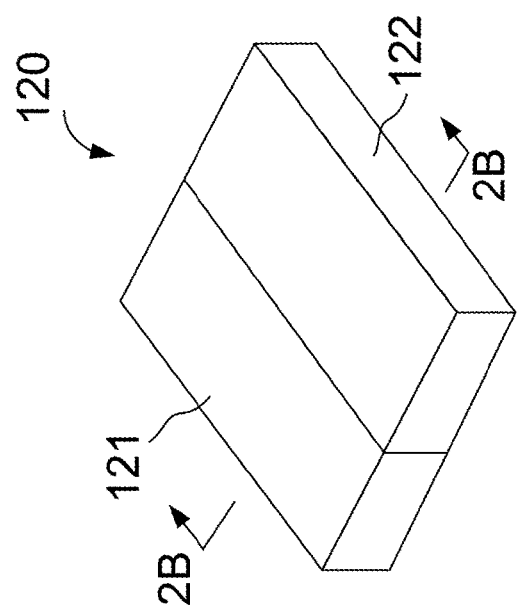
FIG. 2A is a schematic perspective view of a magnet assembly according to an embodiment having two magnets.
Figure 2B:
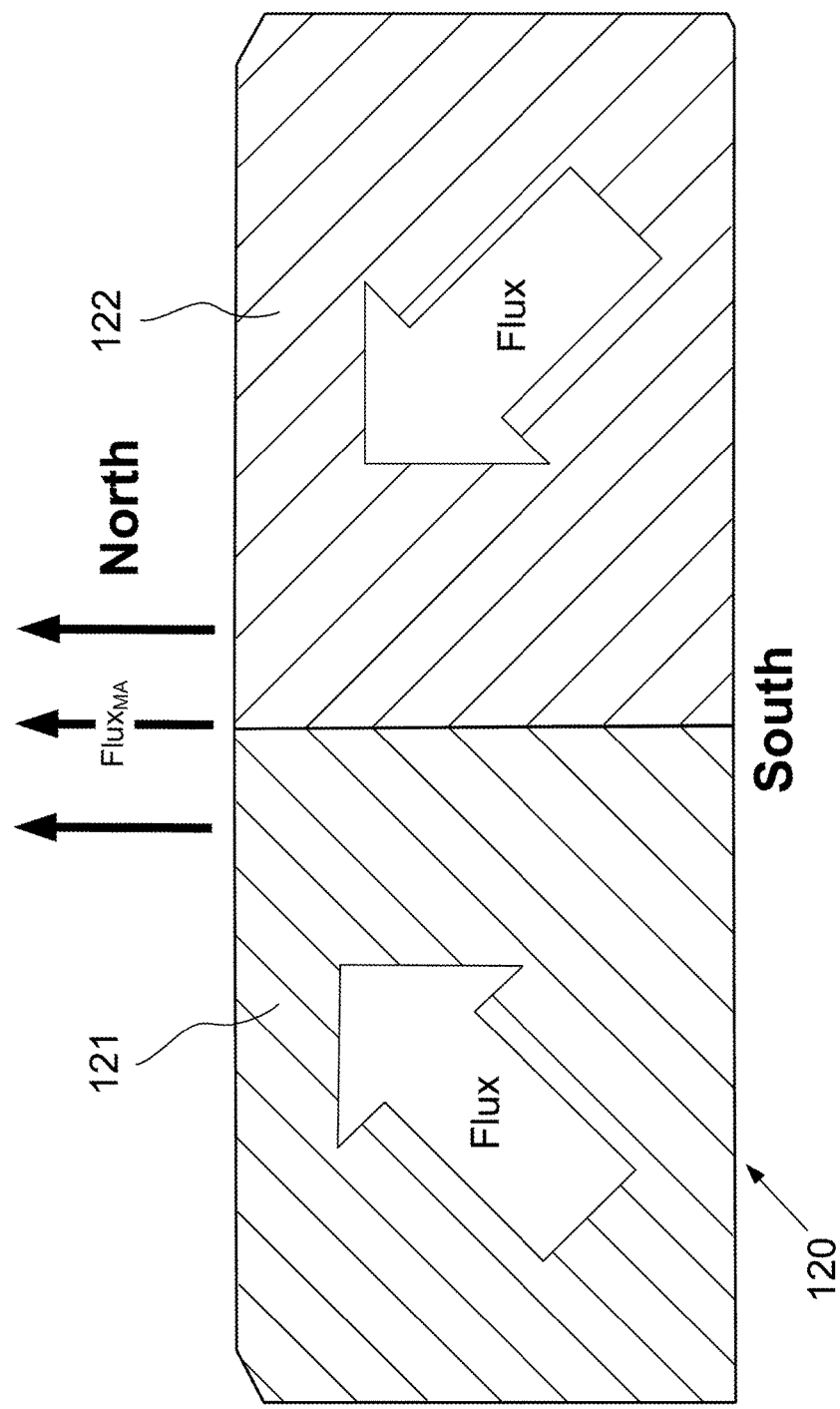
FIG. 2B is a schematic cross sectional view of the assembly taken along line 2B-2B of FIG. 2A.

An exemplary magnet assembly 120 with central magnet (or splitter magnet) 121 and splitter magnet 122 (or two splitter magnets 121, 122) is illustrated schematically in FIGS. 2A and 2B. FIG. 2A shows a schematic perspective view, and FIG. 2B shows a schematic cross section, of a north pole flux focusing magnet assembly with magnets 121 and 122. While each of magnets 21 and 22, and flux focusing magnet assembly 20 as a whole, is illustrated as having a substantially rectangular cross section in FIG. 2A, this is merely for ease of illustration; skilled artisans will understand that the geometric cross section of a flux focusing magnet assembly 20 will vary depending on the size and shape of its component magnets, and the characteristics desired in a particular application where such a magnet is utilized, as described in more detail below.

As shown in FIG. 2B, central magnet (or splitter magnet) 121, and splitter magnet 122, each has an angle of polarization, or nominal flux axis, oriented to converge towards the other magnet's nominal flux axis above the top face of magnet assembly 120. The top face of magnet assembly 120 in FIG. 2B has a magnetization of north while the bottom face has a magnetization of south. The orientation of the nominal flux axes, and the polarity of the poles, of magnets 121 and 122, results in magnetic flux directed angularly toward the center of, and upward relative to, magnet assembly 120, from the north pole face of magnet assembly 120. The magnetic angle of polarization of magnets 121 and 122 determines how much flux each contributes to the useful flux density above the north pole face of magnet assembly 120.

A variation on magnet assembly 120 is shown in FIG. 2C. In this variation, the nominal flux axes are not symmetric with each other, i.e. the flux angle of magnet 122 is at a smaller angle with respect to the nominal flux axis $Flux_{MA}$ of magnet assembly 120 than is that of magnet 121.

Figure 3:
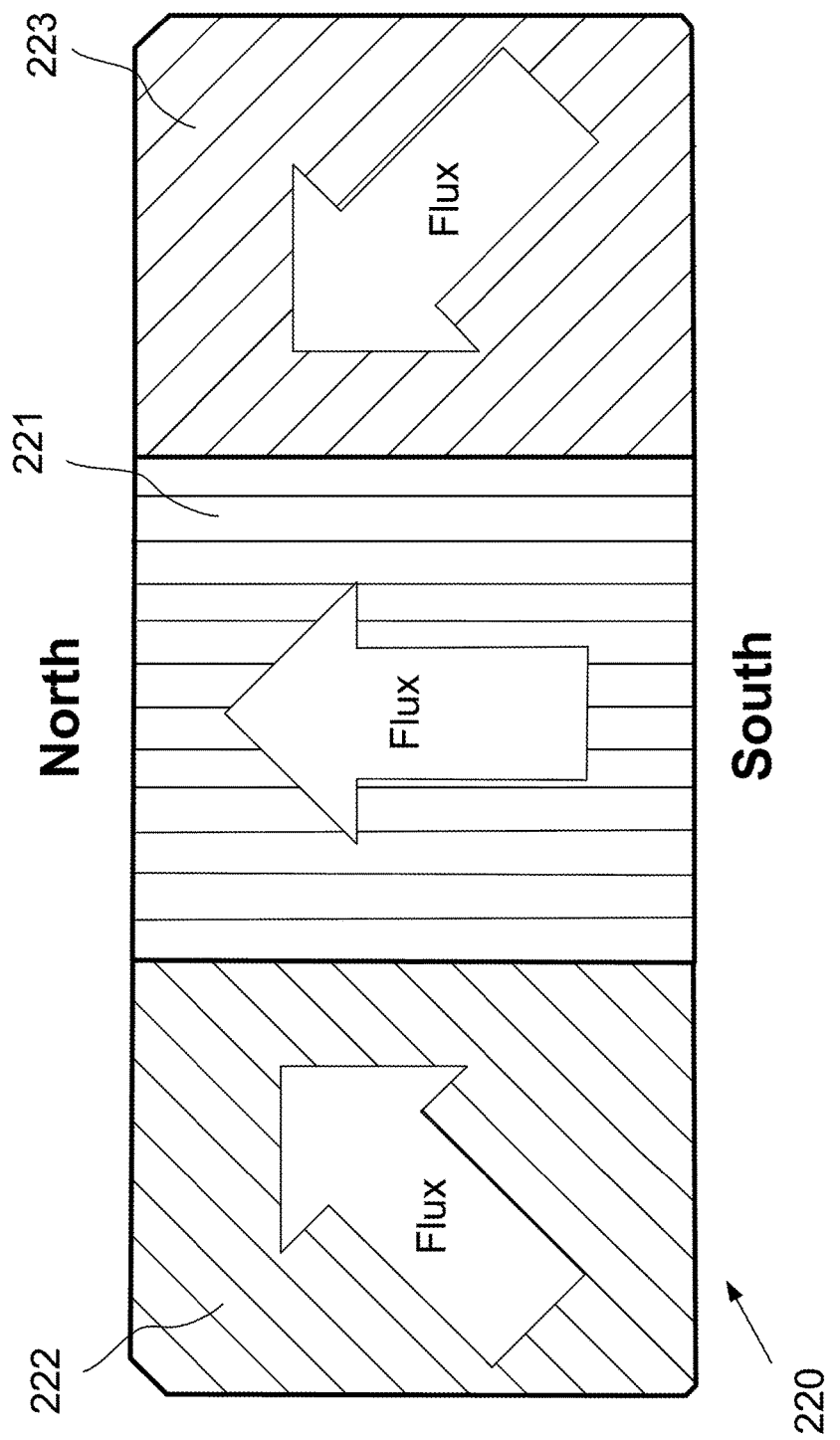
FIG. 3 is a schematic cross-sectional view of a north pole flux focusing magnet assembly according to an embodiment.

Another exemplary magnet assembly 220 is shown in schematic cross section if FIG. 3. Magnet assembly 220 is a north pole flux focusing magnet assembly, with a central magnet 221 and two splitter magnets 222, 223. In FIG. 3A, central magnet 221 has an angle of polarization, or nominal flux axis, oriented perpendicular to the top face of magnet assembly 220, whereas splitter magnets 221 and 222 have flux paths at an angle of polarization, or a nominal flux axis, of minus and plus 45° relative to that of the central magnet 221, i.e. the nominal flux axes converge in a direction above the top face. The top face of magnet assembly 220 in FIG. 3 has a magnetization of north while the bottom face has a magnetization of south. The orientation of the nominal flux axes, and the polarity of the poles, of magnets 221, 222, and 223, results in magnetic flux directed angularly toward central magnet 221 from splitter magnets 222 and 223, and upward (relative to magnet assembly 220) from the north pole face of magnet assembly 220. The magnetic angle of polarization of splitter magnets 222 and 223 determines how much flux splitter magnets 222 and 223 contribute to the useful flux density above the north pole face of magnet assembly 220.

Figure 4:
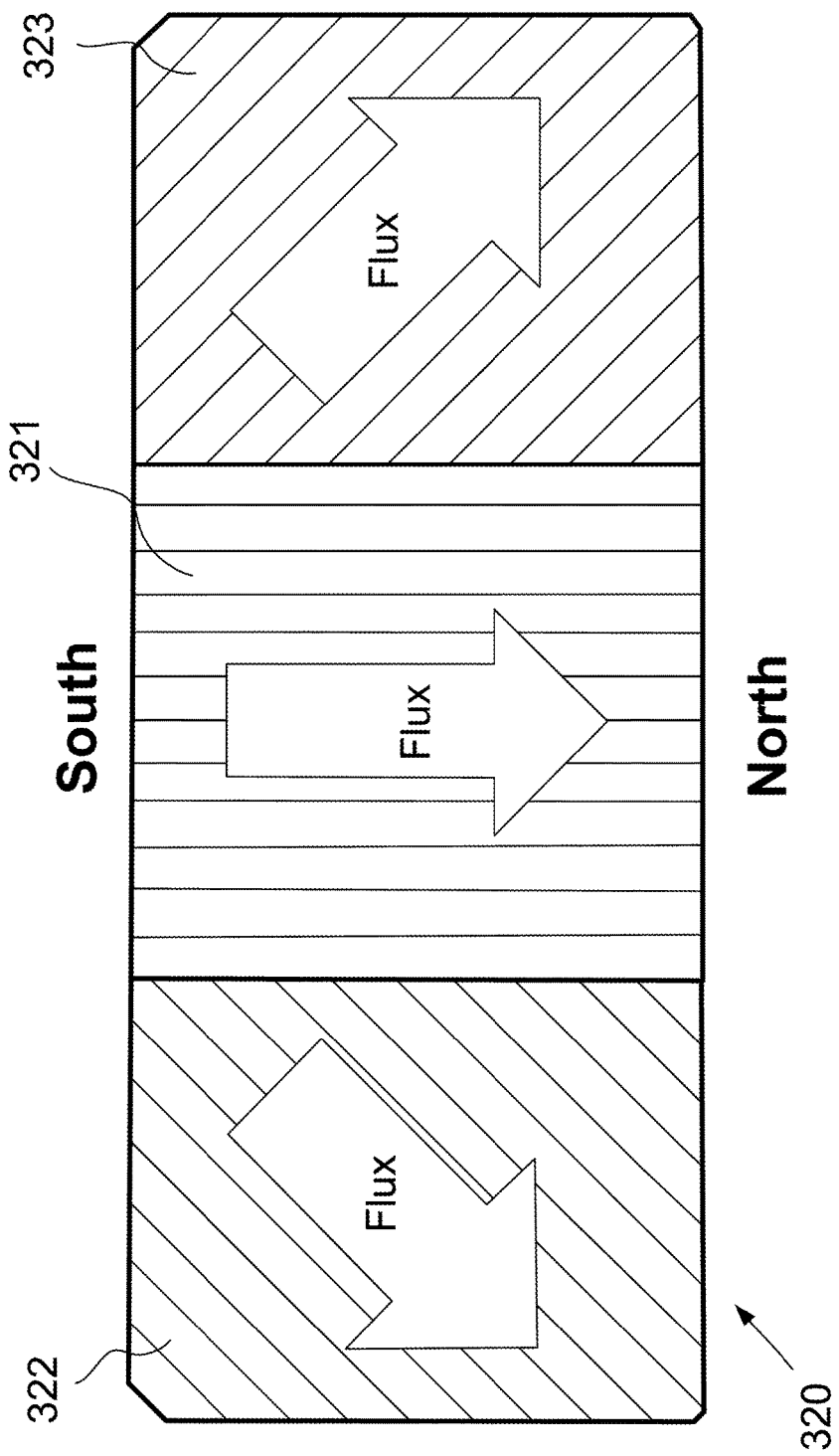
FIG. 4 is a schematic cross-sectional view of a south pole flux focusing magnet assembly according to an embodiment.

FIG. 4 schematically illustrates a magnet assembly 320 similar to that illustrated in FIG. 3 except that the polarity is reversed, i.e. magnet assembly 320 is a south pole magnet assembly, in which central magnet 321 has an angle of polarization opposite a nominal flux direction. In this arrangement, the flux of central magnet 321 is oriented to be directed downward (relative to magnet assembly 320), and splitter magnets 322 and 323 are arranged on each side of the central magnet and oriented at a 45° angle away from the angle of polarization of central magnet 321, as shown. The top face of magnet assembly 320 has a magnetization of south while the bottom face of magnet assembly 320 has a magnetization of north. The orientation of the poles in magnets 321, 322, and 323, in combination with the orientation of the angle of polarization of splitter magnets 322 and 323, results in magnetic flux from splitter magnets 322 and 323 directed angularly away from central magnet 321, and downward (relative to magnet assembly 320) from the north pole face of magnet assembly 320.

The amount of useful flux contributed by splitter magnets of flux focusing magnet assemblies such as those shown in FIGS. 1, 3, and 4, is greater than the amount of useful flux that would be contributed by straight-polarity magnets of the same dimensions, because the cross-sectional area normal to the angle of polarization of the splitter magnets is greater than the cross-sectional area normal to the angle of polarization of a straight polarity magnet of the same dimensions.

In any given application of a flux focusing magnet assembly, such as assembly 20 in FIG. 1, the angle of polarization of splitter magnet 22 (and optionally splitter magnet 23) in magnet assembly 20 may be anything less than 90° greater than or less than the angle of polarization of central magnet 21, i.e. converging, so as to direct flux angularly toward the flux emanating from central magnet 21 (for a north pole flux focusing magnet assembly) or away from the flux entering central magnet 21 (for a south pole flux focusing magnet assembly).

The dimensions and angle of polarization of central magnet 21 and splitter magnet 22 (and/or splitter magnet 23) can be adjusted to shape the flux field generated by magnet assembly 20. For example, in an electromagnetic machine having one rotor and one stator, wherein a plurality of magnet assemblies 20 are mounted on the rotor, the circumferential width and angle of polarization of splitter magnets 22 and/or 23 can be adjusted to shape the flux field across the gap between the rotor and the stator (as described in more detail below) so as to minimize total harmonic distortion and produce a sinusoidal electrical waveform. The same characteristics of splitter magnets 22 and 23 can also be adjusted to maximize peak flux density in applications where that particular property is desirable. Persons skilled in the art will understand how to adjust the relative dimensions and angle of polarity of the individual segments of flux focusing magnet assembly 20 to optimize the desired characteristics and achieve a useful configuration for a given application. Such configurations may include, by way of example only, a splitter magnet 22 that is wider than central magnet 21 (and optional splitter magnet 23) or a splitter magnet 22 having the same width as splitter magnet 23, where both splitter magnet 22 and 23 are narrower but taller than central magnet 21.

Additional examples of relative shapes and sizes of central magnets 21 and splitter magnets 22, 23 in various configurations of flux focusing magnet assembly 20 with three magnets are shown schematically in FIGS. 5A-5F. Each of the illustrated configurations includes a main or central magnet 21 and splitter magnets 22, 23 disposed laterally on opposite sides of central magnet 21. Although not indicated in the figures, each of splitter magnets 22, 23 has a nominal flux axis that converges towards the other, and toward the nominal flux axis of central magnet 21. As can be seen from FIGS. 5A-5F, the size and shape of each of the magnets can vary considerably. For example, in the magnet assembly illustrated in FIG. 5A, each of the magnets is approximately the same size, and of constant (though different) cross section in the lateral and longitudinal directions, whereas FIG. 5D illustrates that the magnets can be of constant cross section but that central magnet 21 may be significantly larger than splitter magnets 22, 23. FIGS. 5B and 5F illustrate that magnet assembly can vary in thickness (perpendicular to the pole face, indicated by N or S) along the lateral direction. FIG. 5B further illustrates that splitter magnets 22, 23 may have lateral faces or sides that are not perpendicular to the pole face of magnet assembly 20. Optionally, the lateral faces of splitter magnets 22, 23 may be approximately parallel to their nominal flux axes. FIGS. 5C and 5E illustrate that the cross sections of the central and/or splitter\magnets may vary in the longitudinal direction. The illustrated configurations are merely illustrative, and are not meant to be limiting. The illustrated variations in relative sizes and geometries of central and splitter magnets are equally applicable to magnet assemblies with two, or four or more magnet, and are not limited to the illustrated three-magnet assemblies.

Figure 6B:
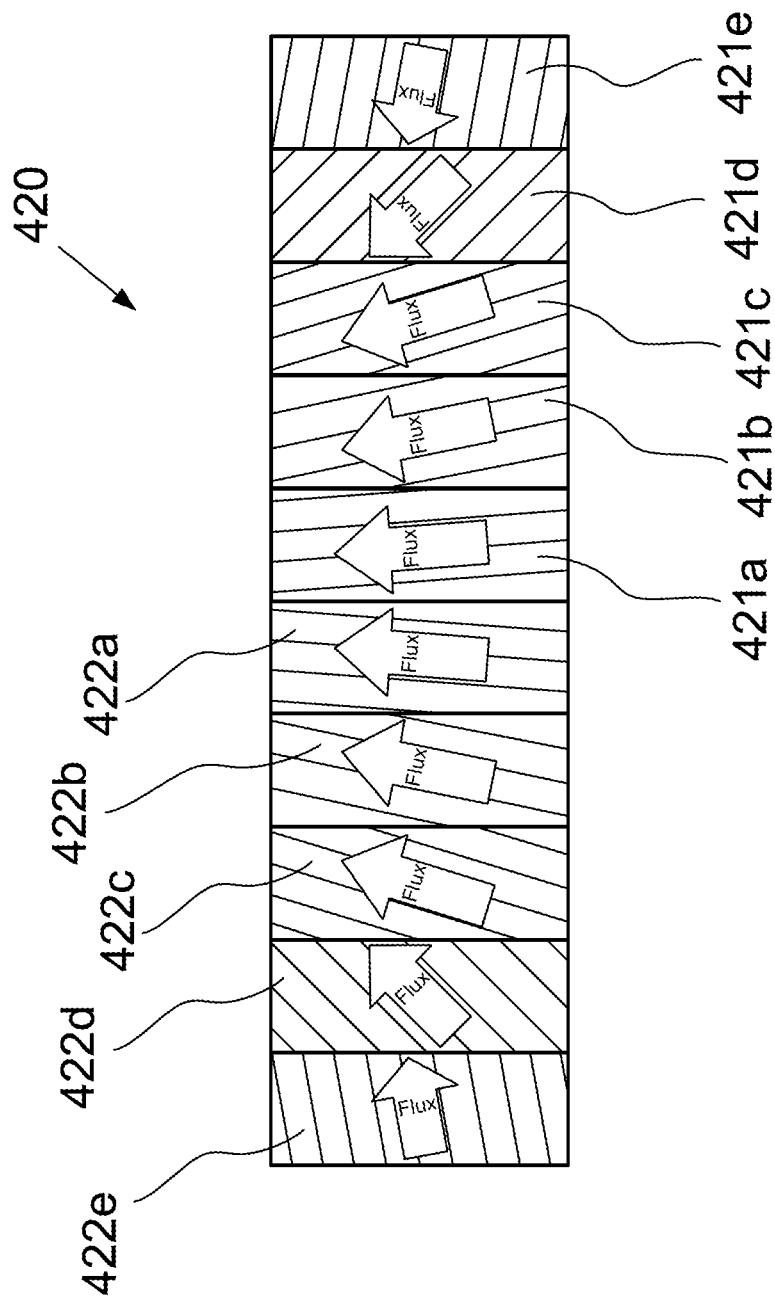
FIG. 6B is a schematic cross sectional view of the assembly taken along line 6B-6B of FIG. 6A.

As noted above, a flux focusing magnet assembly can have more than three magnets. In such arrangements, the angle of polarization, or the orientation of the nominal flux axis, of each segment may be altered marginally in a step-wise fashion from one adjacent segment to another, and ranging between a magnetic angle of polarization of 0° relative to the nominal flux direction at the central magnet up to anything less than 90° greater than or less than the nominal flux direction for the magnets on the edges of the magnet assembly. For example, as shown in FIGS. 6A and 6B, magnet assembly 420 includes magnet segments 421a and 422a, which are positioned immediately adjacent to the center of magnet assembly 420, have angles of polarization slightly less than and slightly greater than the nominal angle of polarization, respectively. Each successive magnet segment 422 (i.e. 422b, 422c, 422d, 422e) has an angle of polarization greater than the magnet segment immediately preceding it, while each successive magnet segment 421 (i.e. 421b, 421c, 421d, 421e) has an angle of polarization less than the magnet segment immediately preceding it. Magnet assembly 420 is shown in FIGS. 6A and 6B with ten magnet segments for purposes of illustration only; magnet assemblies may have any number of individual magnet segments.

Figure 7B:
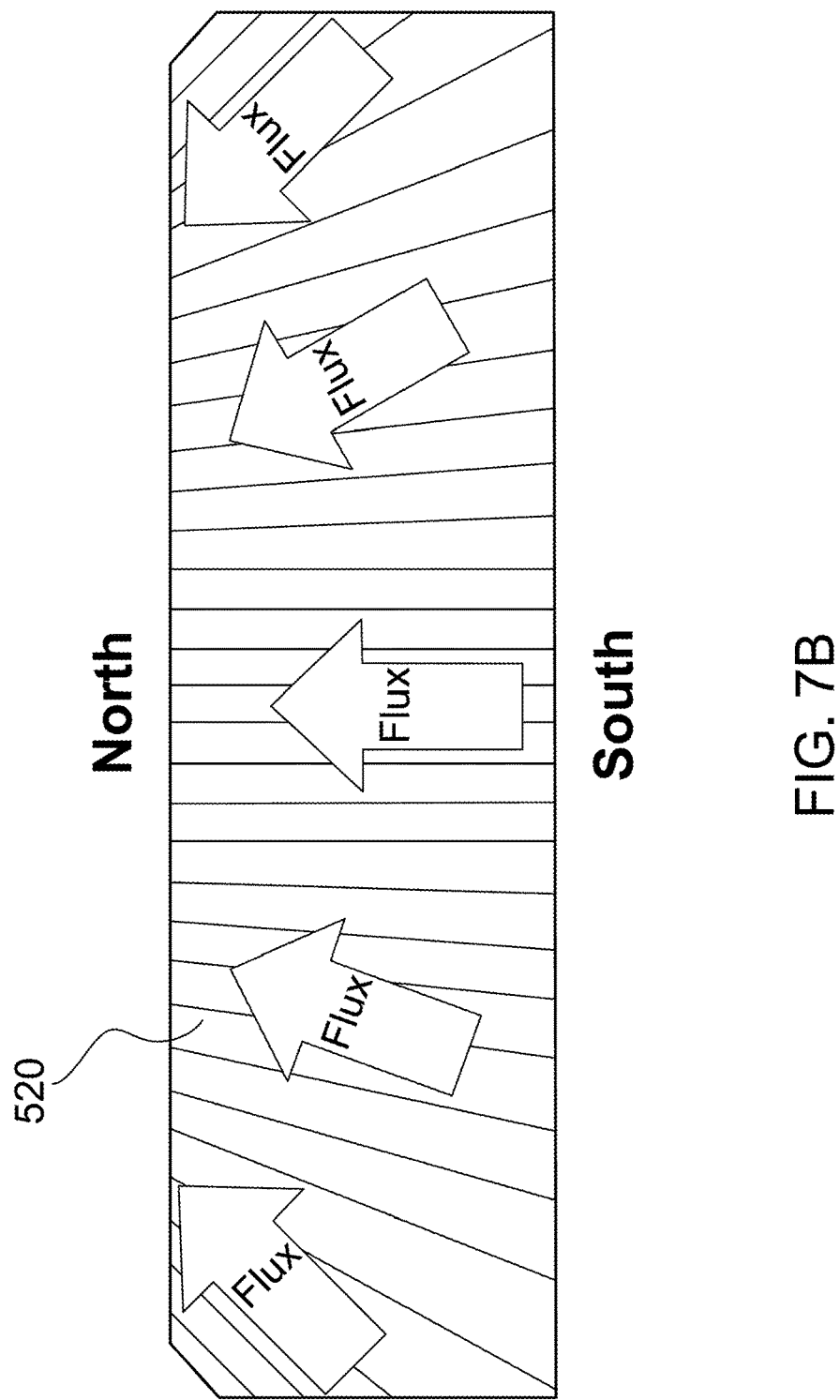
FIG. 7B is a schematic cross sectional view of the assembly taken along line 7B-7B of FIG. 7A.

Alternatively, a flux focusing magnet assembly may be formed from a single magnet segment. An exemplary embodiment is shown in schematic perspective view in FIG. 7A and in cross section in FIG. 7B. As shown in FIG. 7B, magnet assembly 520 has a single segment, in which the magnetic domains of the magnet material are not aligned parallel to one another. Magnet assembly 520 has a variable magnetic angle of polarization or nominal flux axis relative to a top surface of magnet assembly 520 from the center to the edges. The variation in the magnetic angle of polarization for the magnet assembly 520 can range from 0° to anything less than 90° greater than or less than the nominal angle of polarization so that flux emanating from the side portions of magnet assembly 520 is directed angularly toward the flux emanating from the center portion of magnet assembly 520 at the nominal angle of polarization (for a north pole flux focusing magnet assembly) or away from the flux emanating from the center portion of magnet assembly 520 at the nominal angle of polarization (for a south pole flux focusing magnet assembly).

Figure 8:
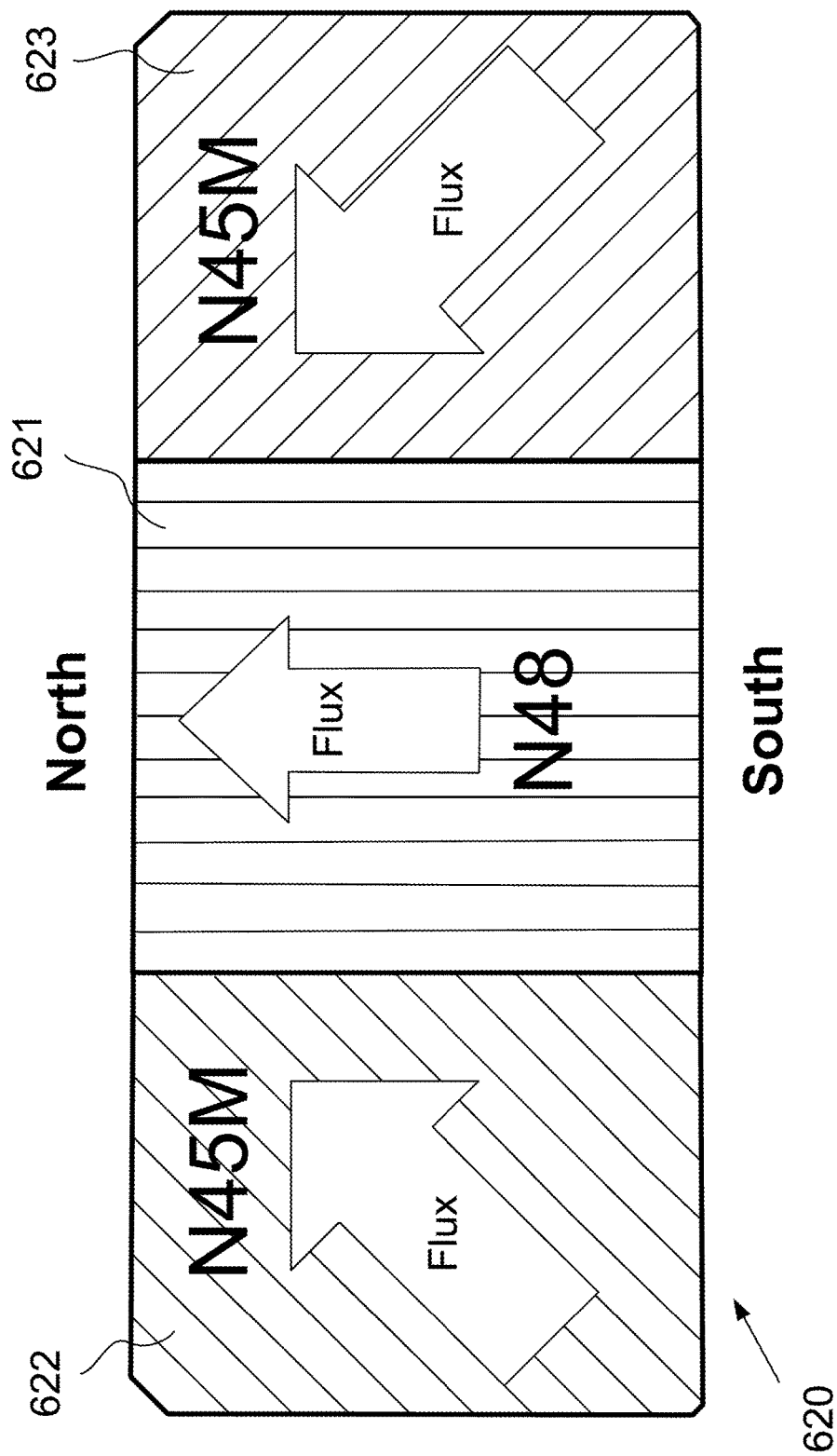
FIG. 8 is a schematic cross sectional view of an embodiment in which the central magnet has a different rating than that of the splitter magnets.

Beneficial flux concentrations can also be achieved by utilizing magnets of different performance specification for the central permanent magnet and the splitter magnets. For example, in the case of neodymium-iron-boron (NdFeB) magnets, it is widely known to describe magnetic material performance by a rating for energy product and/or magnetic remanence Br as well as an operating temperature rating and/or coercivity rating. For example, a magnet with a rating of N48 provides a higher flux density in a given magnetic circuit than a magnet with a rating of N45, and a magnet with a rating of N45M has a higher coercivity than a magnet with a rating of N45. The cost of a magnet typically increases with its flux density rating and its coercivity rating. One advantage of the disclosed flux focusing magnet assembly designs is that the concentration of flux caused by the flux focusing arrangement enables the splitter magnets to have a lower flux density than the central magnet without significantly affecting the flux density of the magnet assembly overall. Another advantage is that the coercivity of the central magnet can be lower than the coercivity of the splitter magnets without compromising the overall effective coercivity of magnet assembly, which will remain at or near the level of coercivity of the splitter magnets. Thus, as shown in the exemplary embodiment in FIG. 8, flux focusing magnet assembly 620 can have a central magnet 621 with a rating of N45 and splitter magnets 622, 623 can have a flux rating of N45M. Due to the added flux path length of the splitter magnets, flux focusing arrangements such as magnet assembly 620 provide an improved loading condition in operation that can be expressed as a higher "net" coercivity or resistance to demagnetization than in a magnet arrangement where the angle of polarization of splitter magnets 622 and 623 is parallel to the angle of polarization of central magnet 621. These features allow for reductions in magnet cost without a corresponding reduction in overall performance, or an improved performance without an increase in cost. More generally, each of the magnets in the flux focusing magnet assemblies described herein can be different, whether in some performance specification, material, dimension, etc. from any or all of the other magnets.

Yet another advantage of the disclosed flux focusing magnet assembly designs is that the individual magnet segments need not be made of the same material. For example, the central magnet could be made of NdFeB, while the splitter magnets could be made of AlNiCo, SmCo, or another material. These materials are referenced solely for purposes of illustration; any suitable permanent magnet material can be used for the any one or more of the central magnet and the splitter magnets.

Returning to FIG. 1, magnet assembly 20 may optionally include a fourth magnet 24, which may be disposed adjacent an end of first magnet 21 (i.e. in a direction that is transverse or orthogonal to the lateral direction, which may be referred to as a longitudinal direction). The nominal flux axis of fourth magnet 24 may converge with, and may be coplanar or non-coplanar with, the nominal flux axis of first magnet 21. In the illustrated embodiment, the nominal flux axis of fourth magnet 24 converges with the nominal flux axis of first magnet 21 and the axes are approximately coplanar in a plane approximately parallel to the longitudinal direction. When included in a magnet assembly that includes a main magnet and one or more splitter magnets disposed laterally of the main magnet, a magnet disposed longitudinally of the main magnet may be referred to as a "pusher" magnet. Magnet assembly 20 may further optionally include a second pusher magnet 25 disposed on the longitudinally opposite end of magnet assembly 20 from pusher magnet 24. As with the splitter magnets, one or more additional pusher magnets (not shown) may be disposed on either or both ends of pusher magnets 24 and 25. For clarity, the splitter magnets of magnetic assembly 720 are not shown in these schematic views.

Figure 9A:
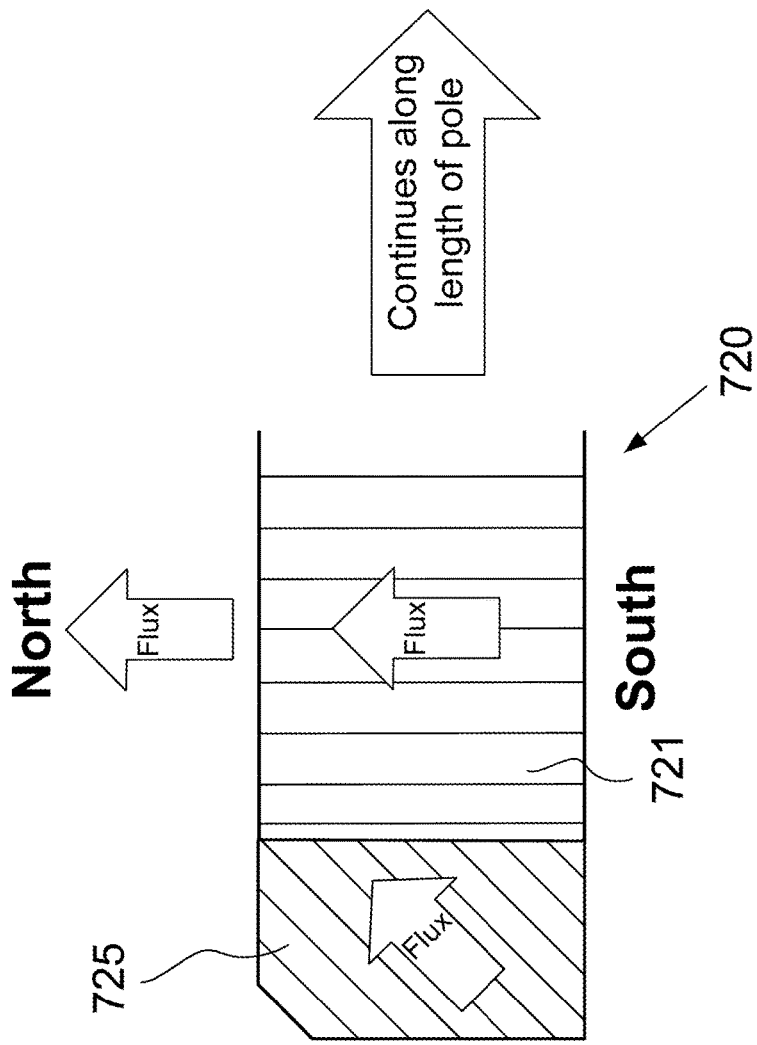
FIGS. 9A and 9B are schematic cross-sectional views of a flux focusing magnet assembly having two pusher magnets according to an embodiment.
Figure 9B:
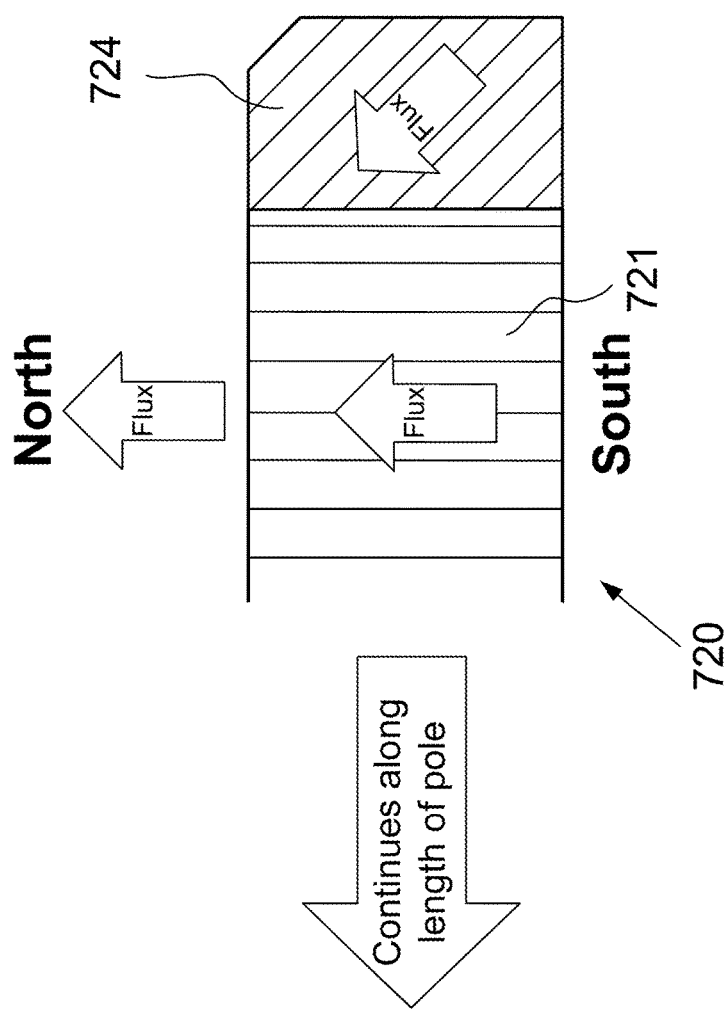

An exemplary magnet assembly 720 with central magnet 721 and pusher magnets 724, 725 is illustrated in schematic cross-section in FIGS. 9A and 9B. While each of magnets 721, 724, and 725 is illustrated as having a substantially rectangular cross section, this is merely for ease of illustration; skilled artisans will understand that the geometric cross section of a flux focusing magnet assembly will vary depending on the size and shape of its component magnets, as described in more detail below.

As shown in FIG. 9A, central magnet 721 has an angle or polarization or nominal flux direction that is in the nominal flux direction of magnet assembly 720, and pusher magnet 724 has an angle of polarization, or nominal flux axis, oriented to converge towards that of central magnet 21 above the top face of magnet assembly 720. Similarly, as shown in FIG. 9B, pusher magnet 725 has an angle of polarization, or nominal flux axis, oriented to converge towards that of central magnet 721 above the top face of magnet assembly 720. The top face of magnet assembly 720 in FIGS. 9A and 9B has a magnetization of north while the bottom face has a magnetization of south. The orientation of the nominal flux axes, and the polarity of the poles, of central magnet 121 and pusher magnets 724, 725, results in magnetic flux directed angularly toward the center of, and upward relative to, magnet assembly 720, from the north pole face of magnet assembly 7120. The magnetic angle of polarization of magnets 721, 724 and 725 determines how much flux each contributes to the useful flux density above the north pole face of magnet assembly 720.

In the illustrated embodiment, pusher magnet 724 has an angle of polarization of plus 45° relative to the nominal flux direction or nominal flux axis of central magnet 721, and pusher magnet 725 has an angle of polarization of minus 45° relative to the nominal flux direction. The angle of polarization of pusher magnets 724 and 725, however, may be anything less than 90° greater than or less than the nominal angle of polarization of central magnet 721 so as to direct flux angularly toward the flux emanating from central magnet 721 (for a north pole flux focusing magnet assembly) or away from the flux emanating from central magnet 721 (for a south pole flux focusing magnet assembly).

Pusher magnets achieve a result similar to that of splitter magnets, but in a different direction: splitter magnets constrain leakage flux off the sides of a flux focusing magnet assembly, whereas pusher magnets 44 and 46 constrain leakage flux off the ends of the magnet assemblies. Also, while splitter magnets can be used to shape the flux distribution across the width of a magnet assembly, pusher magnets can be used to shape the flux distribution along the length of the magnet assembly.

Additional examples of relative shapes and sizes of central magnets 21, splitter magnets 22, 23, and a pusher 24 magnet in various configurations of flux focusing magnet assembly 20 are shown schematically in FIGS. 10A-10D. Each of the illustrated configurations includes a main or central magnet 21, splitter magnets 22, 23 disposed laterally on opposite sides of central magnet 21, and a pusher magnet 24 or 25 disposed longitudinally on one end of central magnet 21. Although not indicated in the figures, each of splitter magnets 22, 23 has a nominal flux axis that converges towards the other, and toward the nominal flux axis of central magnet 21 and magnet assembly 20. Similarly, each pusher magnet 24 or 25 has a nominal flux axis that converges towards the nominal flux axis of central magnet 21 and magnet assembly 20. As can be seen from FIGS. 10A-10D, the size and shape of each of the magnets can vary considerably. For example, in the magnet assembly illustrated in FIGS. 10A and 10B, each of the magnets is approximately the same size, and of constant (though different) cross section in the lateral and longitudinal directions, though in FIG. 10A the pusher magnet 25 is at one end of magnet assembly 20, whereas in FIG. 10B the pusher magnet 24 is at the opposite end of magnet assembly 20. In contrast, FIG. 10C illustrates that pusher magnet 25 can have the same thickness as the other magnets but have a triangular or tapered shape in plan view. Similarly, FIG. 10D illustrates that magnet assembly 20 can vary in thickness (perpendicular to the pole face, indicated by S) along the lateral direction. The illustrated configurations are merely illustrative, and are not meant to be limiting.

For magnet assemblies as described above having two or more magnets, the interfaces between the constituent magnets may be of any one or more of a variety of geometries or types, including mitered, lapped, and variable.

As discussed above, beneficial flux concentrations and distributions can also be achieved by utilizing magnets of different performance specification or of different materials in magnet assembly 20 having one or more pusher magnets 24, 25. More particularly, splitter magnets 22 and 23, and/or pusher magnets 24 and/or 25 can have a different rating than central magnet 21 for any one or more characteristics such as energy product, magnetic remanence, operating temperature, and coercivity. Each of central magnet 21, splitter magnets 22 and 23, and/or pusher magnets 24 and 25 may be made from the same magnetic material, or from two or more different magnetic materials. Further, the relative dimensions of central magnet 21, splitter magnets 22 and 23, and pusher magnets 24 and 25 may be varied to achieve a beneficial flux concentration and distribution for a given application. Each of the above variations may be further be beneficial for reducing the cost and/or improving the overall performance of magnet assembly 20.

As discussed above, each of magnets 21, 23, 23, 24, 25 (and any of the additional magnets described above but not shown in FIG. 1) may be a distinct, separate magnet. Alternatively, any two or more, or all of, the magnets may be a region or portion of a single magnet, in which region the magnetic domains are aligned parallel to the respective nominal flux axis of the region.

For the north pole flux focusing magnet assemblies described above (other than assembly 220), the corresponding south pole configuration is not shown or described, but would not differ structurally from the configuration of the north pole as described above. The flux paths of the corresponding south pole magnet assemblies, however, are directly opposite the flux paths of the north pole magnet assemblies depicted in those figures.

As also shown in FIG. 1, magnet assembly 20 may optionally include a lens 28, disposed adjacent to the magnet(s). Lens 28 may be formed of a ferromagnetic material having a relatively high magnetic permeability, which enables lens 28 to contain flux from the interfacing magnets in magnet assembly 20 at a higher flux density than the constituent magnets 21, 22, 23, 24, and/or 25 themselves. The shape of lens 28 may be varied so that the combined flux at the pole face of magnet assembly 20 can be concentrated to a desired flux density. Lens 28 can also be used to control the density distribution over the entire pole face of magnet assembly 20, so as to ensure that a greater percentage of the total flux is available for use. Depending on the application in which magnet assemblies 20 is being used, the shape of lens 28 can be optimized to minimize leakage flux, or to achieve a desirable combination of reduced leakage flux and flux density distribution.

The use of a ferromagnetic lens 28 with flux focusing magnet assemblies helps achieve beneficial flux concentrations. Additionally, the flux field shape and harmonics created by flux focusing magnet assemblies 20 can be manipulated by shaping the pole face of the lens 28, e.g. to be planar, convex, concave, etc., as discussed in more detail below. When flux focusing magnet assemblies are used in electromagnetic machines, these characteristics affect the voltage and current waveforms of those machines.

Figure 11:
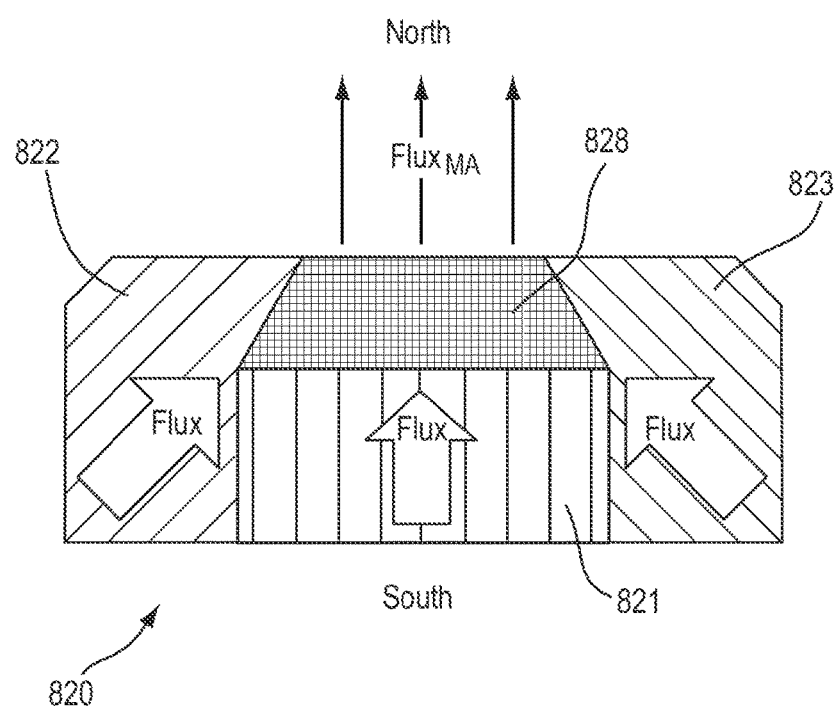
FIG. 11 is a schematic cross-sectional view of a north pole flux focusing magnet assembly having splitter magnets and a lens according to an embodiment.
Figure 12:
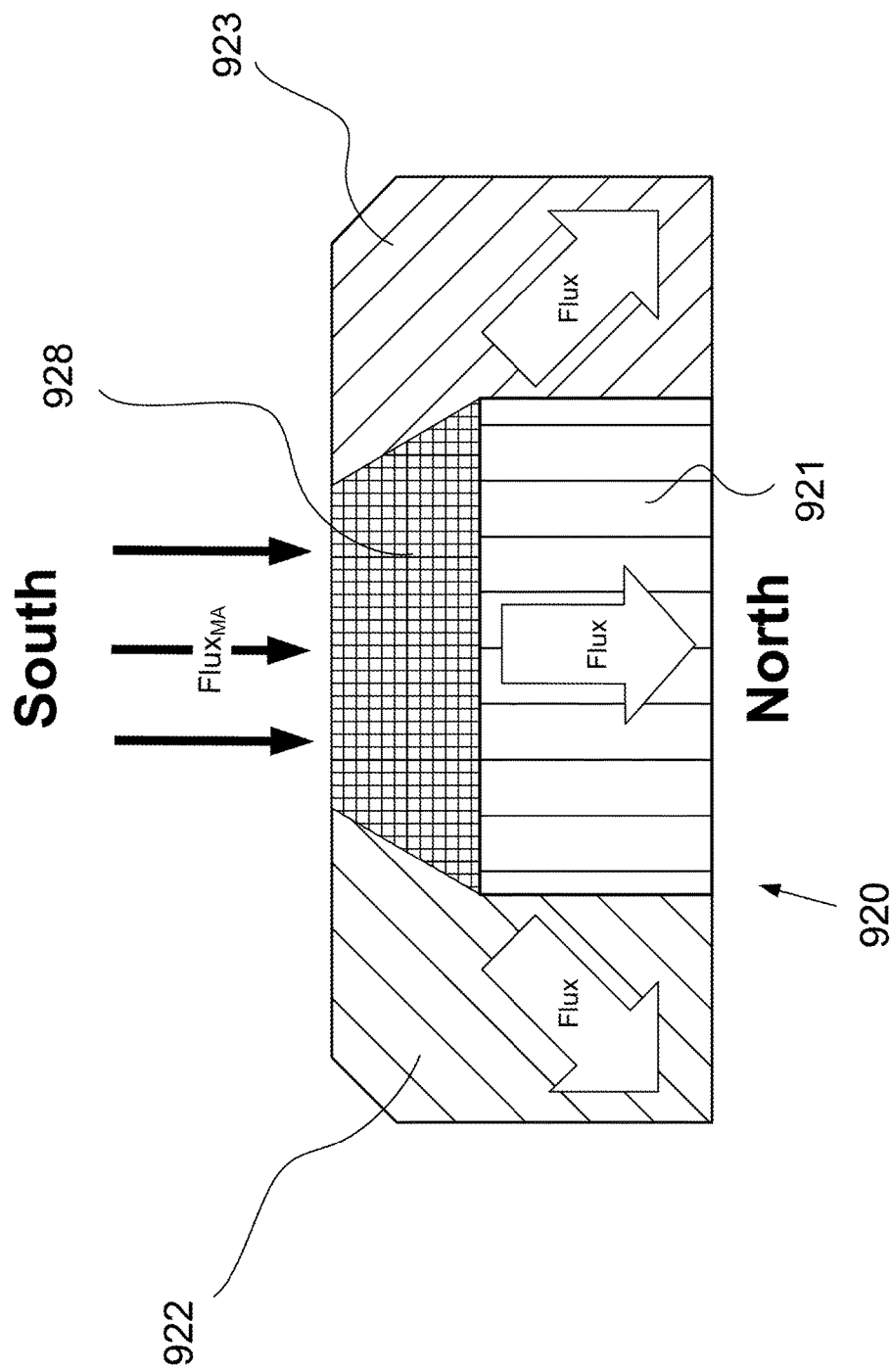
FIG. 12 is a schematic cross-sectional view of a south pole flux focusing magnet assembly having splitter magnets and a lens according to an embodiment.
Figure 13A:
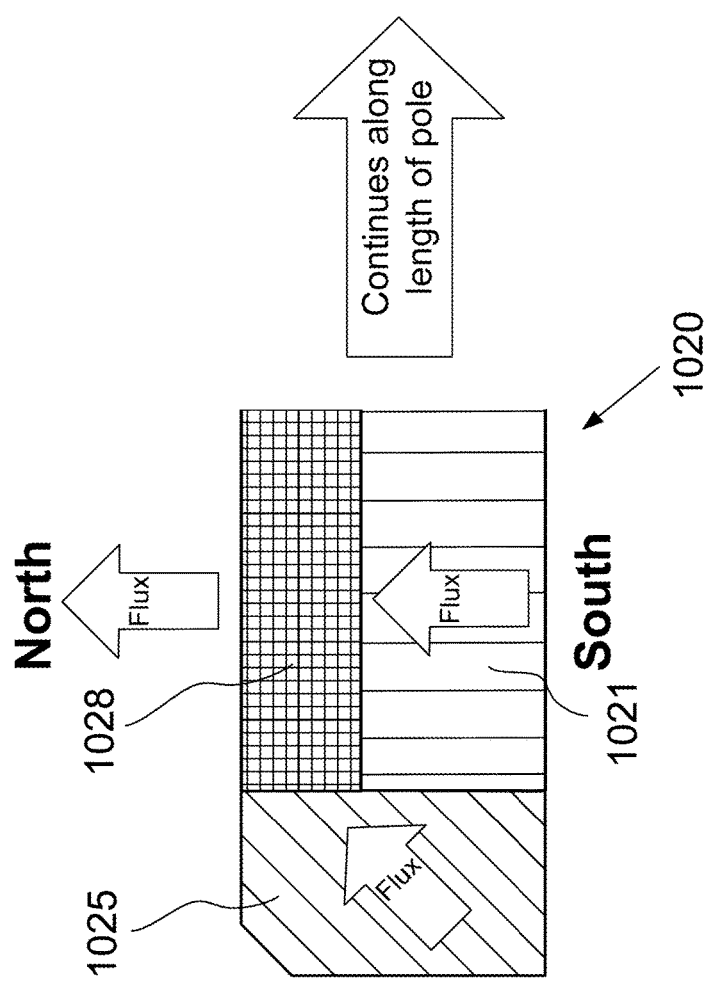
FIG. 13A and 13B are schematic cross-sectional views of a flux focusing magnet assembly having two pusher magnets and a lens according to an embodiment.
Figure 13B:
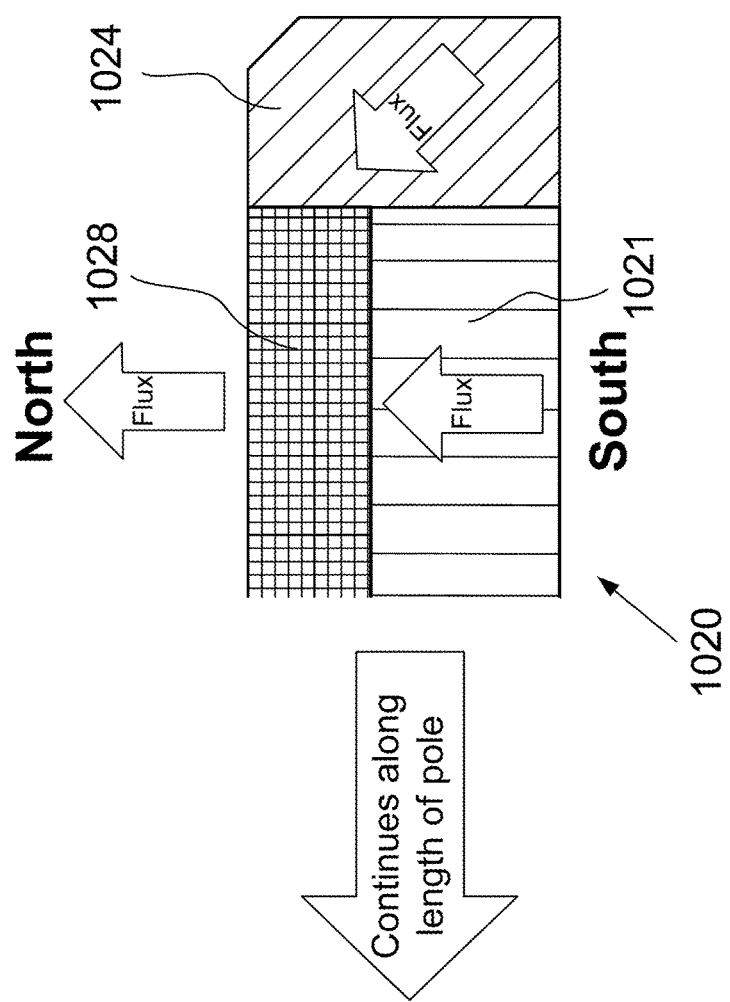

An exemplary arrangement of lens and magnets is shown schematically in FIG. 11. In this embodiment, splitter magnets 822 and 823 can be arranged to cover the edges of lens 828 so as to provide additional flux concentration at the magnet assembly face and to prevent flux leakage from the lateral faces of lens 828. FIG. 11 illustrates a north pole magnet assembly. The embodiment illustrated in FIG. 12 is similar, except that splitter magnets 922, 923, center magnet 921, and lens 928 form a south pole magnet assembly. Other variations in the geometry of the interface between splitter magnets and lens are possible; for example, in some embodiments, the lens may extend outward over the splitter magnets or the pusher magnet(s), while in other embodiments, the lens may be coterminous with the adjacent face of the central magnet. For example, FIG. 13A illustrates a magnet assembly 1020 in which lens 1028 is coterminous with the adjacent face of central magnet 1021, and abuts pusher magnet 1025. Similarly, FIG. 13B illustrates magnet assembly 1020 in which lens 1028 is coterminous with the adjacent face of central magnet 1021, and abuts pusher magnet 1024.

Figure 14:
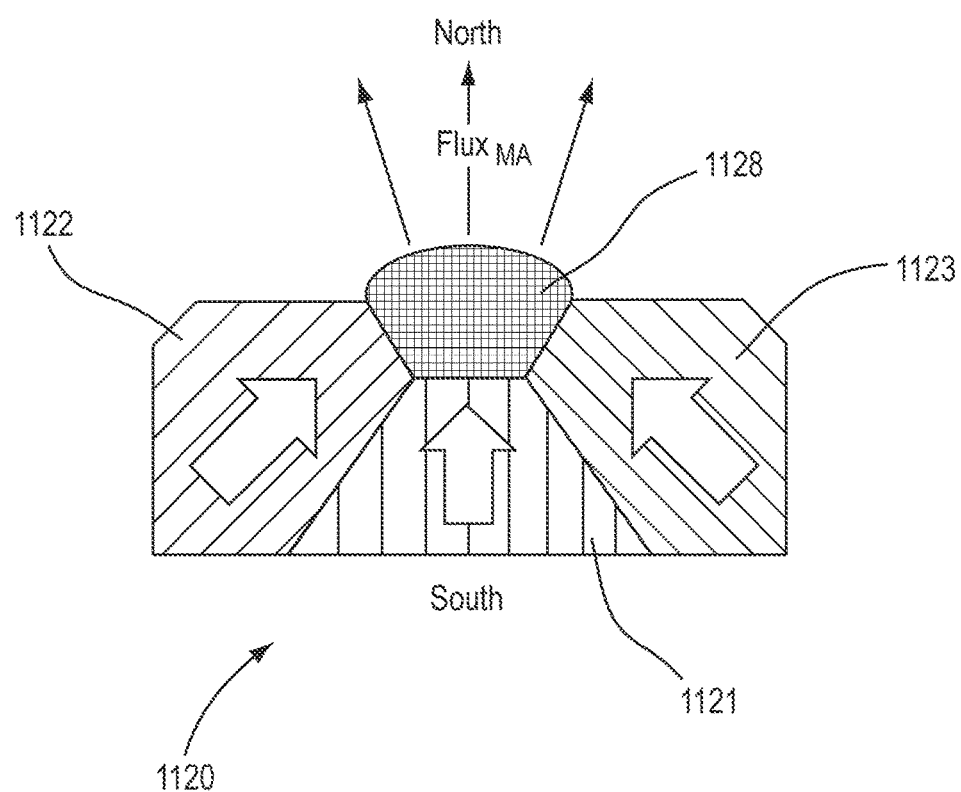
FIG. 14 is a schematic cross-sectional view of a flux focusing magnet assembly having a pusher magnet and a lens according to an embodiment.
Figure 24A:
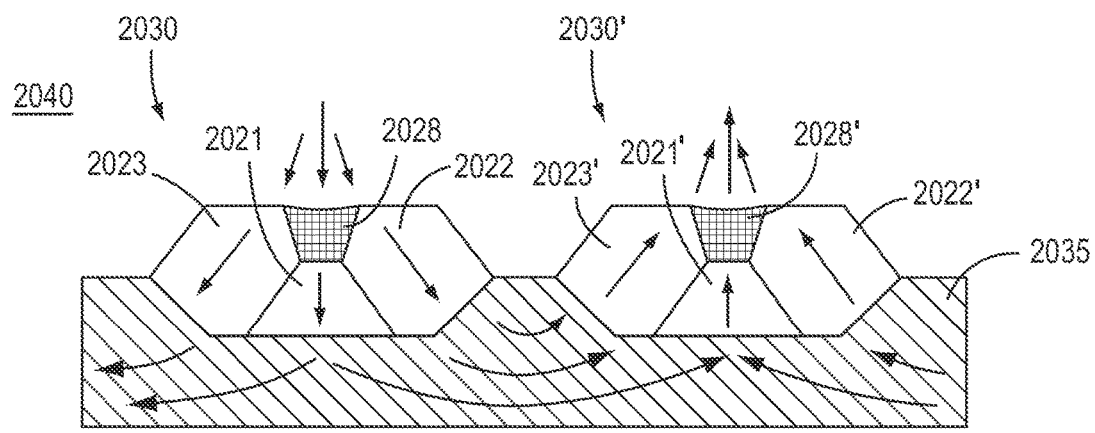
FIGS. 24A and 24B are schematic cross sections of magnetic assemblies with alternative back iron structures, according to additional embodiments.

Although the lens is shown in the preceding embodiments as being rectangular in cross-section, as mentioned above the lens can have other cross-sectional shapes. For example, as shown in FIG. 14, magnet assembly 1120 has a recess formed between splitter magnets 1122, 1123 above central magnet 1121. Lens 1128 is disposed in the recess, and has a convex upper surface, which further shapes the flux density above the face of the magnet, which in machine applications, for instance, may be leveraged to achieve greater torque density and/or reduced harmonic distortion. Alternatively, as shown in FIG. 24A below, the lens may have a concave upper surface.

Any flux focusing magnet assembly configuration can be used in conjunction with a ferromagnetic lens. The length and width of the lens can be the entire length and width of the magnet assembly with which it is used, or it can be centered predominantly over a central magnet, as shown in FIGS. 11 and 12. The size and shape of the lens can be optimized for any particular flux path or gap distance desired.

Additional examples of relative shapes and sizes of central magnets 21, splitter magnets 22, 23, and a pusher 24 magnet in various configurations of flux focusing magnet assembly 20 are shown schematically in FIGS. 15A-15E. Each of the illustrated configurations includes a main or central magnet 21, splitter magnets 22, 23 disposed laterally on opposite sides of central magnet 21, and a lens 28. Some configurations include a pusher magnet 24 or 25 disposed longitudinally on one end of central magnet 21. As can be seen from FIGS. 15A-15E, the size and shape of each of the magnets and of the lens can vary considerably. For example, in the magnet assembly illustrated in FIG. 10A, each of the splitter magnets 22, 23 is approximately the same size, and of constant cross section in the lateral and longitudinal directions, and central magnet 21 and lens 28 are also of constant cross section, but their collective thickness equals that of splitter magnets 22, 23. FIG. 15B illustrates that lens 28 can have the same width as central magnet 21 at their interface, and can increase in width towards the top face of magnet assembly 20. Conversely, FIG. 15E illustrates that central magnet 21 can narrow towards the interface with lens 128. FIG. 15D illustrates that lens 28 and central magnet 21 can have non-planar interfaces, i.e. can have thickness that vary, e.g. along the lateral direction. FIG. 15C illustrates that the interface between pusher magnet 25 and the other components of magnet assembly 20 can be non-planar. The illustrated configurations are merely illustrative, and are not meant to be limiting.

Figure 16:
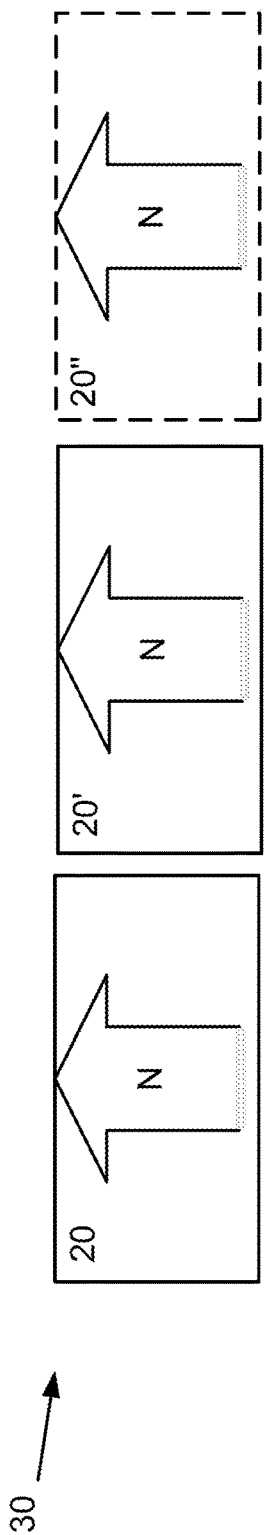
FIG. 16 is a schematic illustration of a pole assembly having at least two flux focusing magnet assemblies, according to an embodiment.

Multiple magnet assemblies can be placed end to end to form a pole assembly. FIG. 16 schematically illustrates a pole assembly 30 composed of two flux focusing magnet assemblies 20, 20'. Pole assembly 30 may include a third magnet assembly 20", or may have four or more magnet assemblies. In this embodiment, each of magnet assemblies 20, 20' is a north pole magnet assembly, and collectively define a "north pole" pole assembly 30. Alternatively, south pole magnet assemblies could be combined to form a "south pole" pole assembly. Each of the constituent magnet assemblies in a pole assembly may be of any of the configurations described above (e.g. formed from one, two, three or more magnets, with splitter magnet(s), pusher magnet(s), and/or a lens).

Various exemplary embodiments of pole assemblies are illustrated in FIGS. 17A-17F. FIG. 17A shows a south pole assembly 1130 formed of five identical flux focusing magnet assemblies 1120. FIG. 17B shows a north pole assembly 1230 formed of three central magnet assemblies 1220 each having a center magnet 1221 and splitter magnets 1222, 1223, and different end magnet assemblies 1220' (having a pusher magnet 1225') and 1220" (having a pusher magnet 1225" disposed on the longitudinally opposite end of pole assembly 1230 from pusher magnet 1224'). Pole assembly 1230 thus achieves the benefit of pusher magnets 1225', 1225". FIG. 17C further shows that a pole assembly 1330 can be formed of three identical magnet assemblies 1320 each having a lens 1328 (in addition to central magnet 1321 and splitter magnets 1322, 1323. Pole assembly 1330 thus realizes the benefits of a ferromagnetic lens. These figures are given by way of example only; a pole assembly may be comprised of any two or more individual flux focusing magnet assemblies, and persons skilled in the art will recognize and understand how to combine the individual flux focusing assemblies discussed herein into a pole assembly to achieve a desired set of characteristics for the intended application of the pole assembly.

As illustrated in FIGS. 17D and 17E, a pole assembly may be formed from a single elongate flux focusing magnet assembly, rather than multiple magnet assemblies. In the embodiment of FIG. 17D, pole assembly is formed of central magnet 1421, splitter magnets 1422, 1423, and pusher magnets 1424, 1425. FIG. 17E shows a similar pole assembly 1530, which includes splitter magnets 1522, 1523, pusher magnets 1524, 1525, and lens 1528. FIG. 17F further illustrates a pole assembly 1630 that is similar to pole assembly 1230 except that each magnetic assembly 1620, 1620' and 1620" includes a lens 1628, 1628' and 1628", respectively.

It is noted that the sections taken along lines B-B and C-C of FIG. 17B correspond to the cross-sectional views of magnet assembly 720 shown in FIGS. 9A and 9B, respectively. Similarly, the sections taken along lines L-L and M-M of FIG. 17F correspond to the cross-sectional views of magnet assembly 1020 shown in FIG. 13 and magnet assembly 1120 shown in FIG. 14, respectively.

Figure 18:
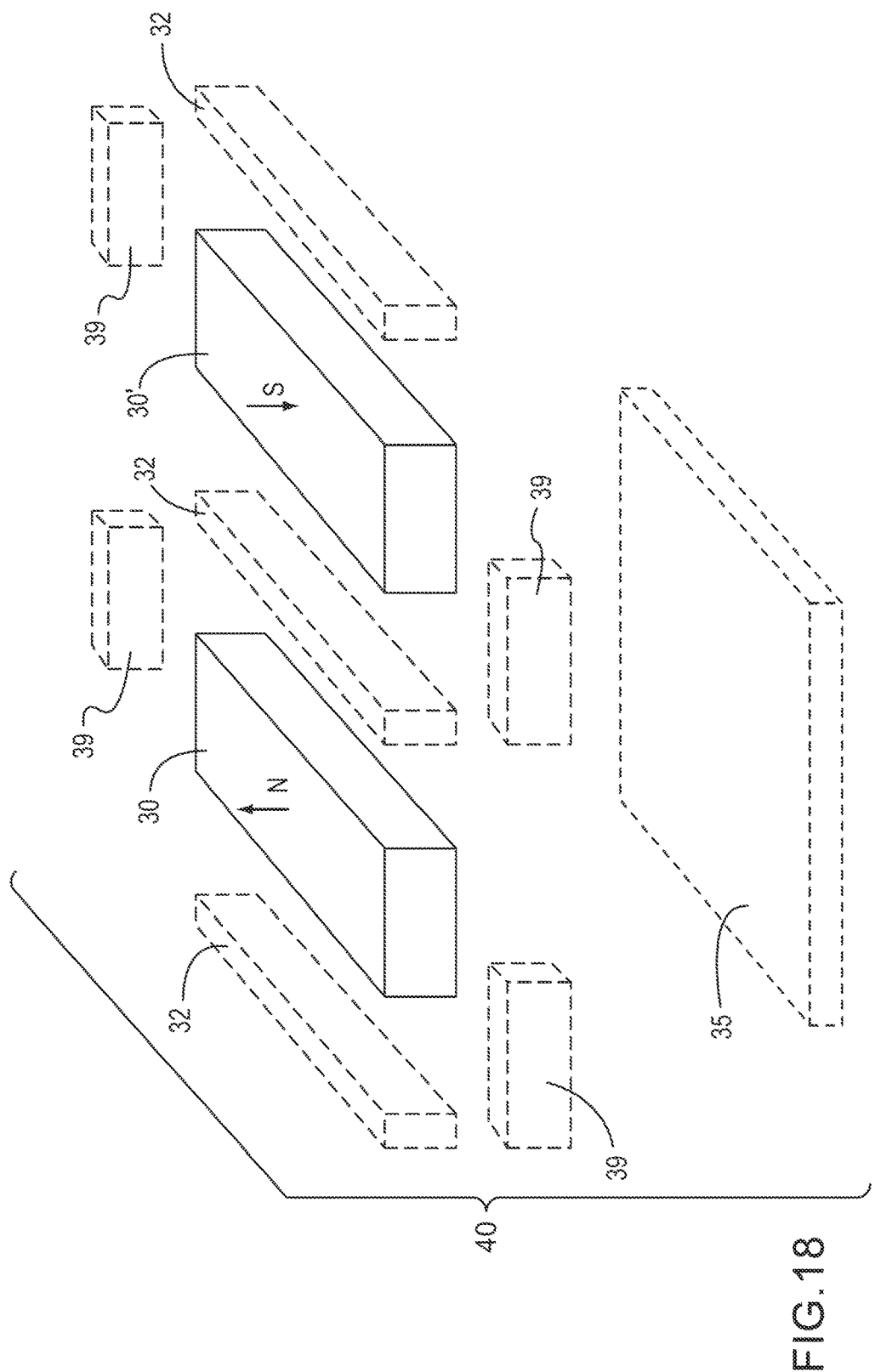
FIG. 18 is a schematic illustration of a magnetic assembly having two pole assemblies, according to an embodiment.

Multiple pole assemblies can be placed side by side to form a magnetic assembly. FIG. 18 schematically illustrates a magnetic assembly 40 composed of two pole assemblies, north pole assembly 30 and south pole assembly 30'. Optionally, magnetic assembly 40 may include a backing member 35 on which pole assemblies 30, 30' may be supported or disposed. Backing member 35 is preferably formed of a ferromagnetic material and may be referred to as a back iron. Backing member 35 can provide a return flux path for flux from each pole assembly, e.g. for the splitter magnets of each pole assembly to poles of adjacent pole assemblies of opposite polarity (not shown). Further, magnetic assembly may also include a side retaining member or insert 38 between pole assemblies 30, 30' and between adjacent pole assemblies (not shown). Further, magnetic assembly may include an end retaining member or insert 39 at one or both ends of pole assemblies 30, 30'.

Figure 19:
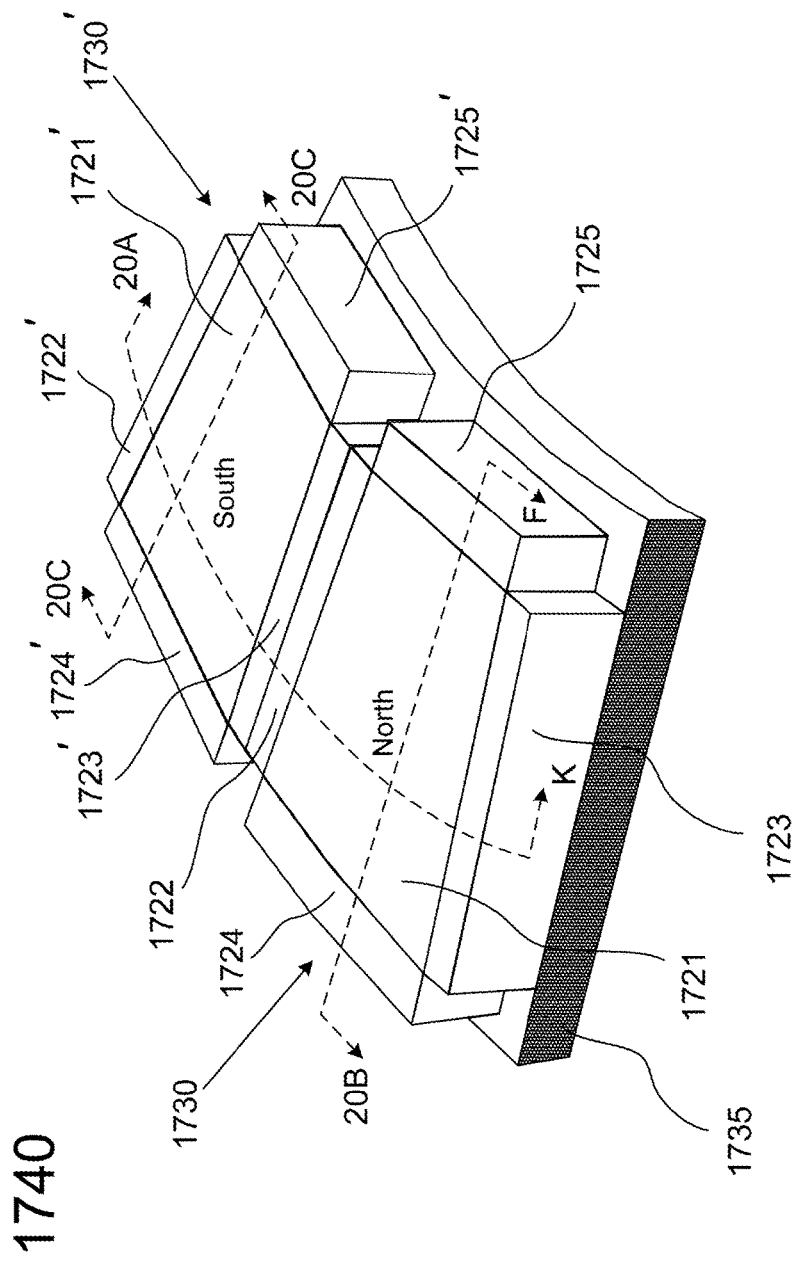
FIG. 19 is a schematic perspective view of a magnetic assembly having two pole assemblies, according to an embodiment.
Figure 20A:
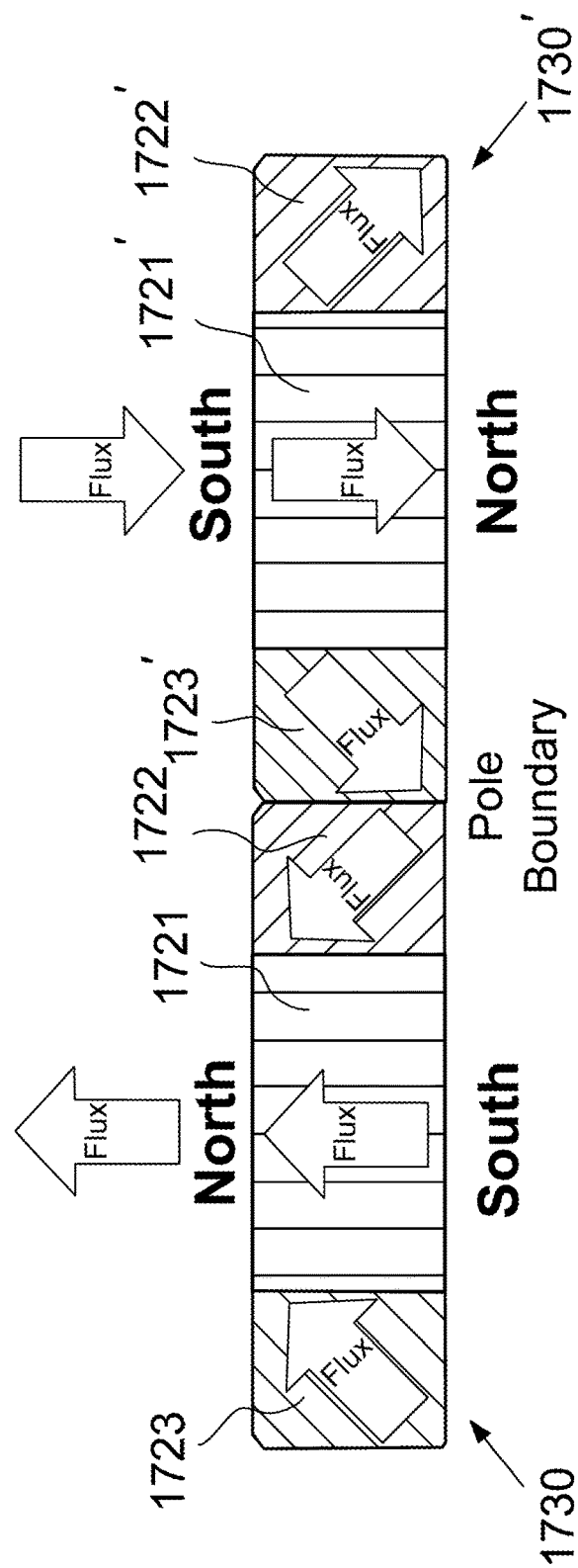
FIGS. 20A, 20B, and 20C are schematic cross-sectional views of the magnetic assembly of FIG. 19, taken along lines 20A-20A, 20B-20B, and 20C-20C, respectively.
Figure 20B:
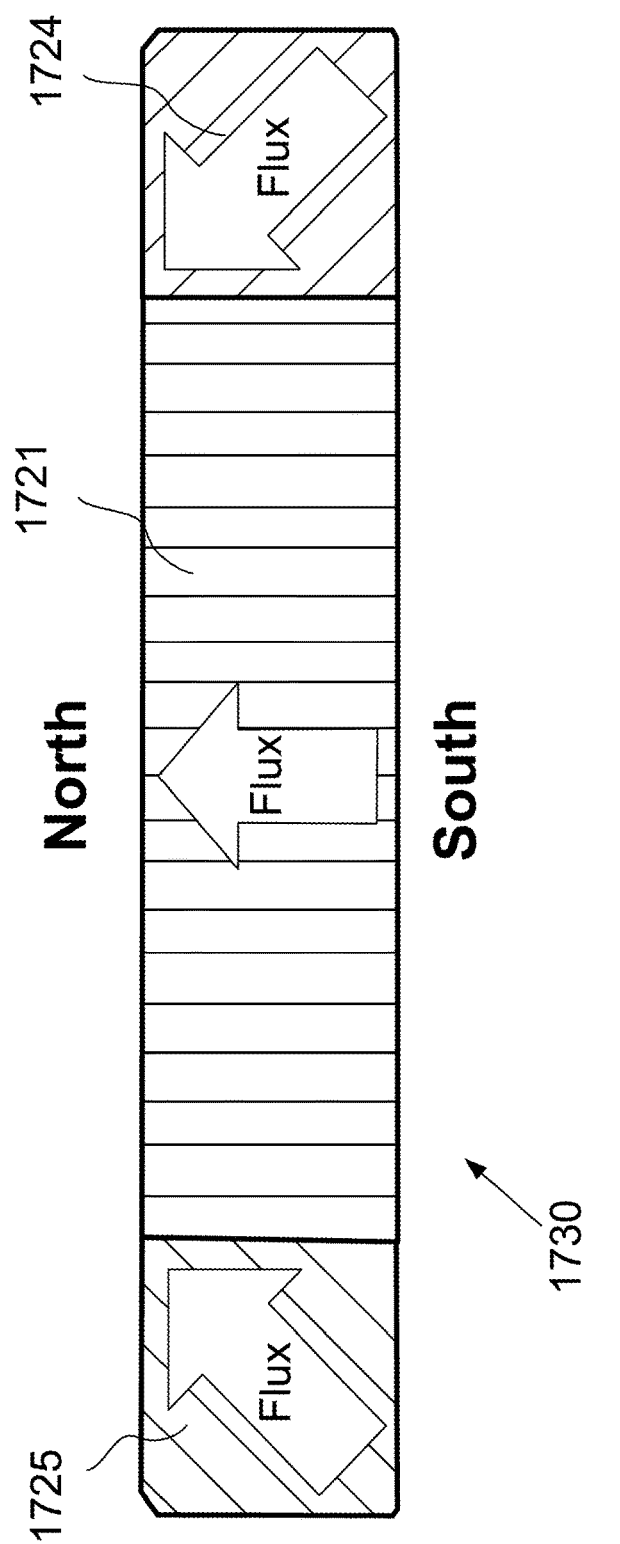
Figure 20C:
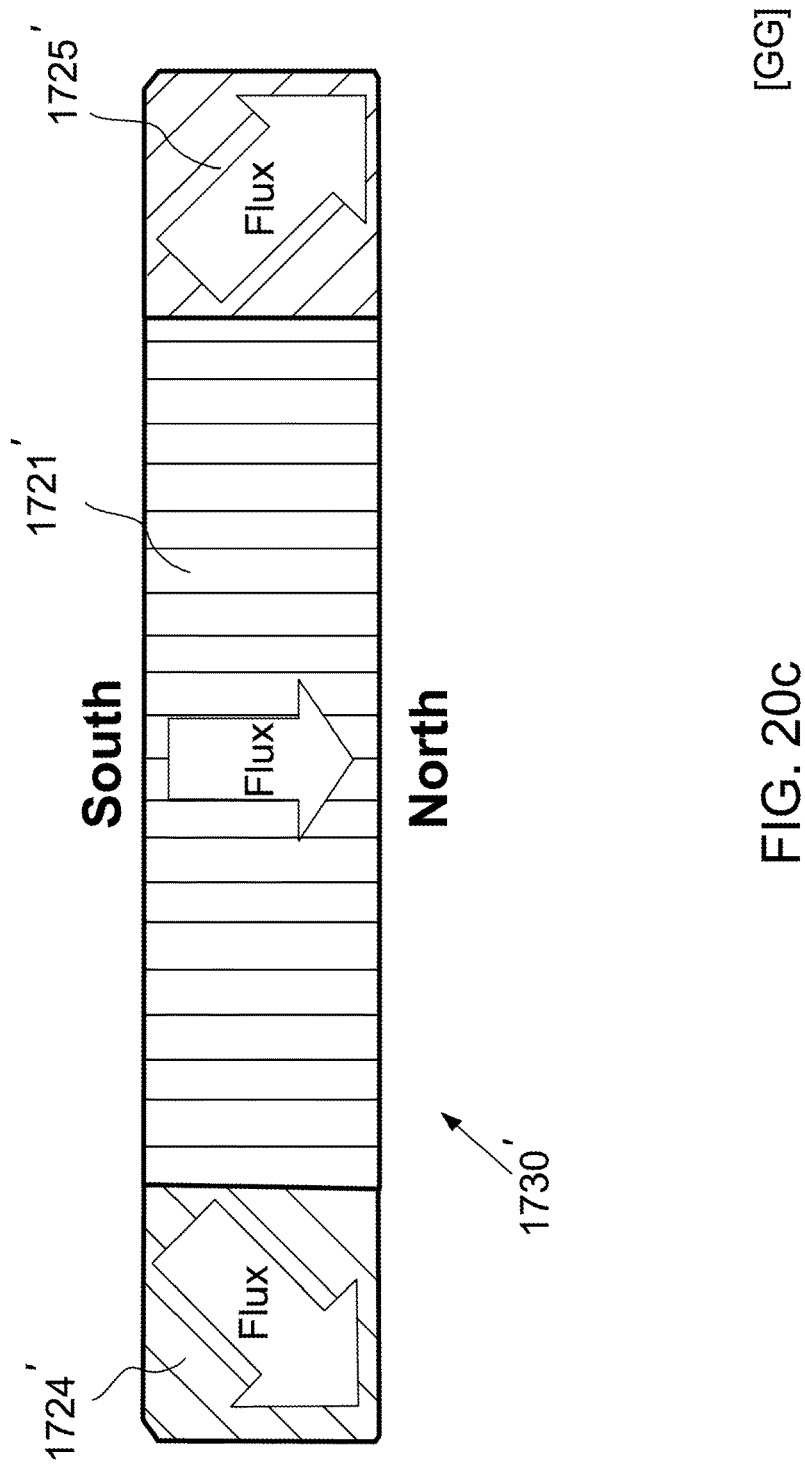

The pole assemblies in a magnetic assembly may or may not be separated by a spatial gap. For example, FIG. 19 illustrates a magnetic assembly 1740 having a back iron 1735 and a north pole assembly 1730 (with central magnet 1721, splitter magnets 1722, 1723, and pusher magnets 1724, 1725) and a south pole assembly 1730' (with central magnet 1721', splitter magnets 1722', 1723', and pusher magnets 1724', 1725') supported on back iron 1735. Each of the pole assemblies in this embodiment is shown as being formed from a single magnet assembly, rather than multiple magnet assemblies, but this is simply for ease of illustration and it is contemplated that each of the pole assemblies may be formed in any of the configurations described above. In this embodiment there is no spatial gap between the pole assemblies 1730, 1730' and they are thus in contact. Indeed, splitter magnet 1722 of the north pole assembly 1730 could even be affixed to splitter magnet 1723' of the south pole assembly 1730'. FIGS. 20A, 20B, and 20C show partial cross-sectional views of FIG. 19 (for simplicity of illustration, shown without back iron 1735), taken along lines 20A-20A, 20B-20B, and 20C-20C, respectively. As shown in FIGS. 20A-20C, the top and bottom faces of central magnet 1721 of the north pole assembly 1730 have a magnetization of north and south, respectively, while the top and bottom faces of central magnet 1721' of the south pole assembly 1730' have a magnetization of south and north. In pole assemblies 1730, 1730', splitter magnets 1722, 1723 and 1722', 1723', and pusher magnets 1724, 1725 and 1724', 1725', respectively, perform the same functions as described above for the various embodiments of magnet assemblies and pole assemblies that incorporate splitter magnets and pusher magnets.

Figure 22A:
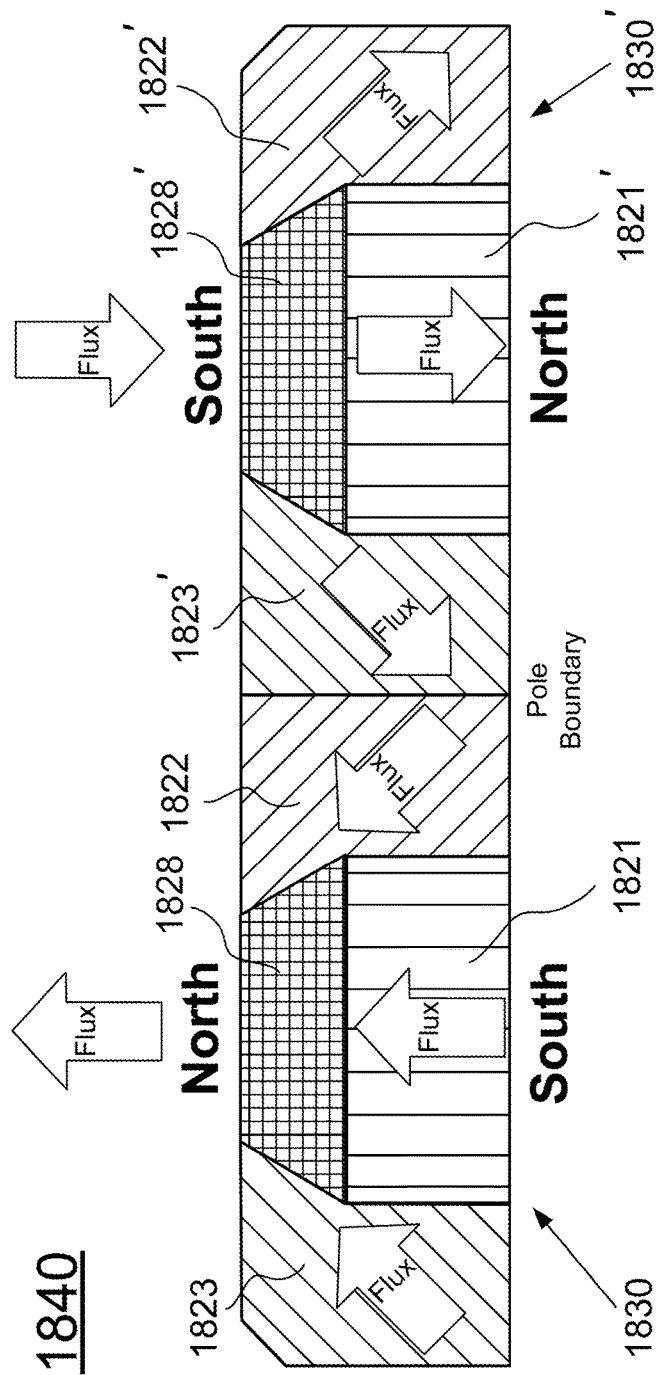
FIGS. 22A, 22B, and 22C are schematic cross-sectional views of the magnetic assembly of FIG. 19, taken along lines 22A-22A, 22B-22B, and 22C-22C, respectively.
Figure 22B:
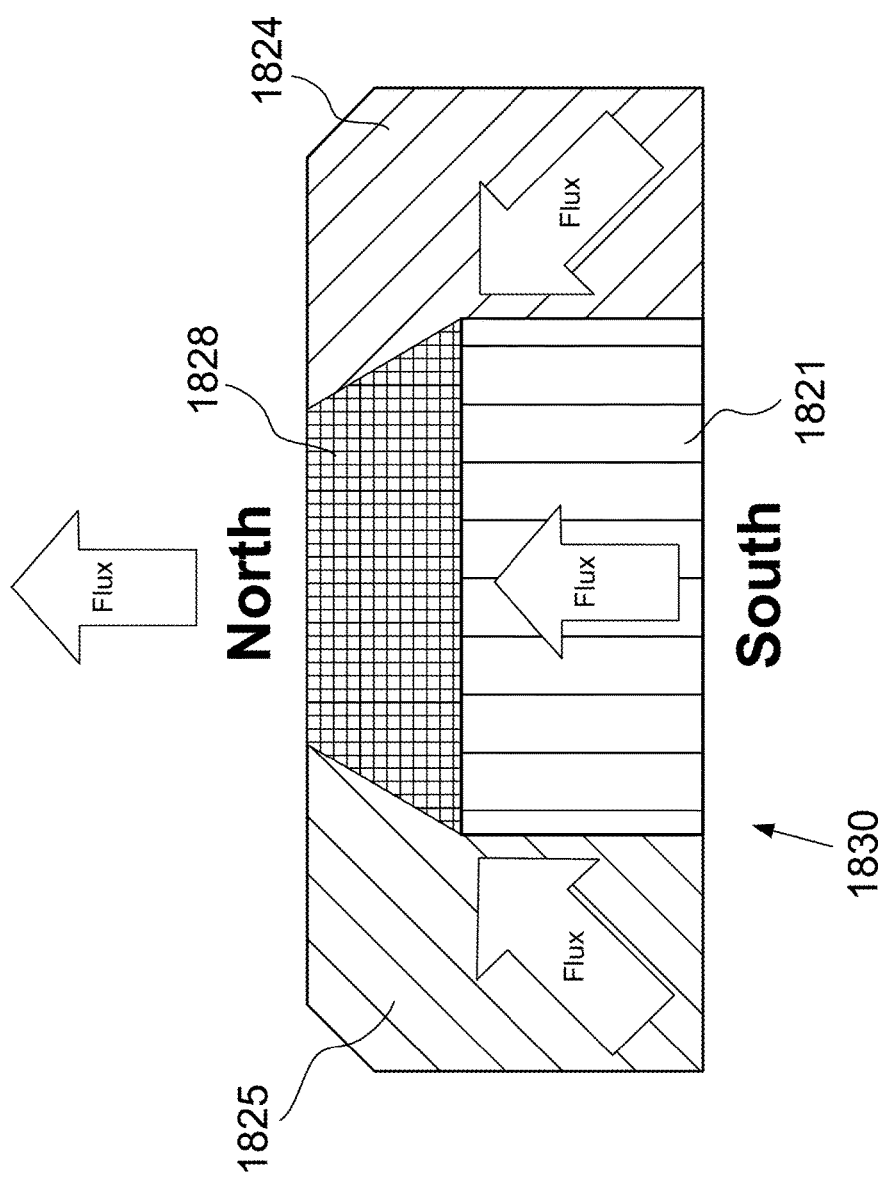
Figure 22C:
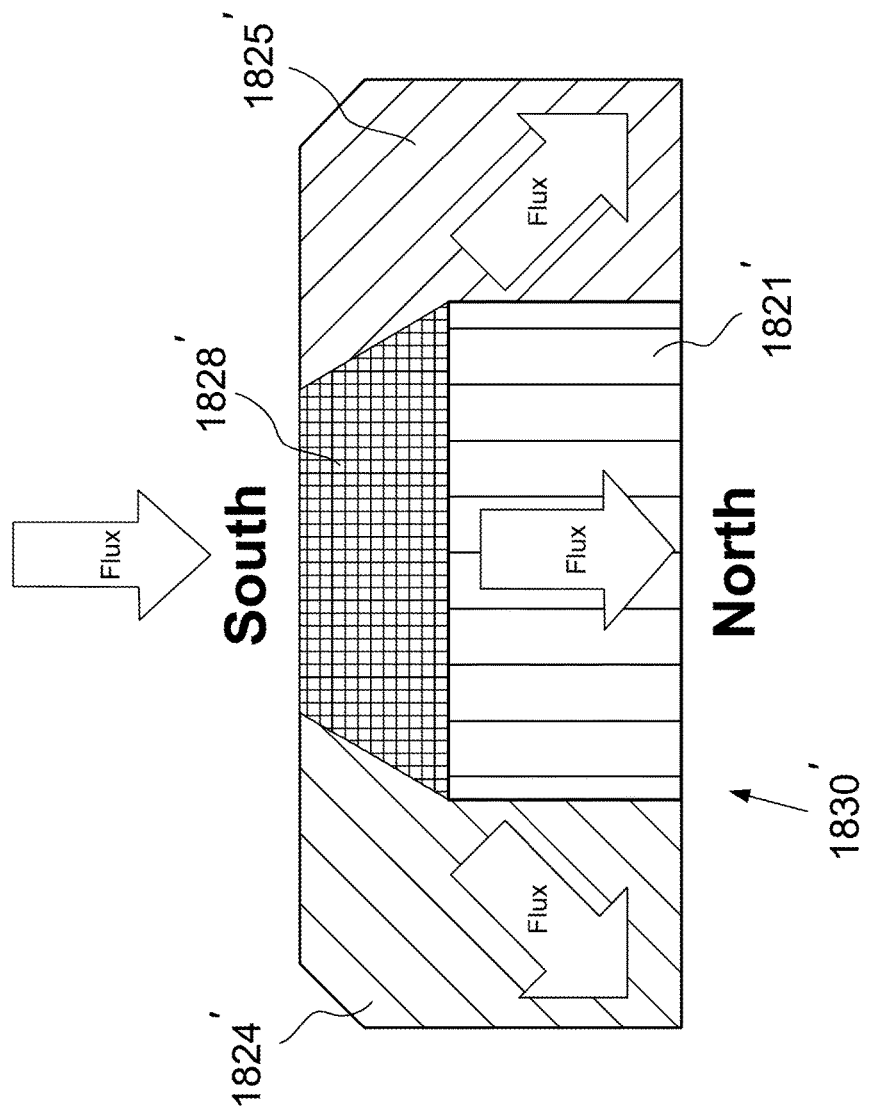

FIG. 21 illustrates another embodiment of a magnetic assembly 1840. Magnetic assembly 1840 has a back iron 1835 and a north pole assembly 1830 and a south pole assembly 1830' supported on back iron 1835. As with the previous embodiment, each of the pole assemblies in this embodiment is shown as being formed from a single magnet assembly, rather than multiple magnets, but this is simply for ease of illustration and it is contemplated that each of the pole assemblies may be formed in any of the configurations described above. Also in this embodiment there is no spatial gap between the pole assemblies 1830, 1830' and they are thus in contact. Unlike the previous embodiment, each of pole assemblies 1830, 1830' includes a lens 1828, 1828'. Further, magnetic assembly 1840 includes an end insert 1839 at each end of pole assemblies 1830, 1830', coupled to back iron 1835 (although shown as integrally formed with back iron 1835 in FIG. 21, end inserts 1839 could be formed separately from, and operatively coupled with, or disposed adjacent to, back iron 1835). FIGS. 22A, 22B, and 22C show partial cross-sectional views of FIG. 21 (again, for simplicity of illustration, without back iron 1835 or end inserts 1839), taken along lines 22A-22A, 22B-22B, and 22C-22C, respectively. As shown in FIGS. 22A-22C, the top and bottom faces of central magnet 1821 of the north pole assembly 1830 have a magnetization of north and south, respectively, while the top and bottom faces of central magnet 1821' of the south pole assembly 1830' have a magnetization of south and north. In pole assemblies 1830, 1830', splitter magnets 1822, 1823 and 1822', 1823', and pusher magnets 1824, 1825 and 1824', 1825', respectively, perform the same functions as described above for the various embodiments of magnet assemblies and pole assemblies that incorporate splitter magnets and pusher magnets.

As noted above in reference to FIG. 18, pole assemblies may be mounted on a back iron, and may be separated by ferromagnetic side inserts or retaining members, rather than being in contact with each other. Flux focusing magnet assemblies such as those described herein allow the use of thinner back irons than do conventional magnet assemblies. In general, as back iron thickness is reduced, the back iron's ability to carry flux diminishes, making flux saturation more likely. Saturation increases the reluctance of the magnetic circuit, and the resulting reduction in flux causes a reduction in torque per Ampere when applied in a permanent magnet machine. When flux focusing magnet assemblies such as those disclosed herein are used, the orientation of polarity between neighboring poles is such that flux is encouraged to flow through the air or other separation between the poles (because a portion of flux travels into and out of the sides of splitter magnets), in addition to the back iron. This relieves the back iron of some of its requirement to carry flux, such that back iron thickness can be reduced. In contrast, in a conventional configuration of straight-polarity magnets, nearly all of the flux flowing through the magnets is carried by the back iron, including the greater amount of leakage flux that is lost to neighboring poles, and back iron thickness must be sufficient to carry all of this flux.

Figure 23:
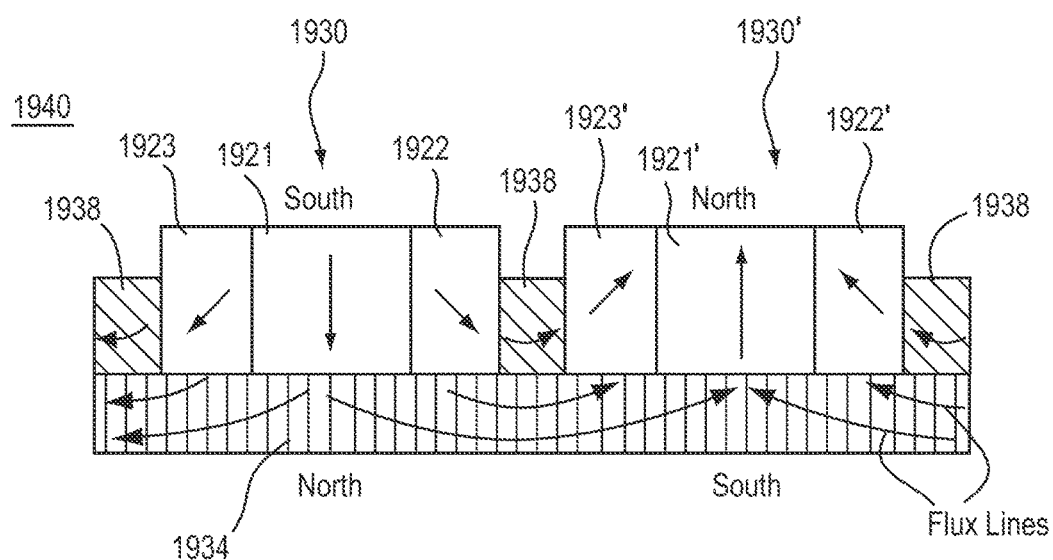
FIG. 23 is a schematic cross section of a magnetic assembly incorporating side inserts, according to an embodiment.

Further reductions in back iron thickness are possible when ferromagnetic retaining inserts 38 are used between poles, as will be explained by reference to FIG. 23. Magnetic assembly 1940 shown in FIG. 23A includes pole assembly 1930, back iron 1934, and side inserts 1938. Pole assembly 1930 includes one or more flux focusing magnetic assemblies that include a central magnet 1921, and splitter magnets 1922 and 1923, each in contact with a side insert 1938. Inserts 1938 allow more return flux to be carried between the poles and through the splitter magnets 1922, 1923 of pole assembly 1930. Retaining inserts 1938 can either be formed directly on back iron 1934, or they can be formed separately and mounted on back iron 1934. Because retaining inserts 1938 have a lower reluctance than the air through which some magnetic flux would otherwise pass, retaining inserts 1938 lower overall flux circuit reluctance—a benefit that is manifested as a further concentration of flux in the desired location.

The size of retaining inserts 1938, particularly their height and width, can be optimized to concentrate flux in the manner desired. Optimally sized retaining inserts 1938 are high enough and wide enough to carry the desired amount of return flux, but not so high and wide that they provide an alternate path for flux that would otherwise be directed across a machine air gap, for instance. When using retaining inserts 1938, the overall thickness of back iron 1934 can be reduced, because the retaining inserts 1938 increase the local effective thickness of back iron 34 where necessary to avoid flux saturation.

Alternatively, individual flux focusing magnet assemblies or complete pole assemblies may be mounted to a back iron with ferromagnetic magnet holders, such as described in more detail below, to achieve the same result. A magnet assembly or pole assembly may also include its own ferromagnetic backing member disposed at its back surface, which may function to carry some or all of the flux in the return path from adjacent magnet assemblies in adjacent pole assemblies. Such backing members can also function as structural supports and/or as retaining mechanisms to a larger back iron or other supporting structure that carries multiple such magnet assemblies or pole assemblies. The supporting structure can be formed in whole or in part from ferromagnetic materials and function to carry some of the flux in the return patch between adjacent magnet assemblies/ pole assemblies, or may be formed entirely of non-ferromagnetic materials and serve only as a structural support for the constituent pole assemblies in a magnetic assembly. The individual back irons could be coupled to the larger back iron or structural support by any suitable mechanism, for example with a dovetail connection.

Notably, the benefits of utilizing ferromagnetic retaining inserts 1938 cannot be obtained with straight polarity magnets, because inserts 1938 would effectively short the straight polarity magnets (thus drawing flux away from the gap) and consequently reduce the useful flux across the gap. With a flux focusing magnet arrangement, however, the angle of polarity of splitter magnets 1922, 1923 (which are adjacent to retaining inserts 1938) is such that the retainers carry useful flux between neighboring poles, rather than providing the aforementioned shorting path between faces of adjacent magnets. Ferromagnetic retaining inserts 1938 can also be implemented in a manner that provides useful structural stiffness to magnetic assembly 1940 or larger assemblies or machines of which magnetic assembly 1940 may form a part.

Figure 24B:
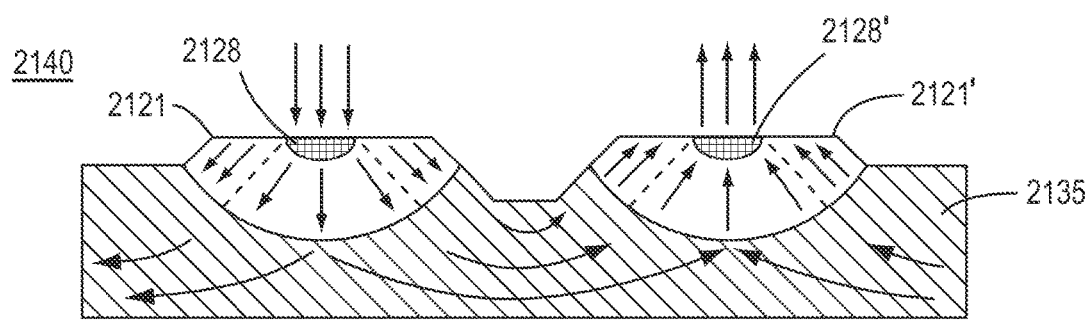

In the preceding embodiments, back iron, side or end inserts, and magnet assemblies or pole assemblies are shown as having rectilinear interfaces. The interfaces need not be so limited. For example, as shown in FIG. 24A, magnetic assembly 2040 has pole assemblies 2030 (formed of one or more magnet assemblies including a central magnet 2021, splitter magnets 2022 and 2023, and lens 2028) and 2030' (formed of one or more magnet assemblies including central magnet 2021', splitter magnets 2022' and 2023', and lens 2028') are coupled to back iron 2035, which is formed with an upper surface having recesses shaped to conform in cross-section to the cross-sectional shape of pole assemblies 2030, 2030'. Essentially, this back iron configuration integrates the functions of the separate back iron and side inserts illustrated above, as is shown by the similarity of the flux lines to those in magnetic assembly 1940 in FIG. 23. Note that lenses 2028, 2028' have concave surfaces. As another example, FIG. 24B shows a magnetic assembly 2140 with pole assemblies 2130, 2130' similarly "embedded" into the shaped upper surface of back iron 2135. Note that the pole assemblies are formed of magnet assemblies having a single magnet 2121, 2121' formed with a variable magnetic angle of polarization or nominal flux axis relative to its top surface and having a lens 2128, 2128' that has a flat upper surface and an arcuate, convex lower surface (corresponding to an arcuate, concave upper surface of magnet 2121, 2121'). The flat upper surface of each lens can provide the advantage of placing magnet material as close as possible to a winding of a stator in a machine application of magnetic assembly 2140. As indicated by the orientation of the flux lines internal to magnets 2121, 2121', not all of the flux lines need to be oriented towards (or away) from lenses 2128, 2128'—by aligning some of the magnet domains to the surface, the magnetic assembly may produce smoother waveforms.

Figure 25:
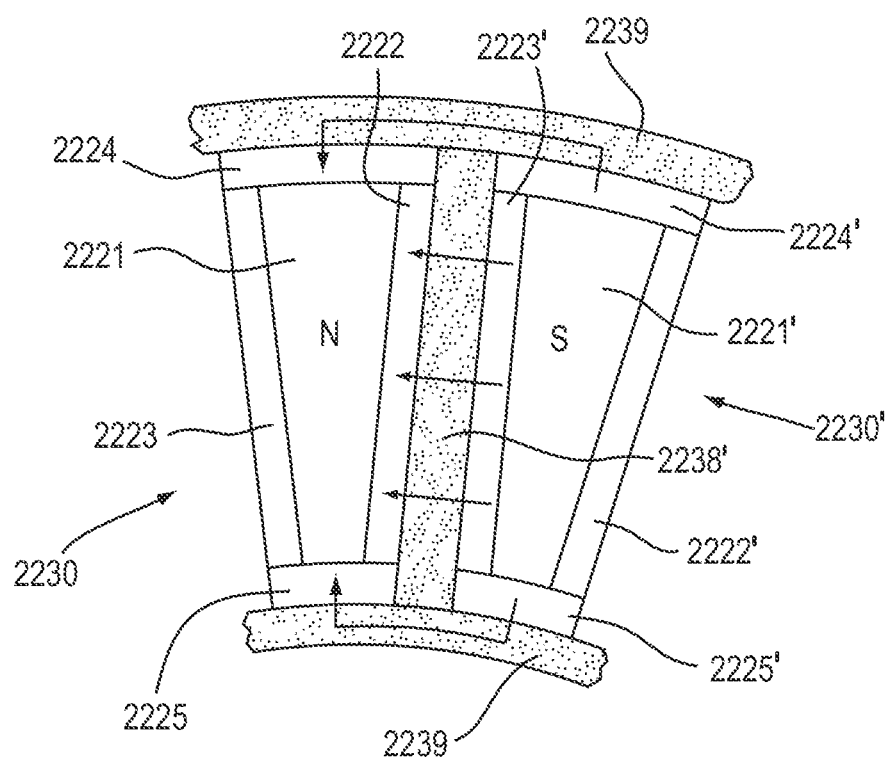
FIG. 25 is a schematic illustration of flux flows in a magnetic assembly, according to an embodiment.

The effect or function of end retainers or inserts is illustrated in FIG. 25, which shows magnetic assembly 2240. Magnetic assembly 2240 includes north pole assembly 2230 (shown for simplicity of illustration as being formed of a single magnet assembly having central magnet 2221, splitter magnets 2222, 2223, and pusher magnets 2224, 2225) and south pole assembly 2230' (having central magnet 2221', splitter magnets 2222', 2223', and pusher magnets 2224', 2225'). Side insert 2238 is disposed between, and in contact with, splitter magnets 2222, 2223', and end inserts 2239 are disposed on opposite ends of pole assemblies adjacent to, and in contact with, pusher magnets 2224, 2224', 2225, 2225'. The arrows illustrate the flux flow through inserts 2239 between the pusher magnets of the pole assemblies, and the flux flow through inserts 2238 between the splitter magnets. Not shown in FIG. 25 is that flux leaves the upper surface of north pole assembly 2230, and enters the upper surface of south pole assembly 2230'.

Figure 26A:
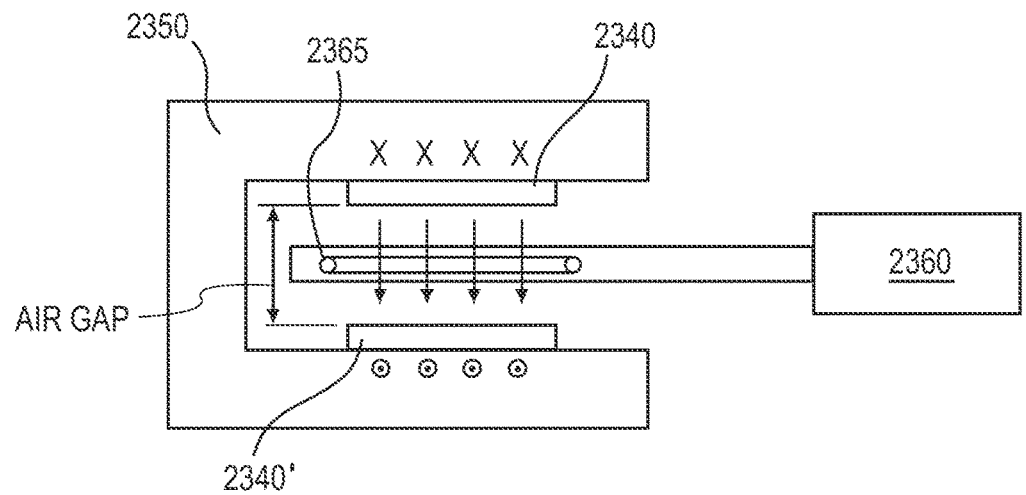
FIG. 26A is a schematic illustration of a magnetic machine incorporating two magnetic assemblies, according to an embodiment.

Magnetic assemblies as described above may be incorporated into various magnetic machines. FIG. 26A schematically illustrates components of a magnetic machine 2301, which may be, for example, a motor/generator. The components of magnetic machine 2301 can include magnetic assemblies 2340, 2340', a magnetic assembly support 2350 on which magnetic assemblies 40, 40' can be mounted, and a winding support 2360 on which one or more conductive windings 65 can be mounted.

In this embodiment, the pole faces of magnetic assemblies 2340, 2340' are separated by an air gap (indicated as "AIR GAP" in FIG. 26A). As indicated by the arrows across the air gap, and the arrow heads (circles) and tails (crosses) in magnetic assembly support 2350, flux generally flows through the windings 2365, and changes direction both times within the magnetic assembly support 2350. The nominal flux axes of the pole assemblies' constituent magnets may be oriented to converge towards the air gap, i.e. towards windings 2365, and optionally lenses (not shown) of the constituent pole assemblies, and/or inserts or shaped back iron (not shown) of the magnetic assembly may be configured to modify the flux field produced by the magnetic assemblies to yield a desired flux density distribution at the windings 2365.

Magnetic assembly support 2350 and winding support 2360 can be coupled to an assembly support (not shown in this figure) for relative movement with respect to each other. For example magnetic assembly support 2350 can be coupled to the assembly support for rotational motion (i.e. as a "rotor") and winding support 2360 can be fixedly coupled to the assembly support (i.e. as a "stator"). If the axis of rotation of rotor 2350 is vertical in FIG. 26A (e.g. to the right of the rotor and stator), the magnetic machine 2301 is an axial flux machine. If the axis of rotation of rotor 2350 is horizontal in FIG. 26A (e.g. below the rotor and stator), the magnetic machine 2301 is a radial flux machine. Alternatively, if the magnetic support assembly 2350 moves linearly, rather than rotationally, with respect to stator 2360, the magnetic machine 2301 has a linear machine architecture.

Figure 26B:
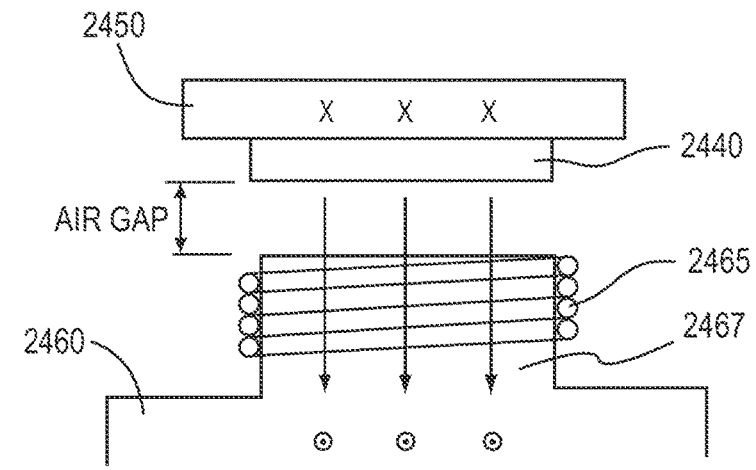
FIG. 26B is a schematic illustration of a magnetic machine incorporating one magnetic assembly, according to an embodiment.

Another configuration of a magnetic machine, which again may be a motor/generator, is shown in FIG. 26B. Magnetic machine 2401 has a single magnetic assembly 2440 mounted on magnetic assembly support 2450. Winding support 2460 supports one or more conductive windings 2465, which are wound around a ferromagnetic core 2467, in a conventional configuration.

The pole face of magnetic assembly 2440 is separated from windings 2465/core 2467 by an air gap (indicated as "AIR GAP" in FIG. 26B. As indicated by the arrows across the air gap, and the arrow tails (crosses) in magnetic assembly support 2450 and arrow heads (circles) in winding support 2460, flux generally flows into, and changes direction in, the stator and the rotor. Any given point that carries flux in the stator sees a full flux reversal (AC flux in the core).

The nominal flux axes of the pole assembly's constituent magnets may be oriented to converge towards the air gap, i.e. towards windings 2465 and core 2467, and optionally lenses (not shown) of the constituent pole assemblies, and/or inserts or shaped back iron (not shown) of the magnetic assembly may be configured to modify the flux field produced by the magnetic assemblies to yield a desired flux density distribution at the windings 2465.

As with the previous embodiment, magnetic assembly support 2450 and winding support 2460 can be coupled to an assembly support (not shown in FIG. 26B) for relative movement with respect to each other. For example magnetic assembly support 2350 can be coupled to the assembly support for rotational motion (i.e. as a "rotor") and winding support 2460 can be fixedly coupled to the assembly support (i.e. as a "stator"). If the axis of rotation of rotor 2450 is vertical in FIG. 26B (e.g. to the right of the rotor and stator), the magnetic machine 2401 is an axial flux machine. If the axis of rotation of rotor 2450 is horizontal in FIG. 26B (e.g. below the rotor and stator), the magnetic machine 2401 is a radial flux machine. Alternatively, if the magnetic support assembly 2450 moves linearly, rather than rotationally, with respect to stator 2460, the magnetic machine 2401 has a linear machine architecture.

An exemplary embodiment of a surface mounted magnet axial field magnetic machine, in this embodiment a motor/generator, incorporating flux focusing magnet assemblies as describe above is illustrated in FIGS. 27 to 32. As shown in FIGS. 26 and 27, magnetic machine 2501 has a rotor/stator configuration similar to that shown schematically in FIG. 26A, including a segmented annular rotor 2550 that is U-shaped in cross section and an annular segmented stator 2560 disposed between the legs of the rotor.

Rotor 2550 is coupled to a rotating rotor hub 2551 with structural support members 2552. Rotor hub 2551 is rotatably mounted on an axle (not shown) extending through the central opening of stator hub 2561. Stator 2560 is attached to stator hub 2561 with structural support members 2562. Stator hub 2561 is fixedly attached to a support structure and/or housing arrangement (not shown) which further maintains the fixed orientation of the stator 2560. Rotor 2550 has a first magnetic assembly support member 2551 and a second magnetic assembly support member 2555 that is attached to the first support member 2551 using fasteners (not shown) at mounting blocks 2556 on an outer circumference of support members rotors 2551 and 2555, respectively.

The stator 2560 of this embodiment may include an annular array of stator segments 2565, each of which segments 2565 may have a circuit board arrangement similar to that described in U.S. Pat. No. 7,109,625 and in International Application PCT/US2010/000112, the disclosures of which are incorporated herein by reference.

Figure 28:
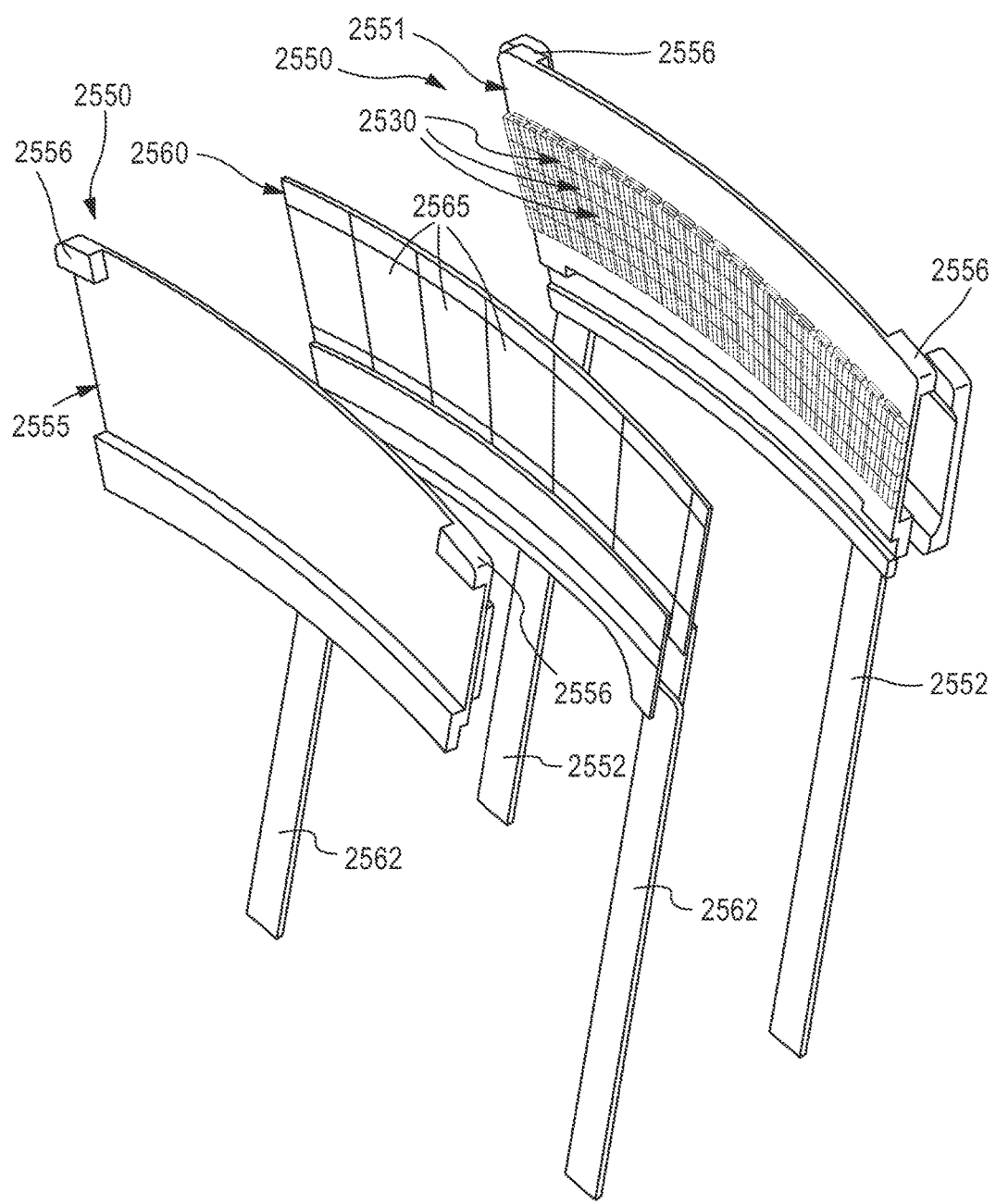
FIG. 28 is a partial exploded view of the motor/generator of FIG. 27.
Figure 29:
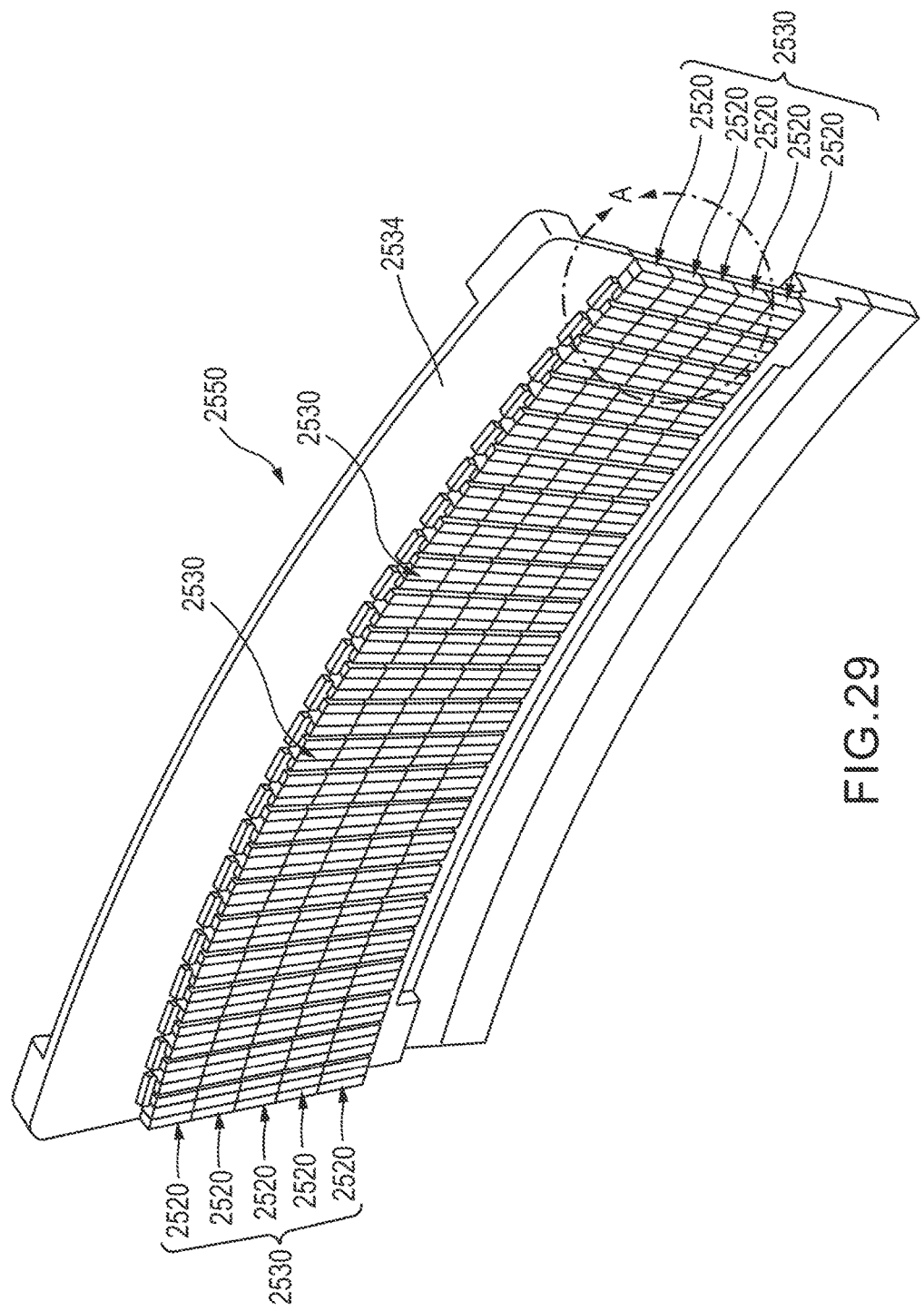
FIG. 29 is an enlarged perspective view of a segment of a rotor of the motor/generator of FIG. 27.

A section of the first magnetic assembly support 2551 as shown in FIG. 28 is shown enlarged in FIG. 29. Pole assemblies 2530 are mounted to the back iron 2534 of first magnetic assembly support 2551. As shown in the more detailed view of several of the pole assemblies 2530 in FIG. 29, the pole assemblies are held in place on back iron 2534 with magnet holders 2536. As seen in FIG. 28, each pole assembly 2530 is composed of a group of five flux focusing magnet assemblies 2520, aligned in the radial direction. Each of pole assemblies 2530 is a pole of the motor/generator 2501. Although not visible in FIG. 27, similar pole assemblies are also mounted to second magnetic assembly support 2555, such that a "north pole" pole assembly on second support 2555 is opposite a "south pole" pole assembly on first support 2550 and vice versa. The orientation of the poles in constituent magnets of a given "north pole" pole assembly 2530, in combination with the orientation of the angle of polarization of those magnets, results in magnetic flux directed angularly toward central magnet 2521 from splitter magnets 2522 and 2523, and outward across the gap and towards the pole of opposite polarity on the opposing magnet assembly. Similarly, the orientation of the poles in constituent magnets of a given "south pole" pole assembly 2530, in combination with the orientation of the angle of polarization of those magnets, results in magnetic flux from splitter magnets 2522 and 2523 being directed away from central magnet 2521, and into back iron 2534, which provides a return flux path to the adjacent poles. In motor/generator 2501, the nominal flux direction for magnet assemblies 2520 of pole assemblies 2530 is perpendicular to back iron 2534.

Figure 30:
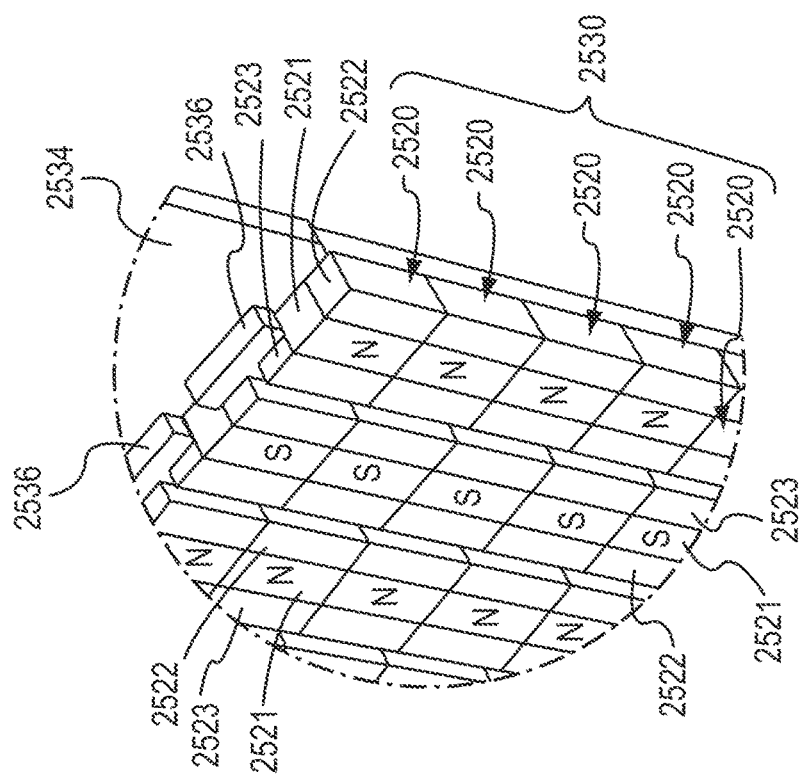
FIG. 30 is a detail perspective view of the portion of FIG. 28 identified as "A" in FIG. 29.
Figure 31:
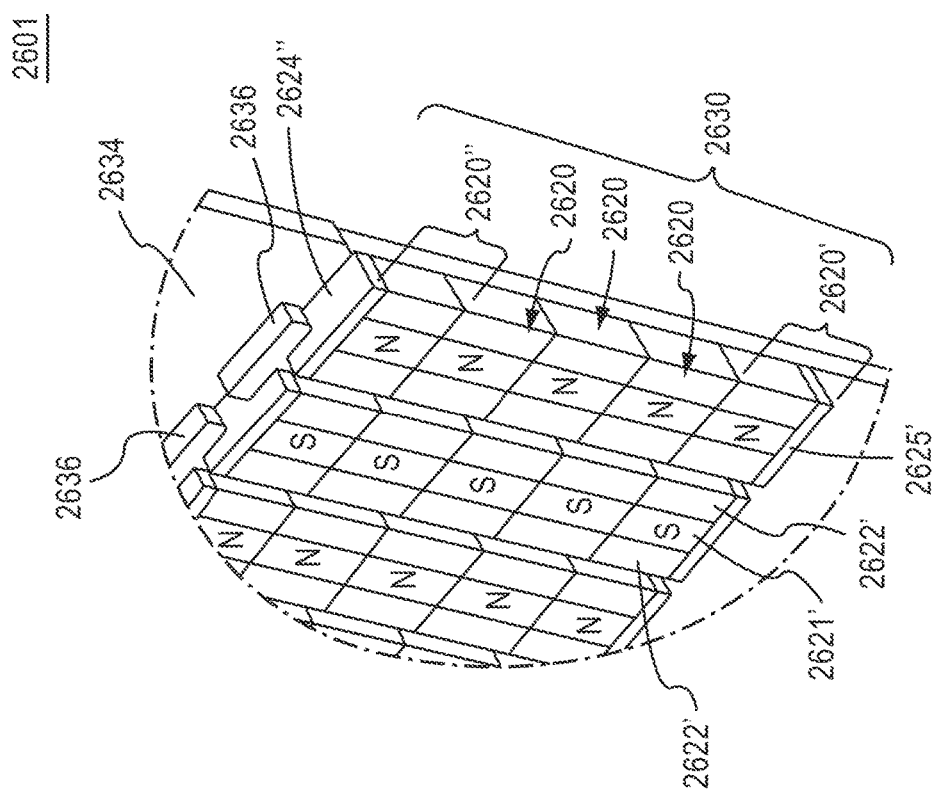
FIG. 31 is a detail perspective view of a rotor segment of a motor/generator according to an embodiment.
Figure 32:
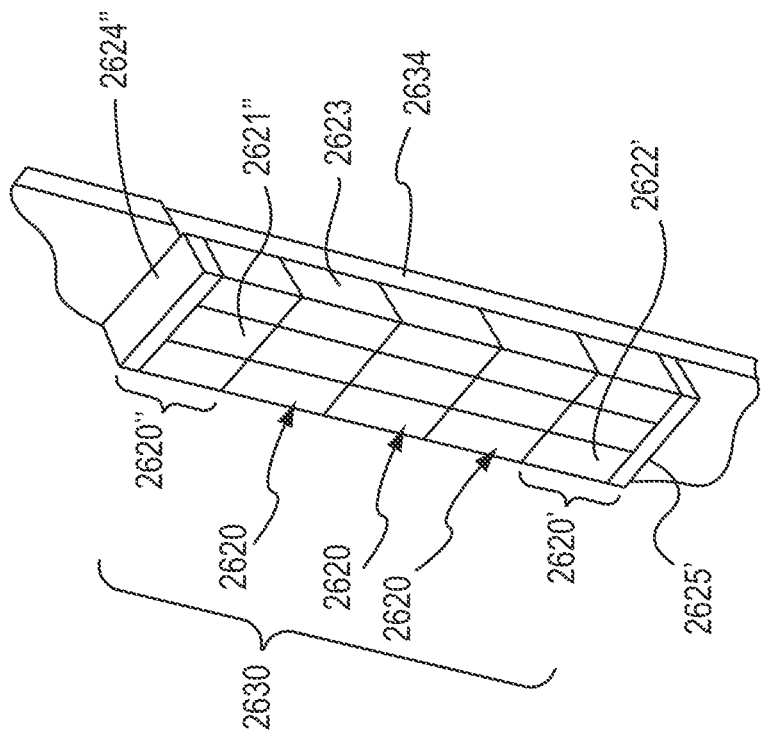
FIG. 32 is a detail perspective view of a pole assembly of the motor/generator of FIG. 31.

FIGS. 30 and 31 illustrate pole assemblies and constituent flux focusing magnet assemblies for an alternative embodiment of a motor/generator, 2601. This embodiment differs from the previous embodiment only in that each of the pole assemblies 2630 includes at each of its radially inner and outer ends a magnet assembly that includes a pusher magnet. A magnet assembly 2620' is disposed on the radially inner end of each pole assembly 2630, and includes a central magnet 2621', splitter magnets 2622' and 2623', and a pusher magnet 2625'. A magnet assembly 2620" is disposed on the radially outer end of each pole assembly 2630, and includes a central magnet 2621", splitter magnets 2622" and 2623", and a pusher magnet 2625". The use of pusher magnets in pole assemblies 2630 further improves performance of the motor/generator 2601 by concentrating the flux in the radial direction for improved density across the gap to the pole of opposite polarity on the opposing rotor. Further, in axial machines, where the pole is slightly wider at its outer diameter than at its inner diameter, pusher magnets can be used to push the peak air gap flux density as far to the outer diameter of the pole as possible, thereby increasing the torque lever arm for the shear stresses produced at the rotor surface by the electromagnetic coupling of the rotor and the stator. This can also have the effect of reducing radial conductor length, thus improving efficiency by reducing the effective resistance of the machine for a given current level.

In most permanent magnet machines, flux focusing magnet assemblies such as those described above concentrate flux in the gap between the back iron on which the magnet assemblies are mounted and an opposing back iron, which may or may not have additional magnet assemblies mounted thereon. These magnet assemblies are useful for controlling leakage flux between neighboring poles on the rotor, for increasing the peak flux density in the gap, for adjusting the distribution of flux across the gap (to thereby achieve improved waveform quality, and for achieving a beneficial overall effective coercivity of the magnet assemblies. Ferromagnetic lenses further concentrate flux and facilitate the above-referenced advantages. The improvement in torque per Ampere that results from the use of these magnet assemblies enables the use of lower grade magnets, which are both less costly and more readily available.

Figure 33:
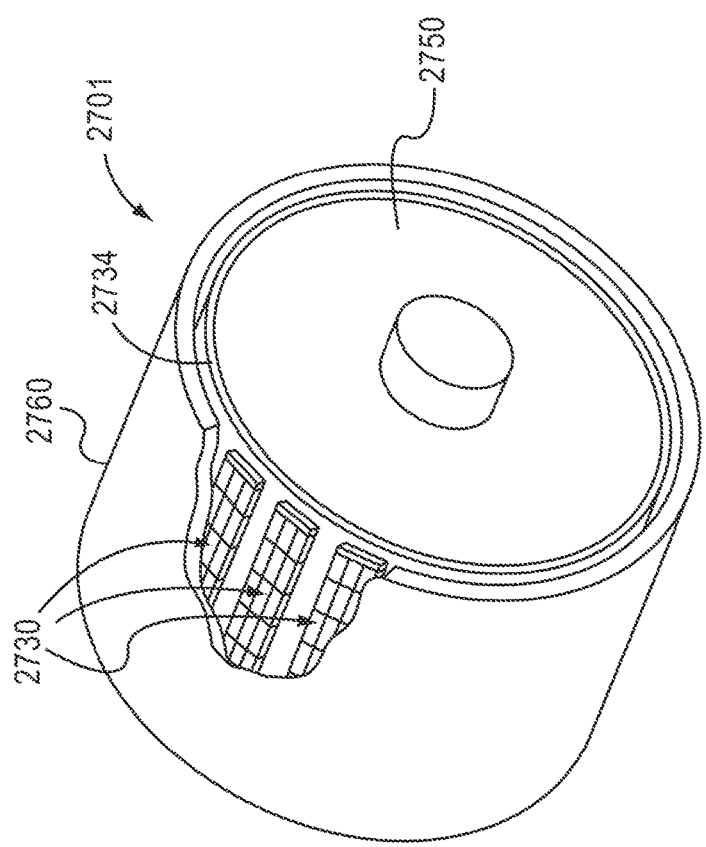
FIG. 33 is a perspective view of a radial field motor/generator according to an embodiment.
Figure 34:
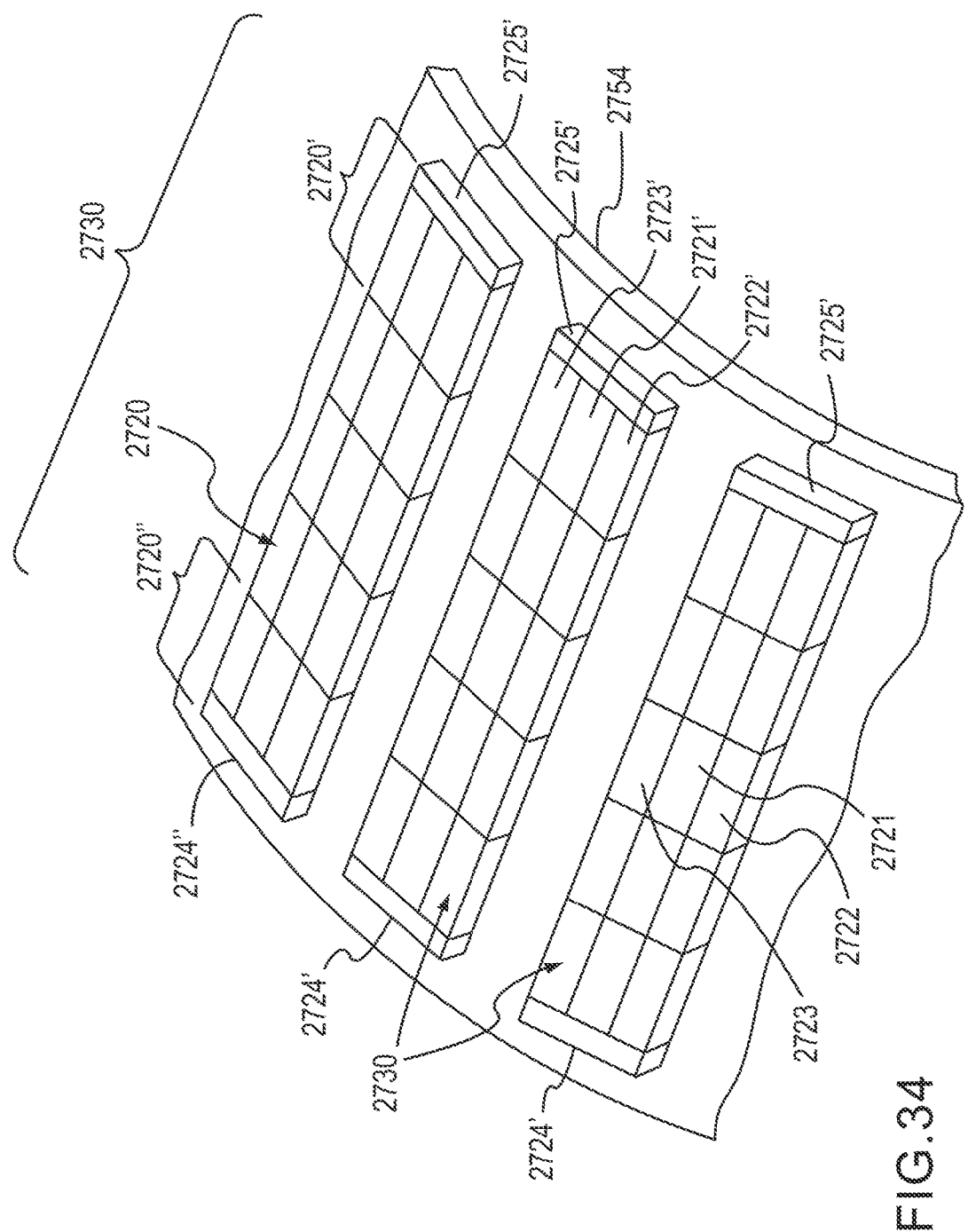
FIG. 34 is a perspective view of a segment of the rotor of the motor/generator of FIG. 33.

Flux focusing magnet assemblies such as those described above may be used in any electromagnetic machine utilizing surface mounted magnets. For example, FIGS. 33 and 34 show a surface mounted magnet radial field machine 2701 having a stator 2760 and rotor 2750. Pole assemblies 2730 are shown mounted to rotor 2750. As surface mounted magnet radial field machines are well known in the art, only those aspects of such machines that are relevant to the present invention are discussed herein.

With reference to FIG. 33, rotor 2750 of surface mounted magnet radial field machine 2701 has a rotor back iron 2734 to which a plurality of pole assemblies 2730 are attached. Each pole assembly 2730 includes five magnet assemblies, with substantially the same configuration as the pole assemblies 2630 of the preceding embodiment. Specifically, the magnet assemblies 2720' and 2620" on the ends of each pole assembly 2730 include pusher magnets, 2725' and 2724", respectively.

When used in a surface mounted magnet radial field machine such as machine 2701, the central magnet of each flux focusing magnet assembly has an angle of polarization in the radial direction. The angle of polarization of splitter magnets in radial machines has both a radial component and a tangential component (i.e. tangential to the surface of the rotor), and the angle of polarization of pusher magnets in such machines has both a radial component and an axial component. Notably, in a radial field machine, pusher magnets are useful for minimizing eddy currents at the axial edges of the rotor. Persons of ordinary skill in the art will appreciate that in some embodiments, individual flux focusing magnet assemblies—or pole assemblies formed of flux focusing magnet assemblies—may be twisted helically to reduce cogging torque.

As shown in FIG. 35, stator 2760 of motor/generator 2701 includes a stator back iron 2764 and recessed windings 2762 that interact with magnetic flux from the flux focusing magnet assemblies on rotor 2750 to turn rotor 2750 (in a motor configuration) or to generate electricity in the windings 2762 as rotor 2750 is turned (in a generator configuration).

Application of the present invention to radial field machines is not limited to the specific embodiment shown in FIGS. 33-35; rather, any of the flux focusing magnet assemblies described herein could be used in place of magnet assemblies 2720, 2720' and/or 2720" in those figures, and any number of flux focusing magnet assemblies (i.e. one or more) could be used to form each pole assembly of a radial machine such as radial motor/generator 2701.

Moreover, persons of ordinary skill in the art will understand that although the surface mounted magnet radial field motor/generator 2701 depicted in FIGS. 33-35 has an outer stator and an inner rotor, flux focusing magnet assemblies according to the present invention may also be beneficially used in surface mounted magnet radial field machines having an inner stator and an outer rotor. A schematic view of a surface mounted magnet radial field motor/generator machine 2801 using flux focusing magnet assemblies is shown in FIG. 36. Motor/generator 2801 includes a rotor 2850 with magnet assemblies 2820 mounted on back iron 2834, and a stator 2860 with windings 2862 disposed in stator back iron 2864.

When used in surface mounted magnet radial field machines, flux focusing magnet assemblies such as those described above achieve the same advantages as described herein, including minimizing leakage flux to neighboring poles, increasing peak flux density, allowing the flux field to be controlled to minimize total harmonic distortion, and enabling the use of magnet segments of varying coercivity without substantially affected the overall coercivity of the flux focusing magnet assembly. Retaining inserts may be used in surface mounted magnet radial field machines as well, with the same beneficial results as described above.

Figure 37:
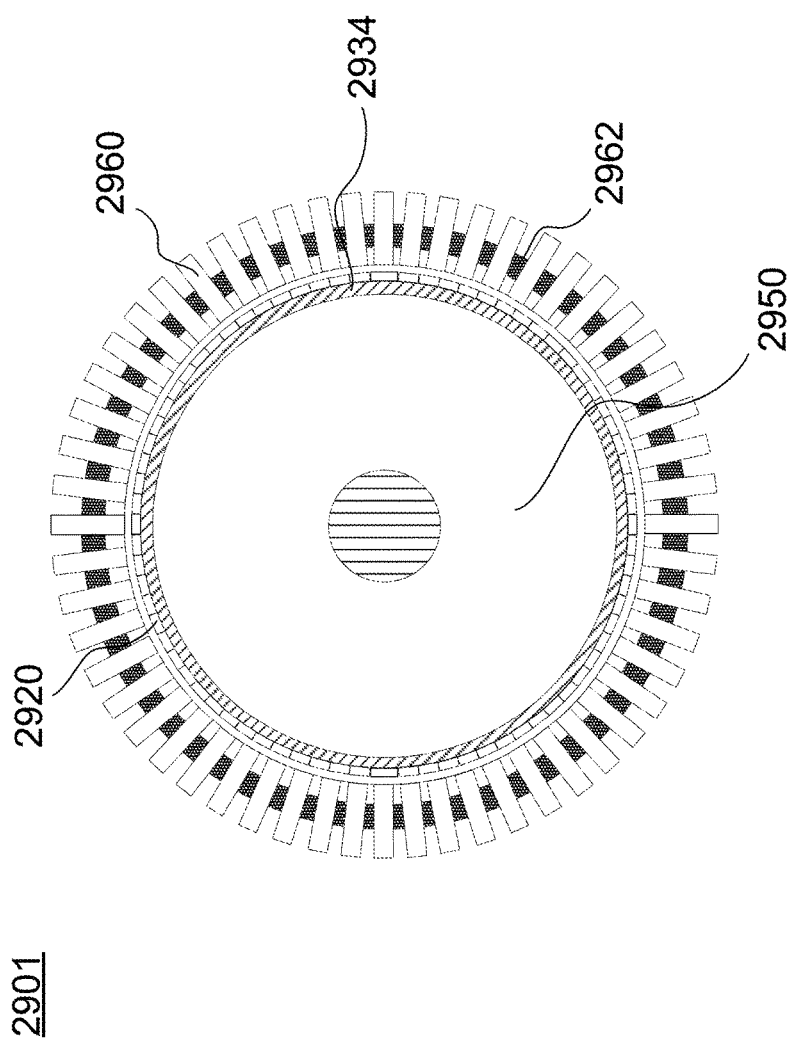
FIG. 37 is a schematic cross-sectional view of a transverse flux motor/generator according to an embodiment.
Figure 38:
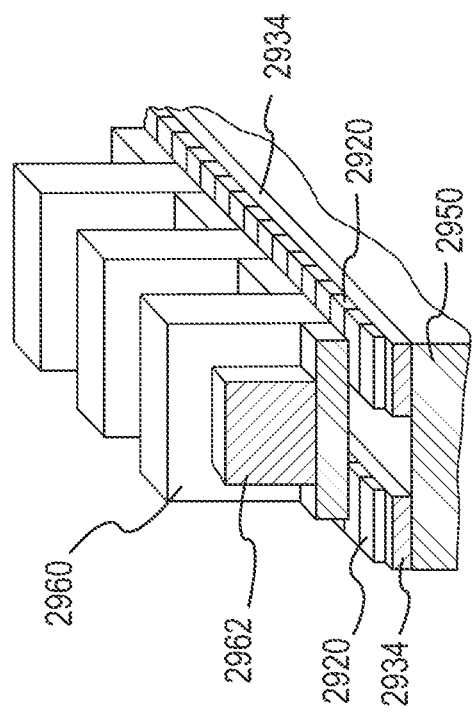
FIG. 38 is a perspective view of a portion of the motor/generator of FIG. 37.
Figure 39:
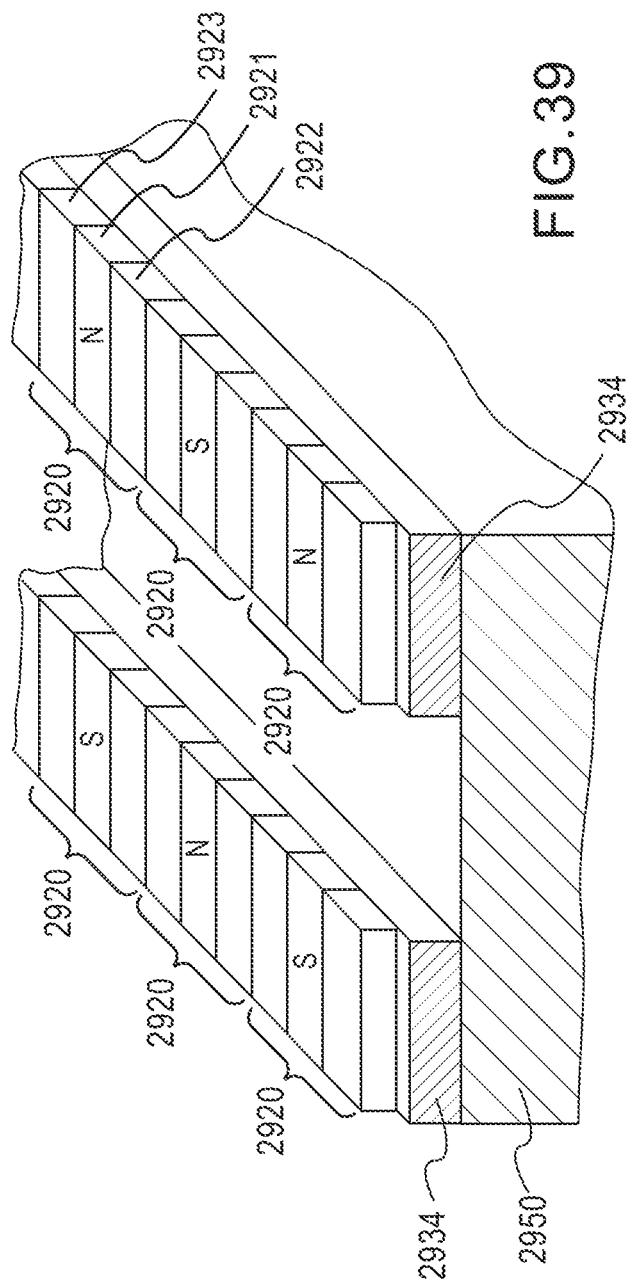
FIG. 39 is a perspective view of the rotor of the motor/generator of FIG. 37.

As another example of the potential uses of flux focusing magnet assemblies such as those described above, FIGS. 37-39 shows an embodiment of a surface mounted magnet transverse flux motor/generator machine 2901 utilizing flux focusing magnet assemblies. Transverse flux machine 2901 includes stator 2960, through which a winding 2962 passes. Transverse flux machine 2901 also includes a rotor 2950, which comprises a back iron assembly 2934 to which permanent magnets 2920 are mounted. A transverse flux machine stator such as stator 2460 is configured to provide one or more flux circuits through which flux passes in alternating directions as a machine rotor, such as rotor 2450, turns. In conventional surface mounted transverse flux machines, such as that depicted in FIG. 3 of "Transverse Flux Machines: What For?", IEEE Multidisciplinary Engineering Education Magazine, Vol. 2, No. 1, March 2007 (from which the transverse flux machine depicted in FIGS. 37-39 is adapted), the disclosure of which is incorporated by reference herein, two parallel rows of permanent magnets are mounted on a rotor. The magnets in each row have alternating polarities, and the rows are aligned such that north pole magnets in one row are opposite south pole magnets in the other row, and vice versa. As shown in FIGS. 38 and 39, permanent magnets 2920 of transverse flux machine 2901 are arranged in flux focusing magnet assemblies such as the assemblies described above.

As shown in FIG. 39, in transverse flux machine 2901, the simple permanent magnets of the conventional implementation of a transverse flux machine are replaced with flux focusing magnet assemblies 2920, which may be of any of the configurations described above. Flux focusing magnet assemblies in transverse flux machines minimize flux leakage to neighboring poles as well as eddy currents on the axial sides of the rotor. They also allow for increased peak flux density and can be used to minimize total harmonic distortion. And, they enable the use of magnet segments of varying coercivity without substantially affecting the overall coercivity of the flux focusing magnet assembly. Thus, all embodiments described herein can be optimized for any radial, axial or transverse flux motors or generators that operate in a rotating manner or in a linear manner in order to concentrate flux, reduce leakage flux, control or shape flux field harmonics, obtain an overall magnet assembly coercivity greater than the coercivity of at least one component magnet segment, or accomplish any combination of these purposes.

Flux focusing magnet assemblies according to the present invention also can be used in many other applications beyond electromagnetic machines. Flux focusing magnet assemblies redistribute the magnetic field in a given volume as compared to the magnetic field created in the same volume by a similarly sized and shaped straight polarity magnet. Consequently, the flux density around the surface of a flux focusing magnet assembly is different than the flux density around the surface of a similarly sized and shaped straight polarity magnet.

One of the benefits of this feature is that a flux focusing magnet assembly can achieve a higher surface flux density—and therefore a greater magnetic force—than the theoretical maximum surface flux density of a similarly sized and shaped straight polarity magnet. This is useful not only in electromagnetic machines, but also for other applications that utilize a magnet's attractive or repulsive force. For example, flux focusing magnet assemblies are useful for magnetic lifting, where the surface flux density of the magnet affects the maximum lifting capability. Flux focusing magnet assemblies are also useful in magnetic bearings, where opposing flux focusing magnet assemblies of the same polarity create a greater repulsive force—and therefore a stronger bearing—than if similarly sized and shaped straight polarity magnets were used.

Another benefit of this feature is that the flux density on the top of a flux focusing magnet assembly (i.e., the side of a flux focusing magnet assembly to which the nominal angle of polarity points) is different than the flux density on the bottom (i.e. the side opposite the top) of the flux focusing magnet assembly. Unlike straight polarity magnets, then, flux focusing magnet assemblies have a stronger magnetic attraction on the top versus the bottom (or vice versa), which is helpful when flux focusing magnet assemblies are used in applications where a magnetic attraction is preferred to be stronger in one direction than in the opposite direction. For example, flux focusing magnet assemblies are useful in tooling used to assemble and disassemble machines that include magnetic components. This characteristic can also be leveraged to facilitate the installation and removal of flux focusing magnet assemblies, because the force holding the less attractive side of the assembly to an object (a back iron, for example) can be overcome by the force holding the more attractive side of the assembly to a different object (a piece of tooling, for example).

Yet another benefit of this feature is that the angle of polarity and relative dimensions of the splitter and/or pusher magnets of a flux focusing magnet assembly can be adjusted to shape the magnetic field generated by the flux focusing magnet assembly and to tune the magnetic force distribution across the surface of the flux focusing magnet assembly. Shaping the magnetic field can be beneficial, for example, in magnetic sensor applications, where adjusting the shape of the magnetic field can improve positional alignment resolution, reduce the material required to reach a needed flux density, and improve the signal waveform. The ability to tune the magnetic force distribution across the surface of the flux focusing magnet assembly allows the force distribution to be optimized for a given application.

The applications described above are exemplary only, and persons skilled in the art will recognize that there are many other applications in which flux focusing magnet assemblies present one or more advantages over traditional straight polarity magnets of a similar size and shape.

Notably, permanent magnets used in flux focusing magnet assemblies according to the present invention need not be rectangular or even rhomboidal, as described above. As another example, the corners of splitter magnets and/or of pusher magnets could be cut back at some angle, perhaps related to the angle of polarity, to reduce overall magnet volume without substantially compromising performance. Preferably, flux focusing magnet assemblies according to the present invention are shaped so as to easily be placed side-to-side or end-to-end, such as in a pole assembly used in an axial magnetic machine. For example, non-annular flux focusing magnet assemblies are preferred.

The individual magnet segments of any one of magnet assemblies described above may differ from other individual magnet segments in the same assembly in any of the ways discussed above, including energy product rating, magnetic remanence rating, operating temperature rating, and coercivity rating; type of magnetic material from which the magnet segment is made; and relative dimensions, including height, width, and length.

Further, as described above, magnet assemblies may be formed of individual magnet segments affixed together. The same benefits and effects, however, may be achieved using a single magnet with varying angles of polarity, as described above.

Methods of manufacturing flux focusing magnet assemblies, such as those described above, will now be described with reference to FIGS. 39-44.

There are at least six different methods for manufacturing flux focusing magnet assemblies. The objective of the manufacturing methods described below is to orient the final magnetic polarization of each magnet segment of these assemblies as described previously.

The first five methods described herein deal with magnets which can have magnetic domains pre-oriented during a step of the manufacturing process to enable the invention described above. For those methods where magnetic domains are pre-oriented, the alignment is formed when the raw material is in a condition where it can be formed by diffusion bonding or otherwise converted from either a powder, plastic, or liquid state into the solid magnet material which comprises a permanent magnet in the presence of a magnetic field with a known pole orientation. With domains pre-aligned in this manner, the magnet volume is able to hold a stronger magnetic remanence upon magnetization, yielding a magnet with greater performance than one with randomly oriented magnetic domains. The end result of each of these five methods is a magnet assembly wherein each subcomponent contains the angle of magnetization described above.

The final manufacturing method described herein creates a structure whereby the domains of the constituent material are initially aligned in a random orientation. The final orientation of magnetization at each point in the volume of the magnet is then nominally equal to the alignment of the magnetic field applied during magnetization. The net result is that this magnet is weaker than magnets produced using the alternative methods employing domain alignment described above, but it also may be less expensive to manufacture.

In the following description of possible manufacturing methods, the term "magnet segments" refers to any of a central magnet, splitter magnet, or pusher magnet. The "applicable magnet segments" are those magnet segments necessary to create the desired magnet assembly. For example, as explained previously, a magnet assembly may include only a central magnet and two splitter magnets, or it may further include one or two pusher magnets.

Figure 40:
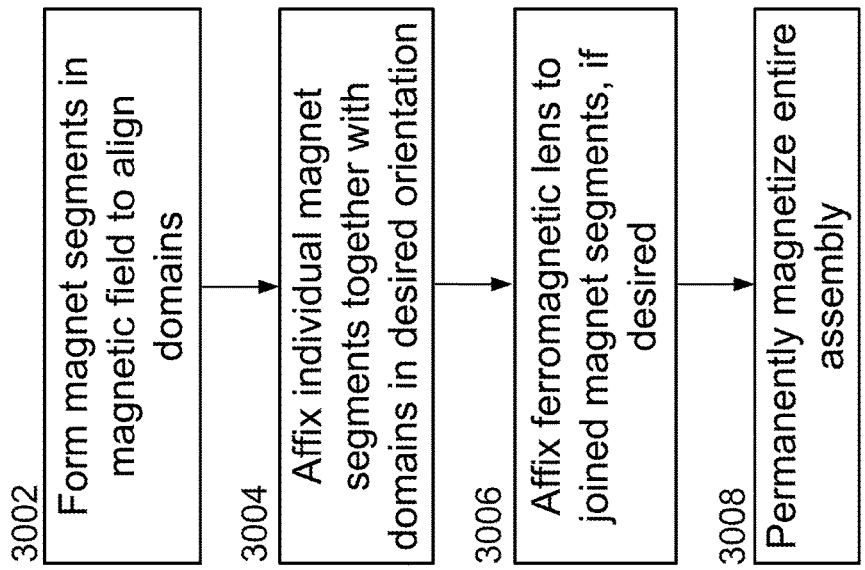
FIG. 40 is a flow chart showing a first method of manufacturing a flux focusing magnet assembly.

The proposed manufacturing methods are now described:

As seen in FIG. 40, in a first manufacturing method 3000, the applicable individual magnet segments are first formed through, for example, diffusion bonding or adhesive bonding, in a magnetic field at 3002. The magnetic field aligns the magnetic domains of the powdered raw material as it is pressed into a solid. Alternatively, the applicable magnet segments may be produced from a gas-or liquid-based raw material that is allowed to solidify in the presence of a magnetic field to align the magnetic domains. The applicable magnet segments are then affixed to each other, with the domains in a proper final orientation, to create the desired magnet assembly at 3004.

If the desired magnet assembly includes a ferromagnetic lens, the ferromagnetic lens is affixed to the magnet assembly at 3006.

The entire magnet assembly is then permanently magnetized at 3008 to achieve the final desired magnetic angles of polarization, taking into account whether a north pole or south pole assembly is required. For example, in a north pole magnet assembly consisting solely of splitter magnets, such as the assembly depicted in FIG. 2B, a single magnetization field applied to the assembly as a whole permanently magnetizes splitter magnet 122 to achieve a flux direction of minus 45° relative to the nominal flux direction of the magnet assembly, and permanently magnetizes splitter magnet 121 to achieve a flux direction of plus 45° relative to the nominal flux direction.

Figure 41:
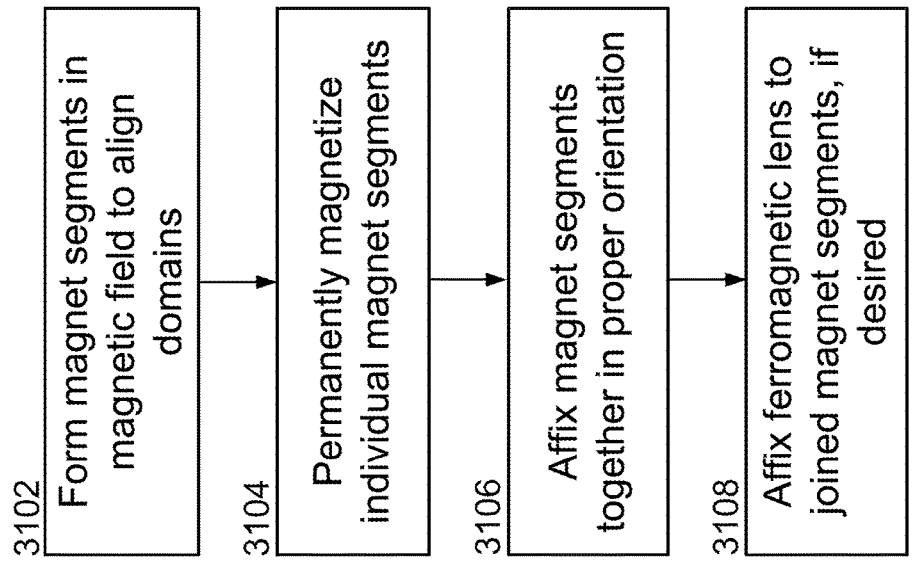
FIG. 41 is a flow chart showing a second method of manufacturing a flux focusing magnet assembly.

As shown in FIG. 41, in a second manufacturing method 3100, the applicable magnet segments are first formed at 3102 by one of the techniques described above for method 3100. Each of the applicable magnet segments is then permanently magnetized at 3104 to have the desired angle of polarization, taking into account whether the magnet segments will be assembled into a north pole or a south pole assembly. For example, a north pole central permanent magnet is permanently magnetized with an angle of polarization parallel to and in the direction of the nominal flux direction, while a south pole splitter magnet is permanently magnetized with an angle of polarization ranging from 0° to less than 90° greater than or less than the opposite of the nominal flux direction.

Finally, the magnet segments are affixed together at 3106 as required for the desired magnet assembly, and a ferromagnetic lens, if applicable, is affixed thereto at 3108. If a pole assembly consisting of multiple magnet assemblies is desired, the multiple magnet assemblies can be affixed together to form a single pole assembly, and a ferromagnetic lens, if applicable, can be affixed thereto.

Figure 42:
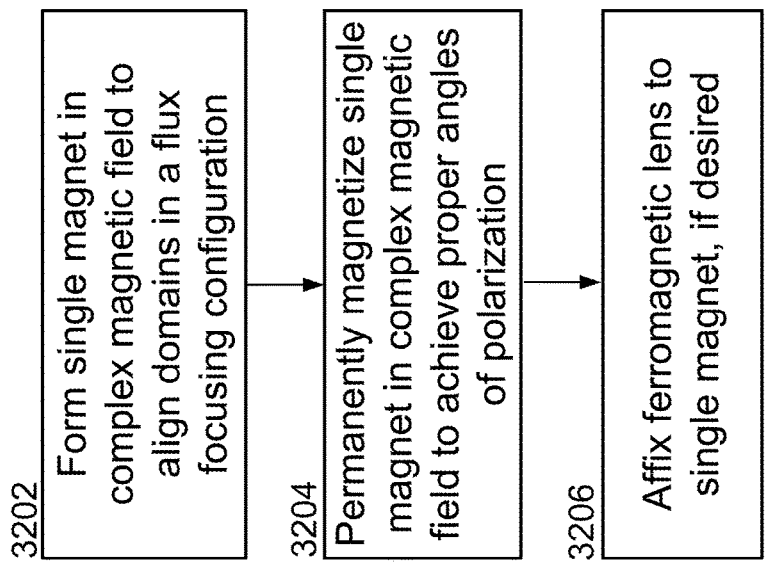
FIG. 42 is a flow chart showing a third method of manufacturing a flux focusing magnet assembly.

As shown in FIG. 42, in a third manufacturing method 3200, a single magnet is formed at 3202 (by one of the techniques described above) in a complex magnetic field that is equivalent to the domain alignment of the desired magnet assembly to align the magnetic domains in a continuously variable manner. The single magnet is then permanently magnetized at 3204 in a magnetic field such that each portion of the magnet is saturated in the proper angle of polarization. For example, if a north pole-oriented magnet assembly is desired, the single magnet is permanently magnetized such that the center portion of the magnet has an angle of polarization parallel to and in the direction of the nominal flux direction, and the side portions of the magnet have an angle of polarization offset from the nominal flux direction by any angle less than 90° greater than or less than the nominal flux direction. To form a corresponding south pole magnet assembly, the magnetization is applied in the opposite direction.

If the desired magnet assembly includes a ferromagnetic lens, then the ferromagnetic lens may be affixed to the single magnet at 3206 after it has been permanently magnetized. Alternatively, ferromagnetic lens may be already located prior to magnetization.

Figure 43:
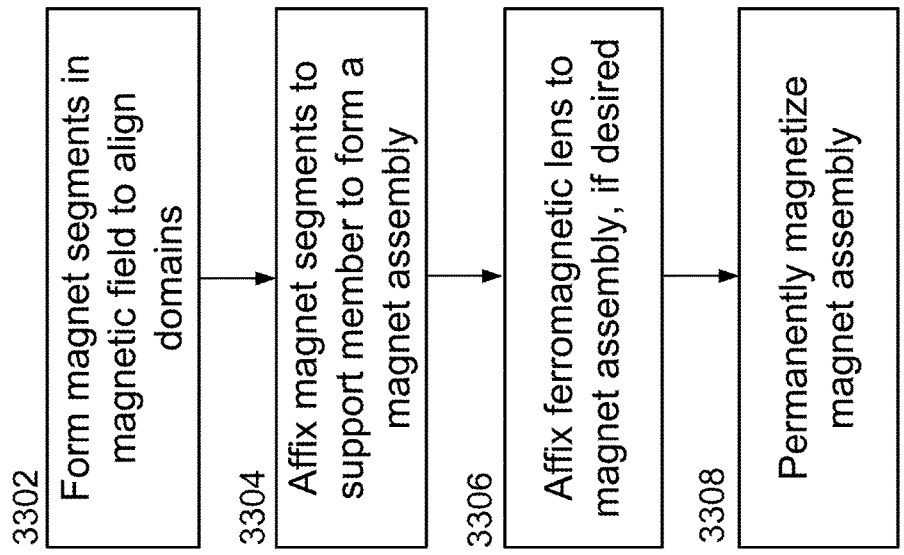
FIG. 43 is a flow chart showing a fourth method of manufacturing a flux focusing magnet assembly.

As shown in FIG. 43, in a fourth manufacturing method 3300, the applicable magnet segments are formed at 3302 (by one of the techniques described above) in a magnetic field to align domains. The applicable magnet segments are then affixed at 3304 to a magnet assembly support member, such as one of the back iron or other members described above in connection with various embodiments, using a fixture to hold the magnet segments in intimate contact with each other while they are affixed to the support member. If a pole assembly consisting of multiple magnet assemblies is desired, then each of the magnet assemblies is affixed to the support member in the same manner. If the desired magnet assembly or pole assembly utilizes a ferromagnetic lens, then the lens is affixed to the magnet assembly or the pole assembly at 3306. The entire magnet assembly (or pole assembly) is then magnetized at 3308 with the proper magnetic polarization as described above. This method favorably provides ease of manufacturing by enabling the use of simplified tooling for the placement or removal of magnet assemblies on an annular such as the one described above.

Figure 44:
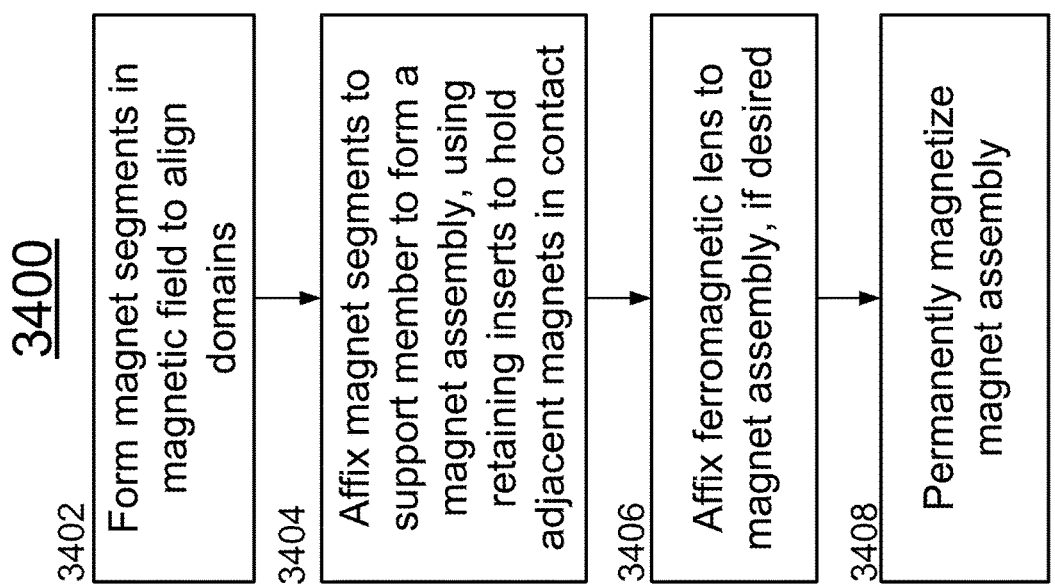
FIG. 44 is a flow chart showing a fifth method of manufacturing a flux focusing magnet assembly.

As shown in FIG. 44, in a fifth manufacturing method 3400, the applicable magnet segments are formed at 3402 (by one of the techniques described above) in a magnetic field to align domains. The applicable magnet segments are then affixed at 3404 to a magnet assembly support member, such as one of the back iron or other members described above in connection with various embodiments, using ferromagnetic retaining inserts to hold the magnet segments in contact while they are affixed to the support member. If a pole assembly consisting of multiple magnet assemblies is desired, then each of the magnet assemblies is affixed to the support member in the same manner. If the desired magnet assembly or pole assembly utilizes a ferromagnetic lens, then the ferromagnetic lens is affixed to the magnet assembly or the pole assembly at 3406. The entire magnet assembly (or pole assembly) is then magnetized at 3408 with the proper magnetic polarization as described previously.

Figure 45:
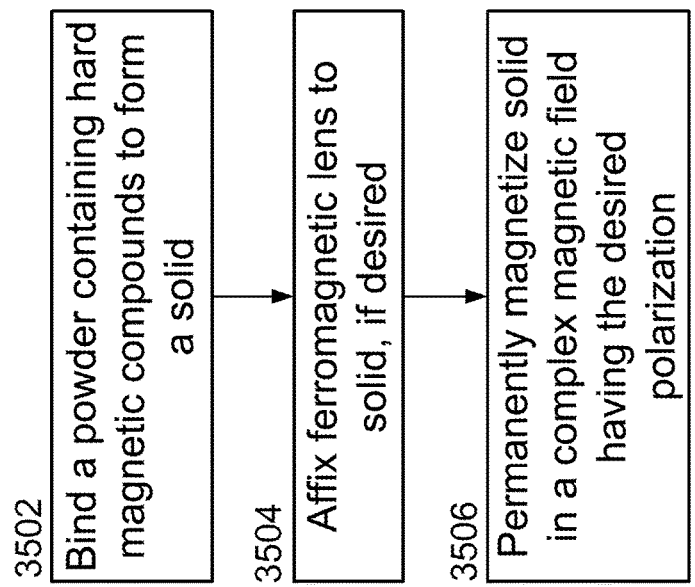
FIG. 45 is a flow chart showing a sixth method of manufacturing a flux focusing magnet assembly.

As shown in FIG. 45, in a sixth manufacturing method 3500, a powder containing hard magnetic compounds is bound together at 3502 using a separate binder material, such as epoxy, resulting in an isotropic solid with constituent hard magnetic particles having random magnetic domain alignment. In some embodiments, the powder used for this step is anisotropic, with domain alignment related to the crystal structure, and each particle of the powder ideally being nearly either a single crystal grain, or single magnetic domain.

If the desired magnetic assembly includes a ferromagnetic lens, the lens is affixed to the newly-formed solid at 3504.

The solid is permanently magnetized at 3506 by subjecting it to a complex magnetic field having the magnetic polarization of the desired magnet assembly. For example, if a magnet assembly having a range of polarization angles from center to edge is desired, the complex magnetic field has a variable angle of polarization from center to edge. Because the solid is originally isotropic with random domain alignment, the solid will magnetize in whatever orientation the magnetization field is applied.

In addition to the methods described above, each of the magnet segments described herein, in addition to the ferromagnetic lens, could also be made from powder, cooled from a liquid, or cooled from a near liquid, and then pressed into the proper shape. For example, a ferromagnetic lens could be formed directly in its position in a magnet assembly. Additionally, for magnet assemblies including a ferromagnetic lens, each of the magnet segments could be made from powder, cooled from a liquid, or cooled from a near liquid, then molded around the lens to form the desired magnet assembly. Alternatively for magnet assemblies including a ferromagnetic lens, a notch may be machined into the top of the affixed magnet segments and used in affixing the ferromagnetic lens to the affixed magnet segments to form the desired magnet assembly.

We claim:
1. An apparatus comprising:
a single magnet segment having:
a central magnetic region;
a first side magnetic region disposed on a first side of the central magnetic region; and
a second side magnetic region disposed on the opposite side of the central region, the central magnet region, the first side magnetic region and the second side magnet region being integrally formed,
the central magnetic region, the first side magnetic region and the second side magnetic region collectively forming a permanent magnet producing a magnetic field with a first magnetic angle of polarization relative to a top surface of the magnet that increases from the central magnetic region to the first side magnetic region, and a second magnetic angle of polarization that decreases from the central magnetic region to the second side magnetic region, the magnetic angles of polarization not intersecting at a point above the top surface,
the first magnetic angle of polarization increasing from zero degrees relative to a nominal flux direction at the central magnetic region up to an angle less than ninety degrees at the first side magnetic region,
the second magnetic angle of polarization decreasing from zero degrees relative to the nominal flux direction at the central magnetic region to an angle greater than negative ninety degrees at the second side magnetic region,
a magnetic flux emanating from the first side magnetic region and a magnetic flux emanating from the second side magnetic region each being directed angularly toward a magnetic flux emanating from the central magnetic region.

2. The apparatus of claim 1, further comprising a ferromagnetic lens disposed in operative relationship with the magnet.

3. The apparatus of claim 1, wherein the magnet is a first magnet, the magnetic angles of polarization of the first magnet lie approximately in a plane, and further comprising a second magnet coupled to the first magnet and having an angle of polarization that intersects the plane.

4. The apparatus of claim 1, further comprising:
a stator; and
a rotor disposed for movement relative to the stator, the rotor including a ferromagnetic support member, the magnet disposed on the support member.

5. An apparatus, comprising:
a support member formed of a ferromagnetic material and having a surface;
a magnetic pole assembly including,
a first magnet assembly having a center magnet with a first lateral side, a second, opposite lateral side, a first longitudinal end, and a second, opposite longitudinal end, a first splitter magnet disposed on a first lateral side of the center magnet and having a first longitudinal end, and a second, opposite longitudinal end, and a second splitter magnet disposed on a second, opposite lateral side of the center magnet and having a first longitudinal end, and a second, opposite longitudinal end, the first magnet assembly having a first end defined collectively by the first longitudinal end of the center magnet, the first longitudinal end of the first splitter magnet and the first longitudinal end of the second splitter magnet of the first magnet assembly, and a second end defined collectively by the second longitudinal end of the center magnet, the second longitudinal end of the first splitter magnet and the second longitudinal end of the second splitter magnet of the first magnet assembly;
a second magnet assembly having a center magnet with a first lateral side, a second, opposite lateral side, a first longitudinal end, and a second, opposite longitudinal end, a first splitter magnet disposed on the first lateral side of the center magnet and having a first longitudinal end, and a second, opposite longitudinal end, and a second splitter magnet disposed on the second lateral side of the center magnet and having a first longitudinal end, and a second, opposite longitudinal end, the second magnet assembly having a first end defined collectively by the first longitudinal end of the center magnet, the first longitudinal end of the first splitter magnet and the first longitudinal end of the second splitter magnet of the second magnet assembly, and a second end defined collectively by the second longitudinal end of the center magnet, the second longitudinal end of the first splitter magnet and the second longitudinal end of the second splitter magnet of the second magnet assembly,
the first magnet assembly and the second magnet assembly disposed on the surface of the support member with the first end of the first magnet assembly disposed proximate to the second end of the second magnet assembly; and an end magnet disposed on the surface of the support member and proximate to the second end of the first magnet assembly such that the end magnet is in surface contact with the second end of the center magnet of the first magnet assembly, the second end of the first splitter magnet of the first magnet assembly and the second end of the second splitter magnet of the first magnet assembly.

6. The apparatus of claim 5, wherein the end magnet is a first end magnet, the magnetic pole assembly further comprising:
a second end magnet disposed on the surface of the support member and proximate to the first end of the second magnet assembly.

7. The apparatus of claim 5, further comprising:
a ferromagnetic lens disposed proximate to the other of the one of the second end of the first magnet assembly and the first end of the second magnet.

8. The apparatus of claim 5, further comprising:
a stator; and
a rotor disposed for movement relative to the stator, the rotor including the magnetic pole assembly and the support member.

9. An apparatus comprising:
a magnet assembly having,
a central magnetic region; and
a plurality of first side magnetic regions disposed on a first side of the central magnetic region; and
a plurality of second side magnetic regions disposed on the opposite side of the central region,
the central magnet region, the plurality of first side magnetic regions and the plurality of second side magnetic regions collectively forming a permanent magnet producing a magnetic field with a first magnetic angle of polarization relative to a top surface of the magnet that increases from the central magnetic region to each successive first side magnetic regions, and a second magnetic angle of polarization that decreases from the central magnetic region to each successive second side magnetic regions, the first and second magnetic angles of polarization not intersecting at a point above the top surface;
the first magnetic angle of polarization increasing from zero degrees relative to a nominal flux direction at the central magnetic region up to an angle less than ninety degrees,
the second magnetic angle of polarization decreasing from zero degrees relative to the nominal flux direction at the central magnetic region to an angle greater than negative ninety degrees.

10. The apparatus of claim 9, further comprising a ferromagnetic lens disposed in operative relationship with the magnet assembly.

11. The apparatus of claim 9, wherein the magnet assembly is a first magnet assembly, the magnetic angles of polarization of the first magnet assembly lie approximately in a plane, and further comprising a second magnet assembly coupled to the first magnet assembly and having an angle of polarization that intersects the plane.

12. The apparatus of claim 9, further comprising:
a stator; and
a rotor disposed for movement relative to the stator, the rotor including the magnetic assembly.

* * * * *